United States Patent
Mellempudi et al.

(10) Patent No.: US 11,669,933 B2
(45) Date of Patent: *Jun. 6, 2023

(54) DYNAMIC PRECISION MANAGEMENT FOR INTEGER DEEP LEARNING PRIMITIVES

(71) Applicant: Intel Corporation, Santa Clara, CA (US)

(72) Inventors: Naveen K. Mellempudi, Bangalore (IN); Dheevatsa Mudigere, Bangalore (IN); Dipankar Das, Pune (IN); Srinivas Sridharan, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/730,364

(22) Filed: Apr. 27, 2022

(65) Prior Publication Data

US 2022/0327656 A1 Oct. 13, 2022

Related U.S. Application Data

(60) Continuation of application No. 17/083,588, filed on Oct. 29, 2020, now Pat. No. 11,321,805, which is a
(Continued)

(51) Int. Cl.
*G06T 1/20* (2006.01)
*G06F 5/01* (2006.01)
(Continued)

(52) U.S. Cl.
CPC ............... *G06T 1/20* (2013.01); *G06F 5/01* (2013.01); *G06F 7/501* (2013.01); *G06F 7/523* (2013.01);
(Continued)

(58) Field of Classification Search
CPC ........ G06T 1/20; G06N 3/0445; G06N 3/0454; G06N 3/063; G06N 3/084; G06F 5/01;
(Continued)

(56) References Cited

U.S. PATENT DOCUMENTS

| 5,448,509 A | 9/1995 | Lee et al. |
| 7,873,812 B1 | 1/2011 | Mimar |

(Continued)

FOREIGN PATENT DOCUMENTS

| CN | 108805796 A | 11/2018 |
| DE | 102018110687 A1 | 11/2018 |

OTHER PUBLICATIONS

Goodfellow, et al. "Adaptive Computation and Machine Learning Series", Book, Nov. 18, 2016, pp. 98-165, Chapter 5, The MIT Press, Cambridge, MA.

(Continued)

*Primary Examiner* — Jacinta M Crawford
(74) *Attorney, Agent, or Firm* — Jaffery Watson Mendonsa & Hamilton LLP

(57) ABSTRACT

One embodiment provides for a graphics processing unit to perform computations associated with a neural network, the graphics processing unit comprising a hardware processing unit having a dynamic precision fixed-point unit that is configurable to quantize elements of a floating-point tensor to convert the floating-point tensor into a dynamic fixed-point tensor.

20 Claims, 49 Drawing Sheets

Related U.S. Application Data continuation of application No. 16/853,405, filed on Apr. 20, 2020, now Pat. No. 10,825,127, which is a division of application No. 15/881,991, filed on Jan. 29, 2018, now Pat. No. 10,643,297.

(60) Provisional application No. 62/501,796, filed on May 5, 2017.

(51) Int. Cl.

| | | |
|---|---|---|
| *G06F 7/501* | (2006.01) | |
| *G06F 7/523* | (2006.01) | |
| *G06F 7/544* | (2006.01) | |
| *G06F 17/15* | (2006.01) | |
| *G06F 17/16* | (2006.01) | |
| *G06N 3/063* | (2023.01) | |
| *G06N 3/084* | (2023.01) | |
| *G06N 3/044* | (2023.01) | |
| *G06N 3/045* | (2023.01) | |

(52) U.S. Cl.
CPC .......... *G06F 7/5443* (2013.01); *G06F 17/153* (2013.01); *G06F 17/16* (2013.01); *G06N 3/044* (2023.01); *G06N 3/045* (2023.01); *G06N 3/063* (2013.01); *G06N 3/084* (2013.01); *G06F 2207/382* (2013.01); *G06F 2207/4824* (2013.01)

(58) Field of Classification Search
CPC ........ G06F 7/501; G06F 7/523; G06F 7/5443; G06F 17/153; G06F 17/16; G06F 2207/382; G06F 2207/4824
USPC ......................................................... 345/501
See application file for complete search history.

(56) References Cited

U.S. PATENT DOCUMENTS

| | | |
|---|---|---|
| 9,721,203 B1 | 8/2017 | Young et al. |
| 10,373,050 B2 | 8/2019 | Lin et al. |
| 10,528,864 B2 | 1/2020 | Dally et al. |
| 10,860,922 B2 | 12/2020 | Dally et al. |
| 10,891,538 B2 | 1/2021 | Dally et al. |
| 2014/0181171 A1 | 6/2014 | Dourbal |
| 2016/0013773 A1 | 1/2016 | Dourbal |
| 2016/0062947 A1 | 3/2016 | Chetlur et al. |
| 2017/0102921 A1 | 4/2017 | Henry et al. |
| 2017/0103304 A1 | 4/2017 | Henry et al. |
| 2017/0200094 A1 | 7/2017 | Bruestle et al. |
| 2017/0316307 A1 | 11/2017 | Koster et al. |
| 2018/0046906 A1 | 2/2018 | Dally et al. |
| 2018/0113678 A1 | 4/2018 | Sadowski et al. |
| 2018/0157962 A1 | 6/2018 | Henry et al. |
| 2018/0157966 A1 | 6/2018 | Henry et al. |
| 2018/0165574 A1 | 6/2018 | Young et al. |
| 2018/0197267 A1 | 7/2018 | Wu et al. |

OTHER PUBLICATIONS

Nicholas Wilt, "The CUDA Handbook; A Comprehensive Guide to GPU Programming", Book, Jun. 22, 2013, pp. 41-57, Addison-Wesley Professional, Boston, MA.

Ross, et al. "Intel Processor Graphics: Architecture & Programming", Power Point Presentation, Aug. 2015, 78 pages, Intel Corporation, Santa Clara, CA.

Shane Cook, "CUDA Programming", Book, 2013, pp. 37-52, Chapter 3, Elsevier Inc., Amsterdam Netherlands.

Stephen Junkins, "The Compute Architecture of Intel Processor Graphics Gen9", paper, Aug. 14, 2015, 22 pages, Version 1.0, Intel Corporation, Santa Clara, CA.

- If $dfp_1^{16} = \langle I_1^{16}, SF_1 \rangle$ and $dfp_2^{16} = \langle I_2^{16}, SF_2 \rangle$ are values from two different 16-bit *dfp* tensors then, Addition: ─ 1610

$$dfp_1^{16} + dfp_2^{16} = \langle I_{sum}^{16}, \max(SF_1, SF_2) \rangle, \text{ where}$$

$$I_{sum}^{16} = (I_1^{16} \gg (\max(SF_1, SF_2) - SF_1)) + (I_2^{16} \gg (\max(SF_1, SF_2) - SF_2))$$

Multiplication: ─ 1620

$$dfp_{prod}^{32} = dfp_1 \times dfp_2 = \langle I_{prod}^{32}, (SF_1 + SF_2) \rangle, \text{ where}$$

$$I_{prod}^{32} = I_1^{16} * I_2^{16} \text{ is a 32-bit integer.}$$

Down Convert: ( $dfp^{32} \to dfp^{16}$ ) ─ 1630

$$dfp_{dc}^{16} = \langle I_{dc}^{16}, (SF^{32} - R_{shift}) \rangle, \text{ where}$$

$$I_{dc}^{16} = (I^{32} \gg R_{shift}) \text{ and } R_{shift} = (16 - LZC(I^{32}) - 1)$$

*LZC*= Leading Zero Count

FIG. 16A

Addition: ─╯ 1640

$$i_{a+b} = \begin{cases} i_a + \left(i_b \gg (E_s^a - E_s^b)\right), \text{when } E_s^a > E_s^b \\ i_b + \left(i_a \gg (E_s^b - E_s^a)\right), \text{when } E_s^b > E_s^a \end{cases}$$

and exponent, $E_s^{a+b} = \max_{E_s^a, E_s^b}$

Multiplication: ─╯ 1650

$$i_{ab} = i_a \times i_b \text{ and exponent, } E_s^{ab} = E_s^a + E_s^b$$

Down Convert: ─╯ 1660

$$R_s = P - LZC\left(\max_{\forall i_{ab} \in I^N} |i_{ab}|\right)$$

$$I_{ab}^d = i_{ab} \gg R_s \text{ and exponent, } E_s^{ab} \mathrel{+}= R_s$$

FIG. 16B

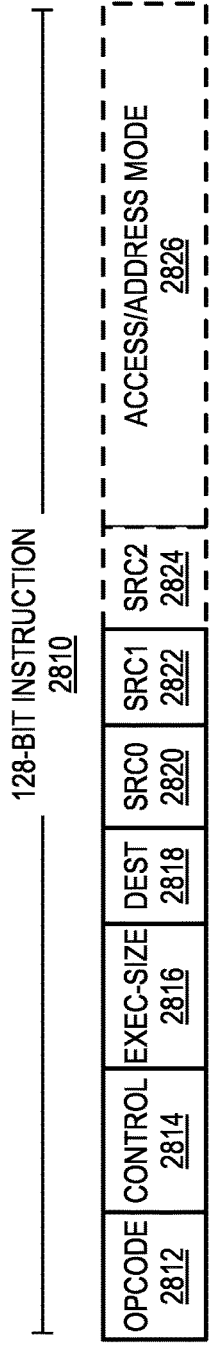
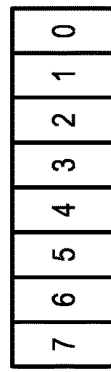
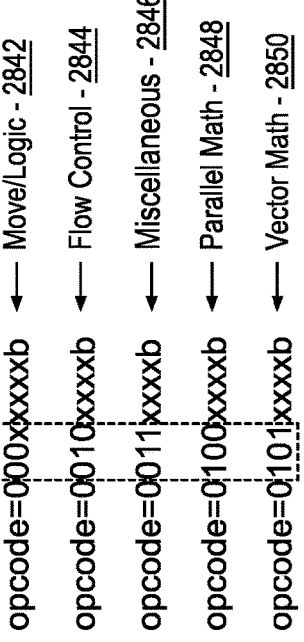
FIG. 28

FIG. 30A  GRAPHICS PROCESSOR COMMAND FORMAT
3000
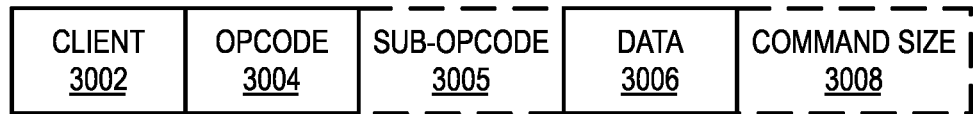
FIG. 30B  GRAPHICS PROCESSOR COMMAND SEQUENCE
3010
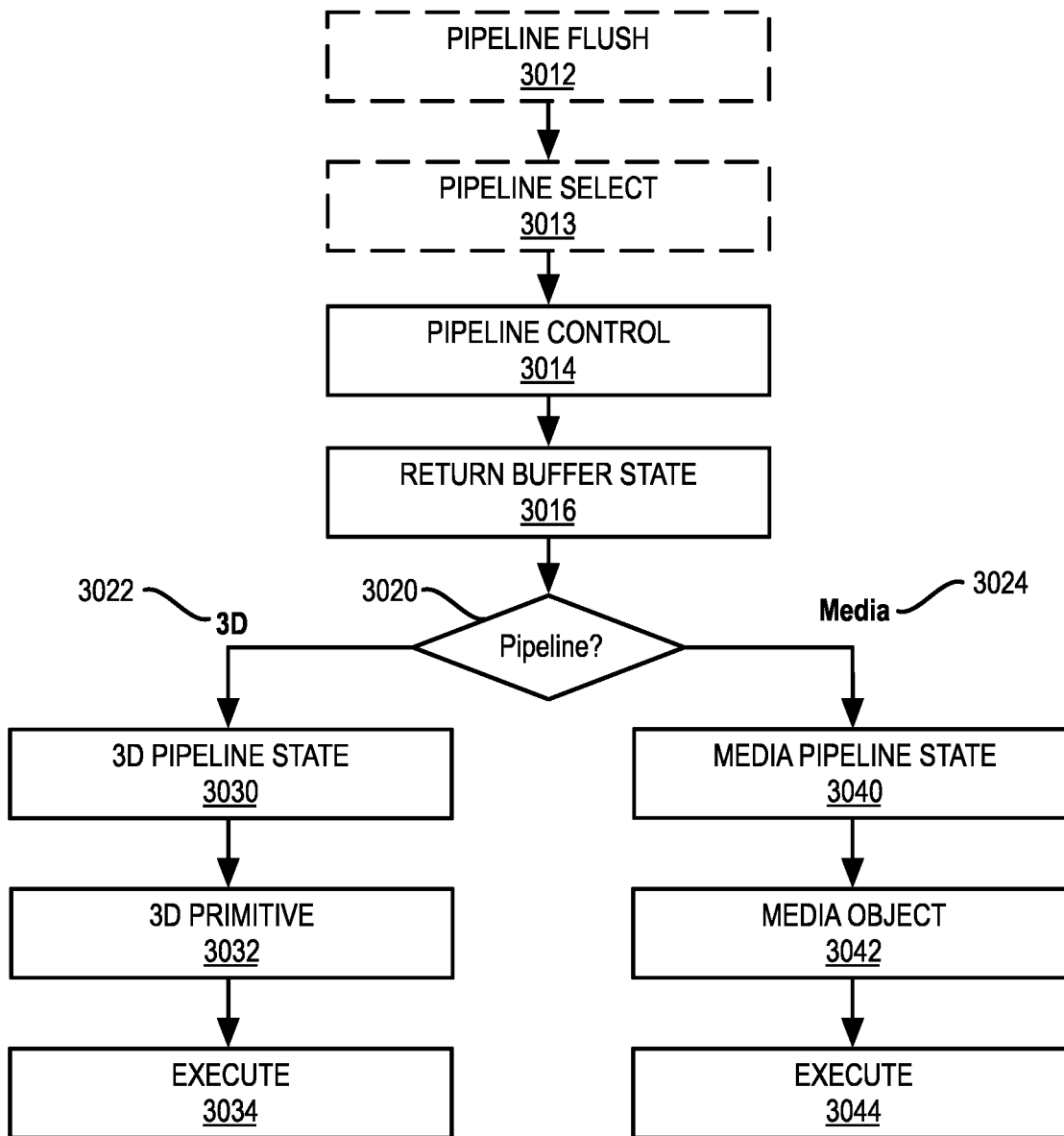

DYNAMIC PRECISION MANAGEMENT FOR INTEGER DEEP LEARNING PRIMITIVES

CROSS-REFERENCE

The present application is related to and, under 35 U.S.C. 119(e), claims the benefit of and priority to U.S. application Ser. No. 17/083,588, filed Oct. 29, 2020, which is a continuation of U.S. application Ser. No. 16/853,405, filed Apr. 20, 2020, now issued as U.S. Pat. No. 10,825,127, which is a divisional of and claims priority to U.S. application Ser. No. 15/881,991, filed Jan. 29, 2018, issued as U.S. Pat. No. 10,643,297, which claims the priority to U.S. Provisional Patent Application No. 62/501,796, filed on May 5, 2017, which is hereby incorporated herein by reference.

FIELD

Embodiments relate generally to data processing and more particularly to data processing via a general-purpose graphics processing unit.

BACKGROUND OF THE DESCRIPTION

Current parallel graphics data processing includes systems and methods developed to perform specific operations on graphics data such as, for example, linear interpolation, tessellation, rasterization, texture mapping, depth testing, etc. Traditionally, graphics processors used fixed function computational units to process graphics data; however, more recently, portions of graphics processors have been made programmable, enabling such processors to support a wider variety of operations for processing vertex and fragment data.

To further increase performance, graphics processors typically implement processing techniques such as pipelining that attempt to process, in parallel, as much graphics data as possible throughout the different parts of the graphics pipeline. Parallel graphics processors with single instruction, multiple thread (SIMT) architectures are designed to maximize the amount of parallel processing in the graphics pipeline. In an SIMT architecture, groups of parallel threads attempt to execute program instructions synchronously together as often as possible to increase processing efficiency. A general overview of software and hardware for SIMT architectures can be found in Shane Cook, *CUDA Programming*, Chapter 3, pages 37-51 (2013) and/or Nicholas Wilt, *CUDA Handbook, A Comprehensive Guide to GPU Programming*, Sections 2.6.2 to 3.1.2 (June 2013).

BRIEF DESCRIPTION OF THE DRAWINGS

So that the features of the present invention can be understood in detail, a more particular description of the invention may be had by reference to embodiments, some of which are illustrated in the appended drawings. It is to be noted, however, that the appended drawings illustrate only typical embodiments and are therefore not to be considered limiting of the scope of all embodiments.

FIG. 16A illustrates equations for arithmetic operations and down conversion according to embodiments described herein;

FIG. 16B illustrates equations for hardware accelerated dynamic fixed-point primitives, according to an embodiment;

FIG. 28 is a block diagram illustrating graphics processor instruction formats according to some embodiments;

FIG. 30A-30B illustrate a graphics processor command format and command sequence, according to some embodiments;

DETAILED DESCRIPTION

In some embodiments, a graphics processing unit (GPU) is communicatively coupled to host/processor cores to accelerate graphics operations, machine-learning operations, pattern analysis operations, and various general-purpose GPU (GPGPU) functions. The GPU may be communicatively coupled to the host processor/cores over a bus or another interconnect (e.g., a high-speed interconnect such as PCIe or NVLink). In other embodiments, the GPU may be integrated on the same package or chip as the cores and communicatively coupled to the cores over an internal processor bus/interconnect (i.e., internal to the package or chip). Regardless of the manner in which the GPU is connected, the processor cores may allocate work to the GPU in the form of sequences of commands/instructions contained in a work descriptor. The GPU then uses dedicated circuitry/logic for efficiently processing these commands/instructions.

In the following description, numerous specific details are set forth to provide a more thorough understanding. However, it will be apparent to one of skill in the art that the embodiments described herein may be practiced without one or more of these specific details. In other instances, well-known features have not been described to avoid obscuring the details of the present embodiments.

System Overview

Figure 1:
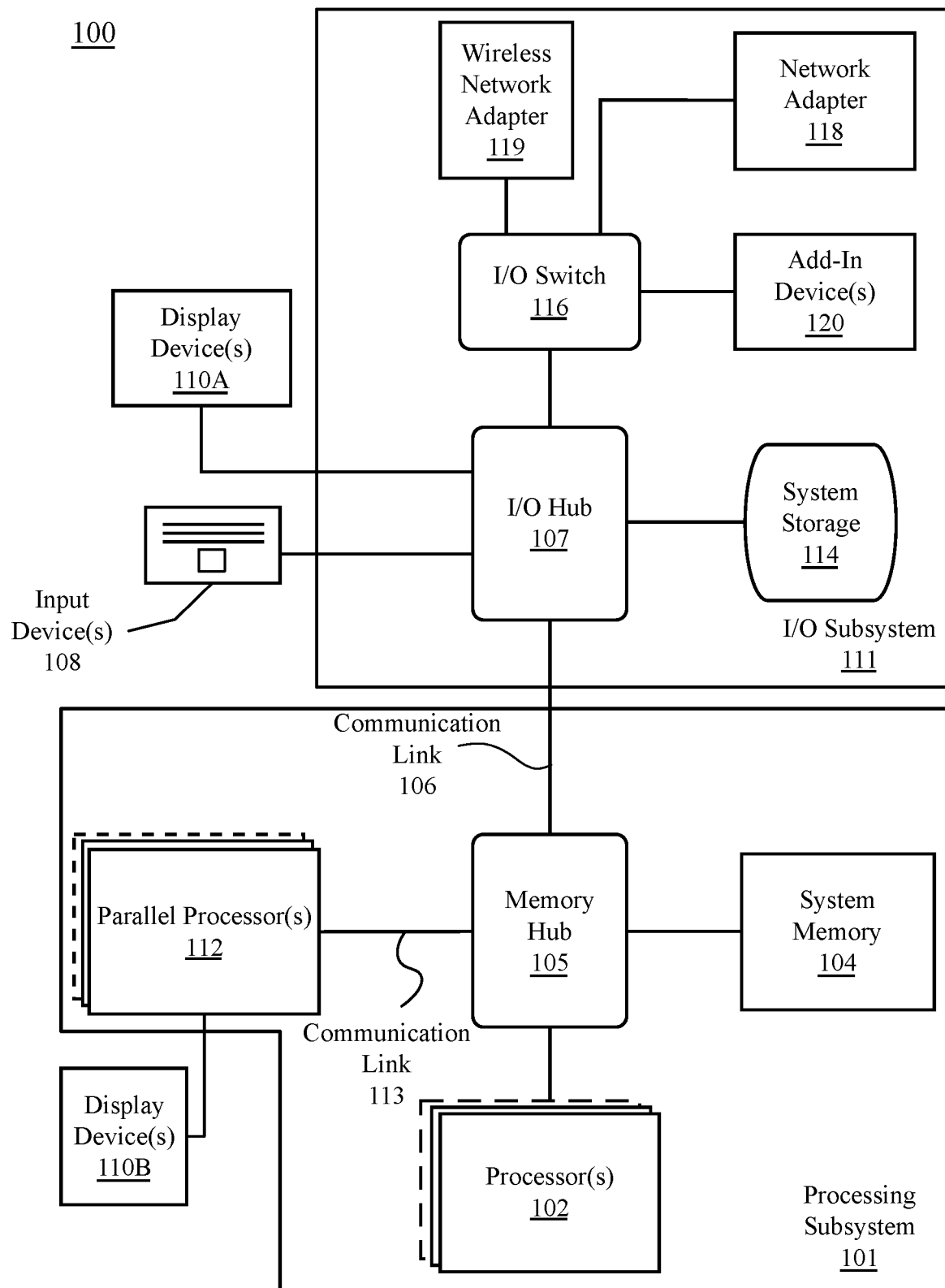
FIG. 1 is a block diagram illustrating a computer system configured to implement one or more aspects of the embodiments described herein.

FIG. 1 is a block diagram illustrating a computing system 100 configured to implement one or more aspects of the embodiments described herein. The computing system 100 includes a processing subsystem 101 having one or more processor(s) 102 and a system memory 104 communicating via an interconnection path that may include a memory hub 105. The memory hub 105 may be a separate component within a chipset component or may be integrated within the one or more processor(s) 102. The memory hub 105 couples with an I/O subsystem 111 via a communication link 106. The I/O subsystem 111 includes an I/O hub 107 that can enable the computing system 100 to receive input from one or more input device(s) 108. Additionally, the I/O hub 107 can enable a display controller, which may be included in the one or more processor(s) 102, to provide outputs to one or more display device(s) 110A. In one embodiment the one or more display device(s) 110A coupled with the I/O hub 107 can include a local, internal, or embedded display device.

In one embodiment the processing subsystem 101 includes one or more parallel processor(s) 112 coupled to memory hub 105 via a bus or other communication link 113. The communication link 113 may be one of any number of standards-based communication link technologies or protocols, such as, but not limited to PCI Express, or may be a vendor specific communications interface or communications fabric. In one embodiment the one or more parallel processor(s) 112 form a computationally focused parallel or vector processing system that can include a large number of processing cores and/or processing clusters, such as a many integrated core (MIC) processor. In one embodiment the one or more parallel processor(s) 112 form a graphics processing subsystem that can output pixels to one of the one or more display device(s) 110A coupled via the I/O hub 107. The one or more parallel processor(s) 112 can also include a display controller and display interface (not shown) to enable a direct connection to one or more display device(s) 110B.

Within the I/O subsystem 111, a system storage unit 114 can connect to the I/O hub 107 to provide a storage mechanism for the computing system 100. An I/O switch 116 can be used to provide an interface mechanism to enable connections between the I/O hub 107 and other components, such as a network adapter 118 and/or wireless network adapter 119 that may be integrated into the platform, and various other devices that can be added via one or more add-in device(s) 120. The network adapter 118 can be an Ethernet adapter or another wired network adapter. The wireless network adapter 119 can include one or more of a Wi-Fi, Bluetooth, near field communication (NFC), or other network device that includes one or more wireless radios.

The computing system 100 can include other components not explicitly shown, including USB or other port connections, optical storage drives, video capture devices, and the like, may also be connected to the I/O hub 107. Communication paths interconnecting the various components in FIG. 1 may be implemented using any suitable protocols, such as PCI (Peripheral Component Interconnect) based protocols (e.g., PCI-Express), or any other bus or point-to-point communication interfaces and/or protocol(s), such as the NV-Link high-speed interconnect, or interconnect protocols known in the art.

In one embodiment, the one or more parallel processor(s) 112 incorporate circuitry optimized for graphics and video processing, including, for example, video output circuitry, and constitutes a graphics processing unit (GPU). In another embodiment, the one or more parallel processor(s) 112 incorporate circuitry optimized for general purpose processing, while preserving the underlying computational architecture, described in greater detail herein. In yet another embodiment, components of the computing system 100 may be integrated with one or more other system elements on a single integrated circuit. For example, the one or more parallel processor(s) 112, memory hub 105, processor(s) 102, and I/O hub 107 can be integrated into a system on chip (SoC) integrated circuit. Alternatively, the components of the computing system 100 can be integrated into a single package to form a system in package (SIP) configuration. In one embodiment, at least a portion of the components of the computing system 100 can be integrated into a multi-chip module (MCM), which can be interconnected with other multi-chip modules into a modular computing system.

It will be appreciated that the computing system 100 shown herein is illustrative and that variations and modifications are possible. The connection topology, including the number and arrangement of bridges, the number of processor(s) 102, and the number of parallel processor(s) 112, may be modified as desired. For instance, in some embodiments, system memory 104 is connected to the processor(s) 102 directly rather than through a bridge, while other devices communicate with system memory 104 via the memory hub 105 and the processor(s) 102. In other alternative topologies, the parallel processor(s) 112 are connected to the I/O hub 107 or directly to one of the one or more processor(s) 102, rather than to the memory hub 105. In other embodiments, the I/O hub 107 and memory hub 105 may be integrated into a single chip. Some embodiments may include two or more sets of processor(s) 102 attached via multiple sockets, which can couple with two or more instances of the parallel processor(s) 112.

Some of the particular components shown herein are optional and may not be included in all implementations of the computing system 100. For example, any number of add-in cards or peripherals may be supported, or some components may be eliminated. Furthermore, some architectures may use different terminology for components similar to those illustrated in FIG. 1. For example, the memory hub 105 may be referred to as a Northbridge in some architectures, while the I/O hub 107 may be referred to as a Southbridge.

Figure 2A:
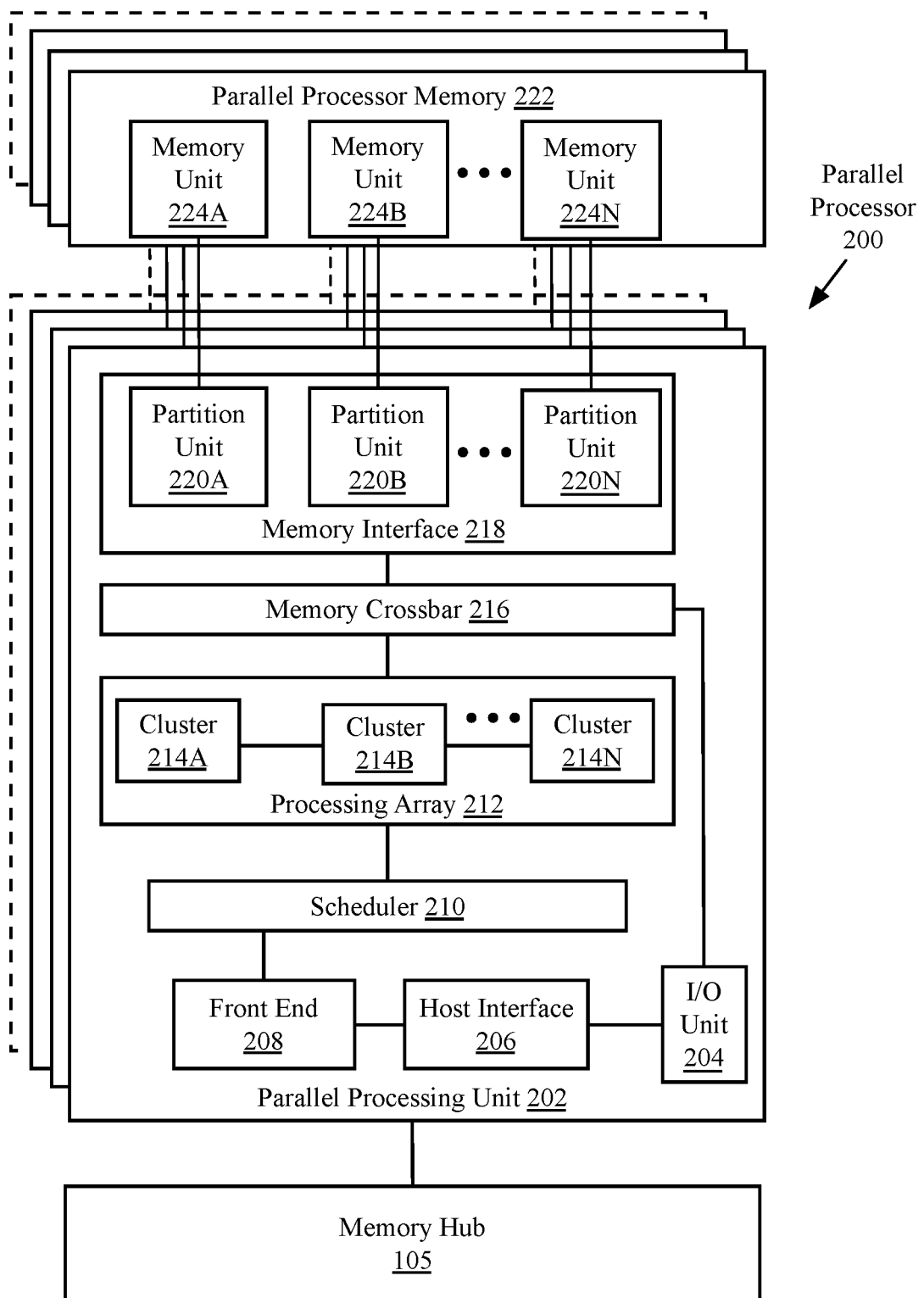
FIG. 2A-2D illustrate parallel processor components, according to an embodiment.

FIG. 2A illustrates a parallel processor 200, according to an embodiment. The various components of the parallel processor 200 may be implemented using one or more integrated circuit devices, such as programmable processors, application specific integrated circuits (ASICs), or field programmable gate arrays (FPGA). The illustrated parallel processor 200 is a variant of the one or more parallel processor(s) 112 shown in FIG. 1, according to an embodiment.

In one embodiment the parallel processor 200 includes a parallel processing unit 202. The parallel processing unit includes an I/O unit 204 that enables communication with other devices, including other instances of the parallel processing unit 202. The I/O unit 204 may be directly connected to other devices. In one embodiment the I/O unit 204 connects with other devices via the use of a hub or switch interface, such as memory hub 105. The connections between the memory hub 105 and the I/O unit 204 form a communication link 113. Within the parallel processing unit 202, the I/O unit 204 connects with a host interface 206 and a memory crossbar 216, where the host interface 206 receives commands directed to performing processing operations and the memory crossbar 216 receives commands directed to performing memory operations.

When the host interface 206 receives a command buffer via the I/O unit 204, the host interface 206 can direct work operations to perform those commands to a front end 208. In one embodiment the front end 208 couples with a scheduler 210, which is configured to distribute commands or other work items to a processing cluster array 212. In one embodiment the scheduler 210 ensures that the processing cluster array 212 is properly configured and in a valid state before tasks are distributed to the processing clusters of the processing cluster array 212. In one embodiment the scheduler 210 is implemented via firmware logic executing on a microcontroller. The microcontroller implemented scheduler 210 is configurable to perform complex scheduling and work distribution operations at coarse and fine granularity, enabling rapid preemption and context switching of threads executing on the processing array 212. In one embodiment, the host software can prove workloads for scheduling on the processing array 212 via one of multiple graphics processing doorbells. The workloads can then be automatically distributed across the processing array 212 by the scheduler 210 logic within the scheduler microcontroller.

The processing cluster array 212 can include up to "N" processing clusters (e.g., cluster 214A, cluster 214B, through cluster 214N). Each cluster 214A-214N of the processing cluster array 212 can execute a large number of concurrent threads. The scheduler 210 can allocate work to the clusters 214A-214N of the processing cluster array 212 using various scheduling and/or work distribution algorithms, which may vary depending on the workload arising for each type of program or computation. The scheduling can be handled dynamically by the scheduler 210, or can be assisted in part by compiler logic during compilation of program logic configured for execution by the processing cluster array 212. In one embodiment, different clusters 214A-214N of the processing cluster array 212 can be allocated for processing different types of programs or for performing different types of computations.

The processing cluster array 212 can be configured to perform various types of parallel processing operations. In one embodiment the processing cluster array 212 is configured to perform general-purpose parallel compute operations. For example, the processing cluster array 212 can include logic to execute processing tasks including filtering of video and/or audio data, performing modeling operations, including physics operations, and performing data transformations.

In one embodiment the processing cluster array 212 is configured to perform parallel graphics processing operations. In embodiments in which the parallel processor 200 is configured to perform graphics processing operations, the processing cluster array 212 can include additional logic to support the execution of such graphics processing operations, including, but not limited to texture sampling logic to perform texture operations, as well as tessellation logic and other vertex processing logic. Additionally, the processing cluster array 212 can be configured to execute graphics processing related shader programs such as, but not limited to vertex shaders, tessellation shaders, geometry shaders, and pixel shaders. The parallel processing unit 202 can transfer data from system memory via the I/O unit 204 for processing. During processing the transferred data can be stored to on-chip memory (e.g., parallel processor memory 222) during processing, then written back to system memory.

In one embodiment, when the parallel processing unit 202 is used to perform graphics processing, the scheduler 210 can be configured to divide the processing workload into approximately equal sized tasks, to better enable distribution of the graphics processing operations to multiple clusters 214A-214N of the processing cluster array 212. In some embodiments, portions of the processing cluster array 212 can be configured to perform different types of processing. For example, a first portion may be configured to perform vertex shading and topology generation, a second portion may be configured to perform tessellation and geometry shading, and a third portion may be configured to perform pixel shading or other screen space operations, to produce a rendered image for display. Intermediate data produced by one or more of the clusters 214A-214N may be stored in buffers to allow the intermediate data to be transmitted between clusters 214A-214N for further processing.

During operation, the processing cluster array 212 can receive processing tasks to be executed via the scheduler 210, which receives commands defining processing tasks from front end 208. For graphics processing operations, processing tasks can include indices of data to be processed, e.g., surface (patch) data, primitive data, vertex data, and/or pixel data, as well as state parameters and commands defining how the data is to be processed (e.g., what program is to be executed). The scheduler 210 may be configured to fetch the indices corresponding to the tasks or may receive the indices from the front end 208. The front end 208 can be configured to ensure the processing cluster array 212 is configured to a valid state before the workload specified by incoming command buffers (e.g., batch-buffers, push buffers, etc.) is initiated.

Each of the one or more instances of the parallel processing unit 202 can couple with parallel processor memory 222. The parallel processor memory 222 can be accessed via the memory crossbar 216, which can receive memory requests from the processing cluster array 212 as well as the I/O unit 204. The memory crossbar 216 can access the parallel processor memory 222 via a memory interface 218. The memory interface 218 can include multiple partition units (e.g., partition unit 220A, partition unit 220B, through partition unit 220N) that can each couple to a portion (e.g., memory unit) of parallel processor memory 222. In one implementation, the number of partition units 220A-220N is configured to be equal to the number of memory units, such that a first partition unit 220A has a corresponding first memory unit 224A, a second partition unit 220B has a corresponding memory unit 224B, and an Nth partition unit 220N has a corresponding Nth memory unit 224N. In other embodiments, the number of partition units 220A-220N may not be equal to the number of memory devices.

In various embodiments, the memory units 224A-224N can include various types of memory devices, including dynamic random-access memory (DRAM) or graphics random access memory, such as synchronous graphics random access memory (SGRAM), including graphics double data rate (GDDR) memory. In one embodiment, the memory units 224A-224N may also include 3D stacked memory, including but not limited to high bandwidth memory (HBM). Persons skilled in the art will appreciate that the specific implementation of the memory units 224A-224N can vary, and can be selected from one of various conventional designs. Render targets, such as frame buffers or texture maps may be stored across the memory units 224A-224N, allowing partition units 220A-220N to write portions of each render target in parallel to efficiently use the available bandwidth of parallel processor memory 222. In some embodiments, a local instance of the parallel processor memory 222 may be excluded in favor of a unified memory design that utilizes system memory in conjunction with local cache memory.

In one embodiment, any one of the clusters 214A-214N of the processing cluster array 212 can process data that will be written to any of the memory units 224A-224N within parallel processor memory 222. The memory crossbar 216 can be configured to transfer the output of each cluster 214A-214N to any partition unit 220A-220N or to another cluster 214A-214N, which can perform additional processing operations on the output. Each cluster 214A-214N can communicate with the memory interface 218 through the memory crossbar 216 to read from or write to various external memory devices. In one embodiment, the memory crossbar 216 has a connection to the memory interface 218 to communicate with the I/O unit 204, as well as a connection to a local instance of the parallel processor memory 222, enabling the processing units within the different processing clusters 214A-214N to communicate with system memory or other memory that is not local to the parallel processing unit 202. In one embodiment, the memory crossbar 216 can use virtual channels to separate traffic streams between the clusters 214A-214N and the partition units 220A-220N.

While a single instance of the parallel processing unit 202 is illustrated within the parallel processor 200, any number of instances of the parallel processing unit 202 can be included. For example, multiple instances of the parallel processing unit 202 can be provided on a single add-in card, or multiple add-in cards can be interconnected. The different instances of the parallel processing unit 202 can be configured to inter-operate even if the different instances have different numbers of processing cores, different amounts of local parallel processor memory, and/or other configuration differences. For example, in one embodiment some instances of the parallel processing unit 202 can include higher precision floating-point units relative to other instances. Systems incorporating one or more instances of the parallel processing unit 202 or the parallel processor 200 can be implemented in a variety of configurations and form factors, including but not limited to desktop, laptop, or handheld personal computers, servers, workstations, game consoles, and/or embedded systems.

Figure 2B:
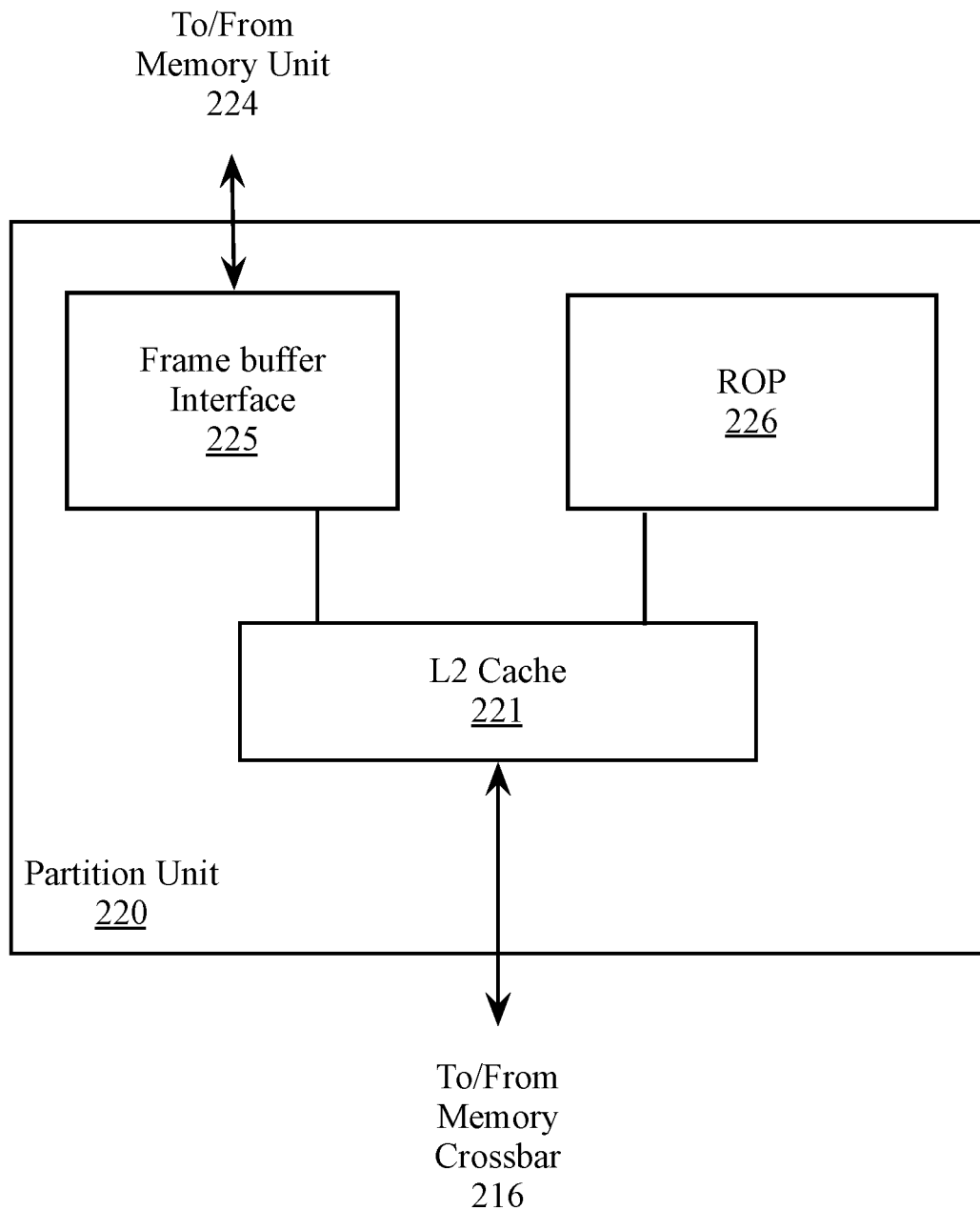

FIG. 2B is a block diagram of a partition unit 220, according to an embodiment. In one embodiment, the partition unit 220 is an instance of one of the partition units 220A-220N of FIG. 2A. As illustrated, the partition unit 220 includes an L2 cache 221, a frame buffer interface 225, and a ROP 226 (raster operations unit). The L2 cache 221 is a read/write cache that is configured to perform load and store operations received from the memory crossbar 216 and ROP 226. Read misses and urgent write-back requests are output by L2 cache 221 to frame buffer interface 225 for processing. Updates can also be sent to the frame buffer via the frame buffer interface 225 for processing. In one embodiment the frame buffer interface 225 interfaces with one of the memory units in parallel processor memory, such as the memory units 224A-224N of FIG. 2A (e.g., within parallel processor memory 222).

In graphics applications, the ROP 226 is a processing unit that performs raster operations such as stencil, z test, blending, and the like. The ROP 226 then outputs processed graphics data that is stored in graphics memory. In some embodiments, the ROP 226 includes compression logic to compress depth or color data that is written to memory and decompress depth or color data that is read from memory. The compression logic can be lossless compression logic that makes use of one or more of multiple compression algorithms. The type of compression that is performed by the ROP 226 can vary based on the statistical characteristics of the data to be compressed. For example, in one embodiment, delta color compression is performed on depth and color data on a per-tile basis.

In some embodiments, the ROP 226 is included within each processing cluster (e.g., cluster 214A-214N of FIG. 2A) instead of within the partition unit 220. In such embodiment, read and write requests for pixel data are transmitted over the memory crossbar 216 instead of pixel fragment data. The processed graphics data may be displayed on a display device, such as one of the one or more display device(s) 110 of FIG. 1, routed for further processing by the processor(s) 102, or routed for further processing by one of the processing entities within the parallel processor 200 of FIG. 2A.

Figure 2C:
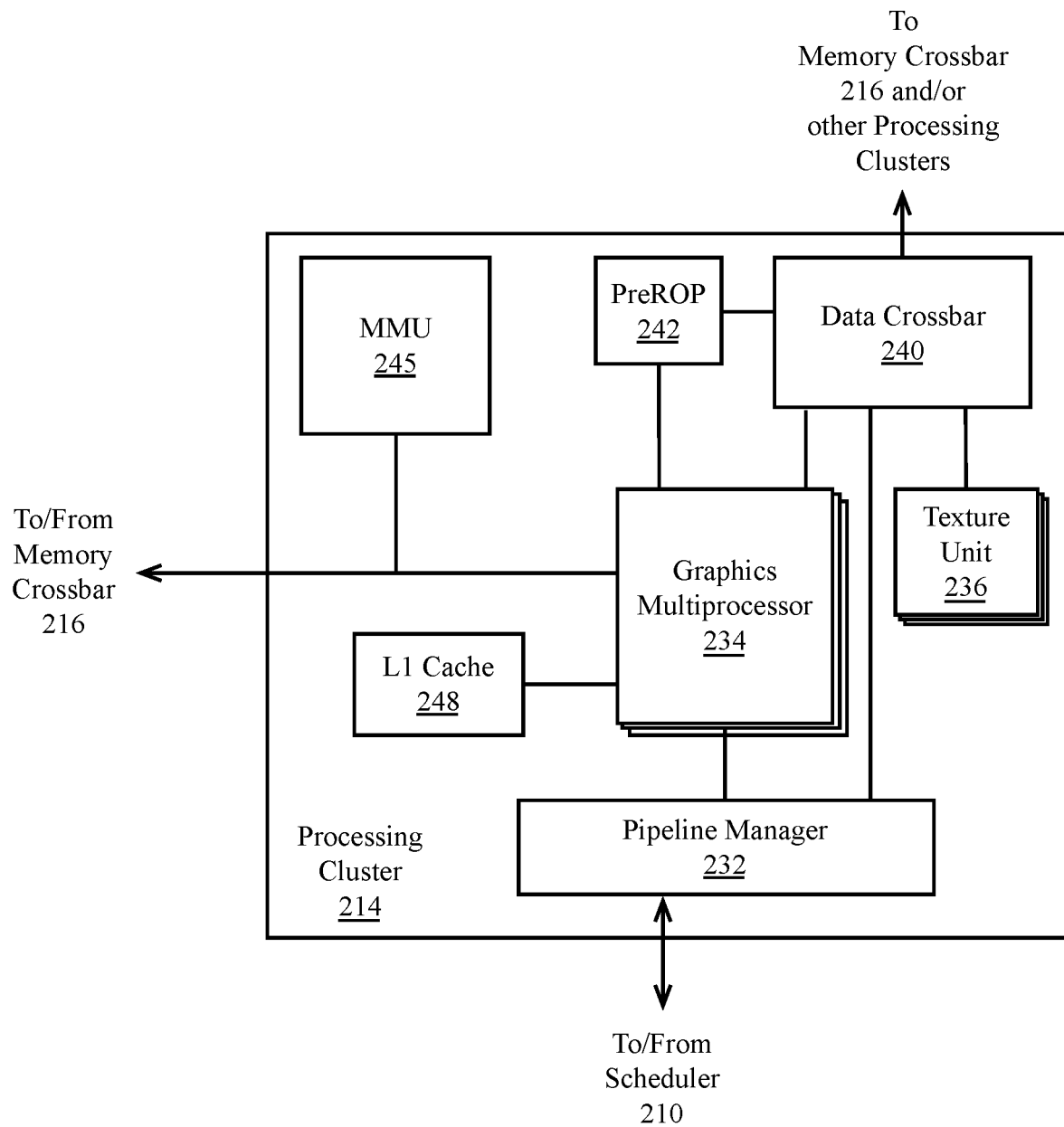

FIG. 2C is a block diagram of a processing cluster 214 within a parallel processing unit, according to an embodiment. In one embodiment, the processing cluster is an instance of one of the processing clusters 214A-214N of FIG. 2A. The processing cluster 214 can be configured to execute many threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within each one of the processing clusters. Unlike a SIMD execution regime, where all processing engines typically execute identical instructions, SIMT execution allows different threads to more readily follow divergent execution paths through a given thread program. Persons skilled in the art will understand that a SIMD processing regime represents a functional subset of a SIMT processing regime.

Operation of the processing cluster 214 can be controlled via a pipeline manager 232 that distributes processing tasks to SIMT parallel processors. The pipeline manager 232 receives instructions from the scheduler 210 of FIG. 2A and manages execution of those instructions via a graphics multiprocessor 234 and/or a texture unit 236. The illustrated graphics multiprocessor 234 is an exemplary instance of a SIMT parallel processor. However, various types of SIMT parallel processors of differing architectures may be included within the processing cluster 214. One or more instances of the graphics multiprocessor 234 can be included within a processing cluster 214. The graphics multiprocessor 234 can process data and a data crossbar 240 can be used to distribute the processed data to one of multiple possible destinations, including other shader units. The pipeline manager 232 can facilitate the distribution of processed data by specifying destinations for processed data to be distributed via the data crossbar 240.

Each graphics multiprocessor 234 within the processing cluster 214 can include an identical set of functional execution logic (e.g., arithmetic logic units, load-store units, etc.). The functional execution logic can be configured in a pipelined manner in which new instructions can be issued before previous instructions are complete. The functional execution logic supports a variety of operations including integer and floating-point arithmetic, comparison operations, Boolean operations, bit-shifting, and computation of various algebraic functions. In one embodiment, the same functional-unit hardware can be leveraged to perform different operations and any combination of functional units may be present.

The instructions transmitted to the processing cluster 214 constitutes a thread. A set of threads executing across the set of parallel processing engines is a thread group. A thread group executes the same program on different input data. Each thread within a thread group can be assigned to a different processing engine within a graphics multiprocessor 234. A thread group may include fewer threads than the number of processing engines within the graphics multiprocessor 234. When a thread group includes fewer threads than the number of processing engines, one or more of the processing engines may be idle during cycles in which that thread group is being processed. A thread group may also include more threads than the number of processing engines within the graphics multiprocessor 234. When the thread group includes more threads than the number of processing engines within the graphics multiprocessor 234, processing can be performed over consecutive clock cycles. In one embodiment, multiple thread groups can be executed concurrently on a graphics multiprocessor 234.

In one embodiment, the graphics multiprocessor 234 includes an internal cache memory to perform load and store operations. In one embodiment, the graphics multiprocessor 234 can forego an internal cache and use a cache memory (e.g., L1 cache 248) within the processing cluster 214. Each graphics multiprocessor 234 also has access to L2 caches within the partition units (e.g., partition units 220A-220N of FIG. 2A) that are shared among all processing clusters 214 and may be used to transfer data between threads. The graphics multiprocessor 234 may also access off-chip global memory, which can include one or more of local parallel processor memory and/or system memory. Any memory external to the parallel processing unit 202 may be used as global memory. Embodiments in which the processing cluster 214 includes multiple instances of the graphics multiprocessor 234 can share common instructions and data, which may be stored in the L1 cache 248.

Each processing cluster 214 may include an MMU 245 (memory management unit) that is configured to map virtual addresses into physical addresses. In other embodiments, one or more instances of the MMU 245 may reside within the memory interface 218 of FIG. 2A. The MMU 245 includes a set of page table entries (PTEs) used to map a virtual address to a physical address of a tile and optionally a cache line index. The MMU 245 may include address translation lookaside buffers (TLB) or caches that may reside within the graphics multiprocessor 234 or the L1 cache or processing cluster 214. The physical address is processed to distribute surface data access locality to allow efficient request interleaving among partition units. The cache line index may be used to determine whether a request for a cache line is a hit or miss.

In graphics and computing applications, a processing cluster 214 may be configured such that each graphics multiprocessor 234 is coupled to a texture unit 236 for performing texture mapping operations, e.g., determining texture sample positions, reading texture data, and filtering the texture data. Texture data is read from an internal texture L1 cache (not shown) or in some embodiments from the L1 cache within graphics multiprocessor 234 and is fetched from an L2 cache, local parallel processor memory, or system memory, as needed. Each graphics multiprocessor 234 outputs processed tasks to the data crossbar 240 to provide the processed task to another processing cluster 214 for further processing or to store the processed task in an L2 cache, local parallel processor memory, or system memory via the memory crossbar 216. A preROP 242 (pre-raster operations unit) is configured to receive data from graphics multiprocessor 234, direct data to ROP units, which may be located with partition units as described herein (e.g., partition units 220A-220N of FIG. 2A). The preROP 242 unit can perform optimizations for color blending, organize pixel color data, and perform address translations.

It will be appreciated that the core architecture described herein is illustrative and that variations and modifications are possible. Any number of processing units, e.g., graphics multiprocessor 234, texture units 236, preROPs 242, etc., may be included within a processing cluster 214. Further, while only one processing cluster 214 is shown, a parallel processing unit as described herein may include any number of instances of the processing cluster 214. In one embodiment, each processing cluster 214 can be configured to operate independently of other processing clusters 214 using separate and distinct processing units, L1 caches, etc.

Figure 2D:
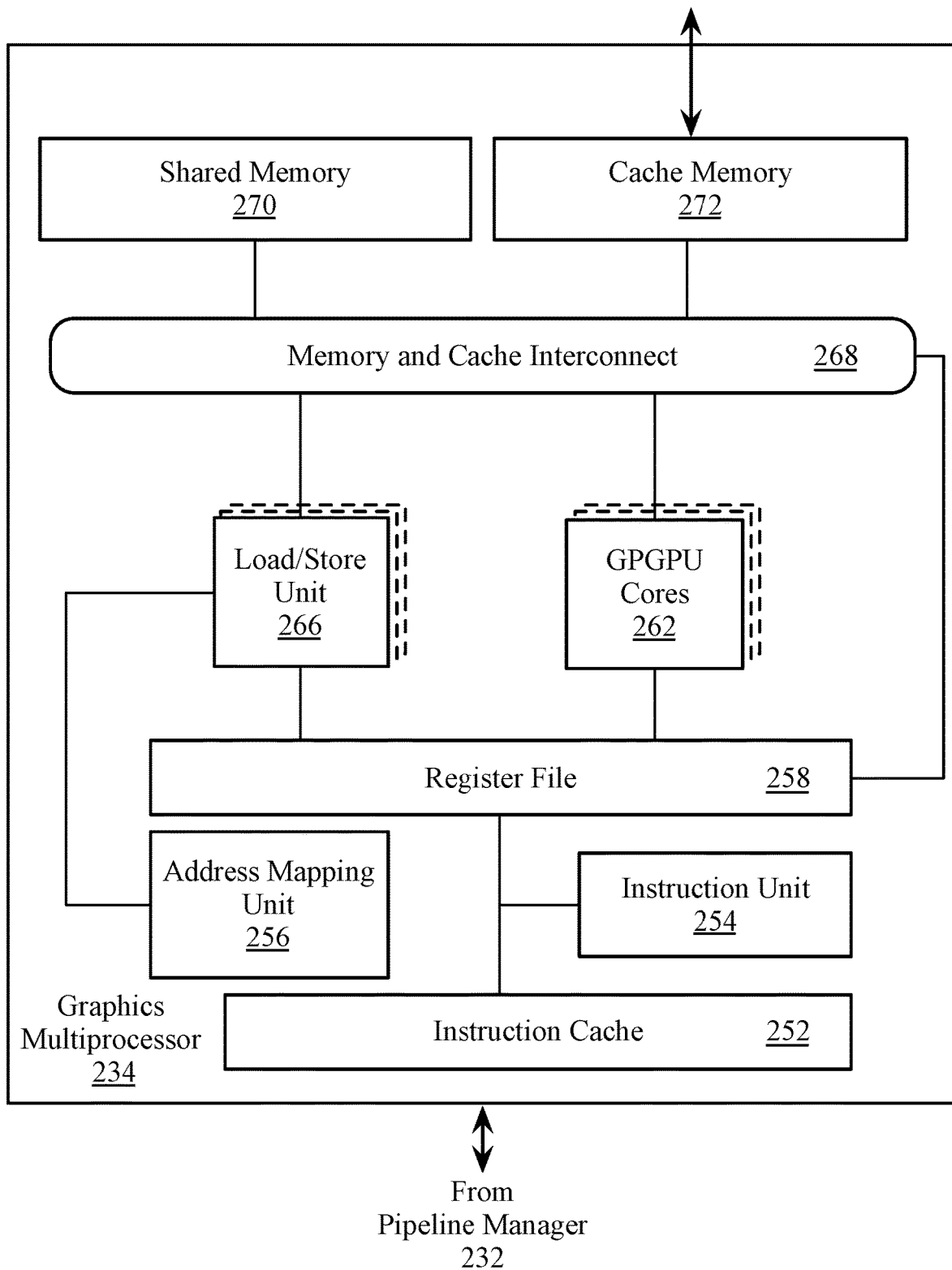

FIG. 2D shows a graphics multiprocessor 234, according to one embodiment. In such embodiment, the graphics multiprocessor 234 couples with the pipeline manager 232 of the processing cluster 214. The graphics multiprocessor 234 has an execution pipeline including but not limited to an instruction cache 252, an instruction unit 254, an address mapping unit 256, a register file 258, one or more general purpose graphics processing unit (GPGPU) cores 262, and one or more load/store units 266. The GPGPU cores 262 and load/store units 266 are coupled with cache memory 272 and shared memory 270 via a memory and cache interconnect 268.

In one embodiment, the instruction cache 252 receives a stream of instructions to execute from the pipeline manager 232. The instructions are cached in the instruction cache 252 and dispatched for execution by the instruction unit 254. The instruction unit 254 can dispatch instructions as thread groups (e.g., warps), with each thread of the thread group assigned to a different execution unit within GPGPU core 262. An instruction can access any of a local, shared, or global address space by specifying an address within a unified address space. The address mapping unit 256 can be used to translate addresses in the unified address space into a distinct memory address that can be accessed by the load/store units 266.

The register file 258 provides a set of registers for the functional units of the graphics multiprocessor 234. The register file 258 provides temporary storage for operands connected to the data paths of the functional units (e.g., GPGPU cores 262, load/store units 266) of the graphics multiprocessor 234. In one embodiment, the register file 258 is divided between each of the functional units such that each functional unit is allocated a dedicated portion of the register file 258. In one embodiment, the register file 258 is divided between the different warps being executed by the graphics multiprocessor 234.

The GPGPU cores 262 can each include floating-point units (FPUs) and/or integer arithmetic logic units (ALUs) that are used to execute instructions of the graphics multiprocessor 234. The GPGPU cores 262 can be similar in architecture or can differ in architecture, according to embodiments. For example, in one embodiment, a first portion of the GPGPU cores 262 include a single precision FPU and an integer ALU while a second portion of the GPGPU cores include a double precision FPU. In one embodiment, the FPUs can implement the IEEE 754-2008 standard for floating-point arithmetic or enable variable precision floating-point arithmetic. The graphics multiprocessor 234 can additionally include one or more fixed function or special function units to perform specific functions such as copy rectangle or pixel blending operations. In one embodiment one or more of the GPGPU cores can also include fixed or special function logic.

In one embodiment, the GPGPU cores 262 include SIMD logic capable of performing a single instruction on multiple sets of data. In one embodiment GPGPU cores 262 can physically execute SIMD4, SIMD8, and SIMD16 instructions and logically execute SIMD1, SIMD2, and SIMD32 instructions. The SIMD instructions for the GPGPU cores can be generated at compile time by a shader compiler or automatically generated when executing programs written and compiled for single program multiple data (SPMD) or SIMT architectures. Multiple threads of a program configured for the SIMT execution model can be executed via a single SIMD instruction. For example and in one embodiment, eight SIMT threads that perform the same or similar operations can be executed in parallel via a single SIMD8 logic unit.

The memory and cache interconnect 268 is an interconnect network that connects each of the functional units of the graphics multiprocessor 234 to the register file 258 and to the shared memory 270. In one embodiment, the memory and cache interconnect 268 is a crossbar interconnect that allows the load/store unit 266 to implement load and store operations between the shared memory 270 and the register file 258. The register file 258 can operate at the same frequency as the GPGPU cores 262, thus data transfer between the GPGPU cores 262 and the register file 258 is very low latency. The shared memory 270 can be used to enable communication between threads that execute on the functional units within the graphics multiprocessor 234. The cache memory 272 can be used as a data cache for example, to cache texture data communicated between the functional units and the texture unit 236. The shared memory 270 can also be used as a program managed cached. Threads executing on the GPGPU cores 262 can programmatically store data within the shared memory in addition to the automatically cached data that is stored within the cache memory 272.

Figure 3A:
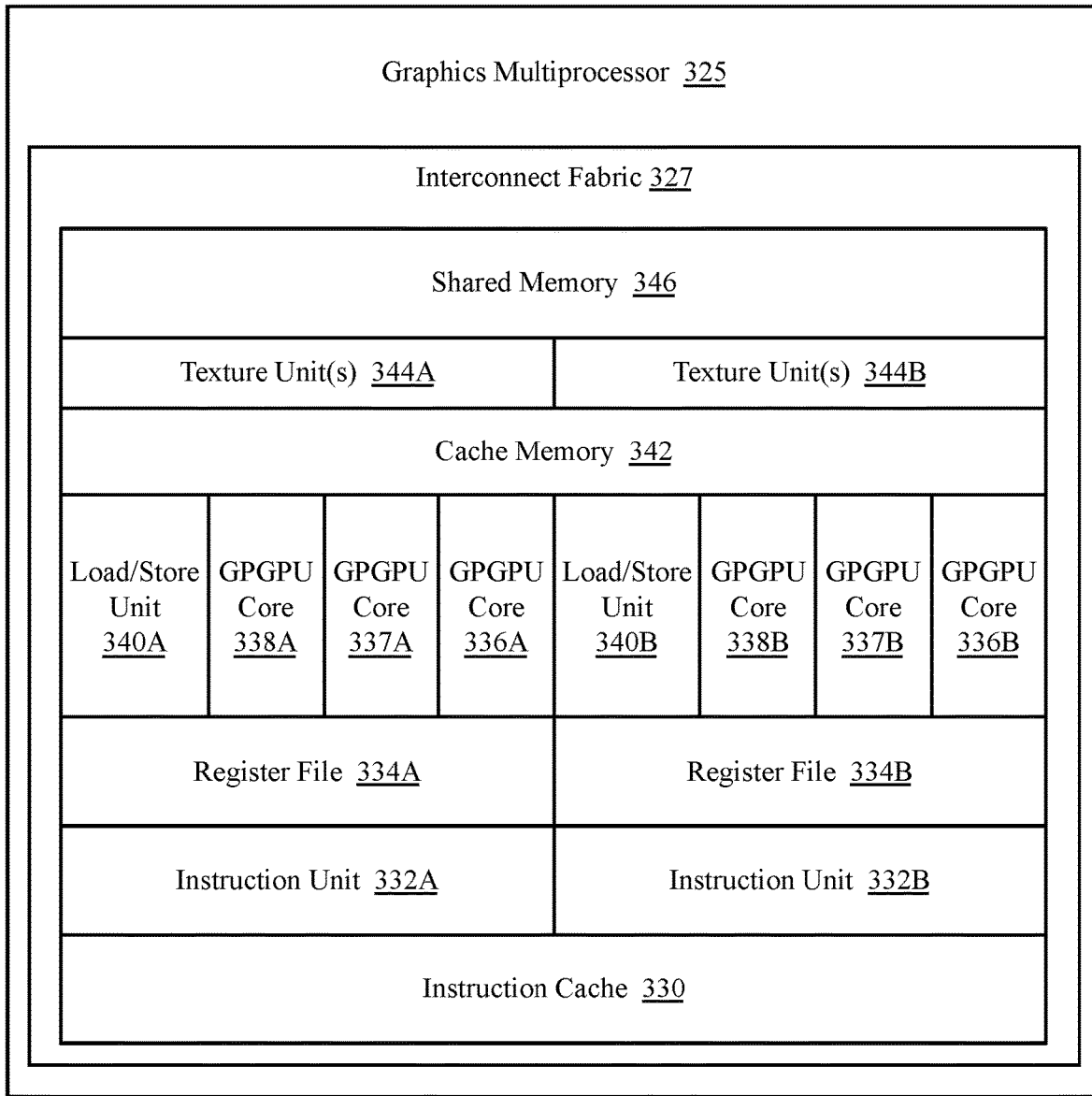
FIG. 3A-3B are block diagrams of graphics multiprocessors, according to embodiments.
Figure 3B:
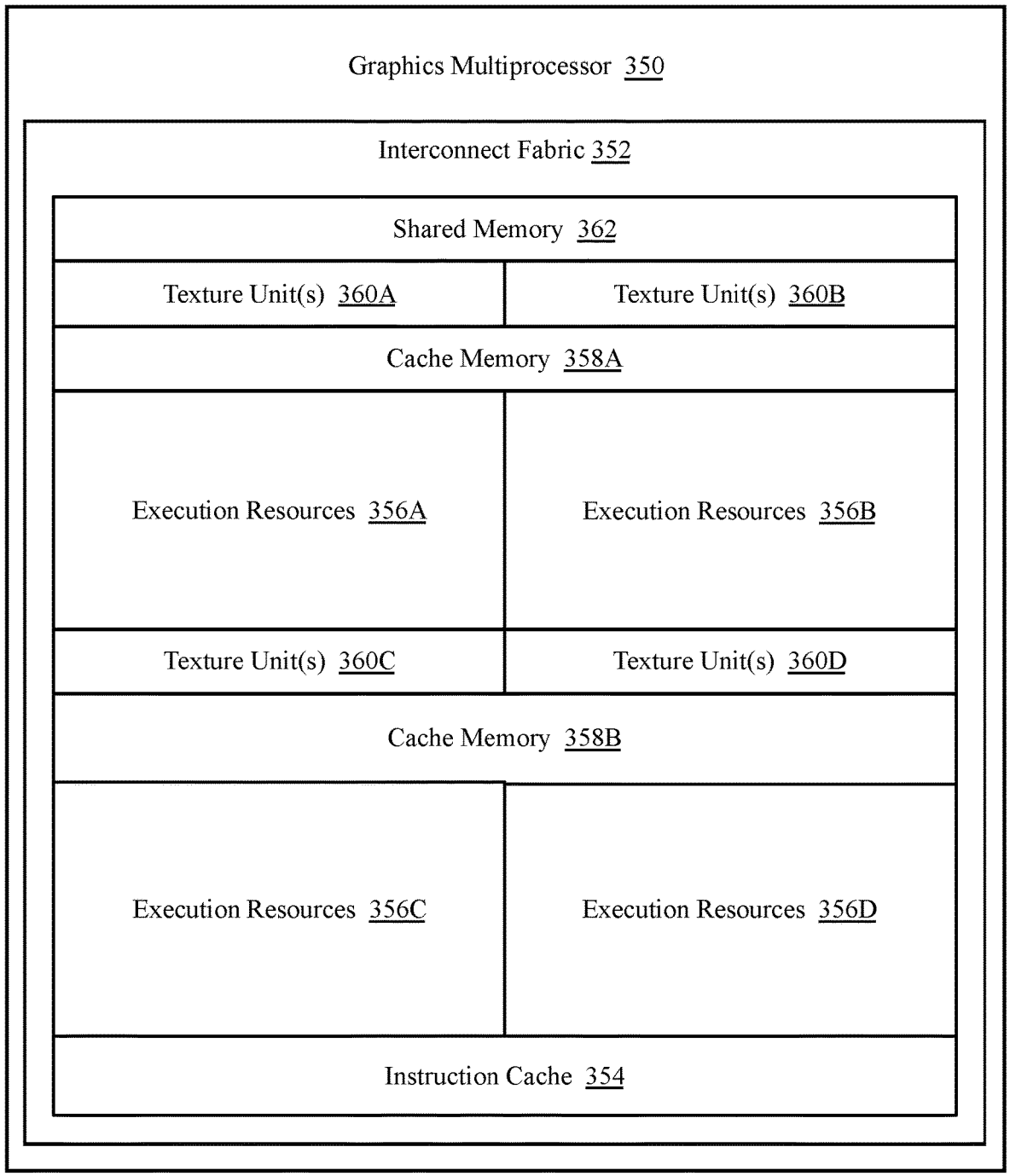

FIG. 3A-3B illustrate additional graphics multiprocessors, according to embodiments. The illustrated graphics multiprocessors 325, 350 are variants of the graphics multiprocessor 234 of FIG. 2C. The illustrated graphics multiprocessors 325, 350 can be configured as a streaming multiprocessor (SM) capable of simultaneous execution of a large number of execution threads.

FIG. 3A shows a graphics multiprocessor 325 according to an additional embodiment. The graphics multiprocessor 325 includes multiple additional instances of execution resource units relative to the graphics multiprocessor 234 of FIG. 2D. For example, the graphics multiprocessor 325 can include multiple instances of the instruction unit 332A-332B, register file 334A-334B, and texture unit(s) 344A-344B. The graphics multiprocessor 325 also includes multiple sets of graphics or compute execution units (e.g., GPGPU core 336A-336B, GPGPU core 337A-337B, GPGPU core 338A-338B) and multiple sets of load/store units 340A-340B. In one embodiment the execution resource units have a common instruction cache 330, texture and/or data cache memory 342, and shared memory 346.

The various components can communicate via an interconnect fabric 327. In one embodiment the interconnect fabric 327 includes one or more crossbar switches to enable communication between the various components of the graphics multiprocessor 325. In one embodiment the interconnect fabric 327 is a separate, high-speed network fabric layer upon which each component of the graphics multiprocessor 325 is stacked. The components of the graphics multiprocessor 325 communicate with remote components via the interconnect fabric 327. For example, the GPGPU cores 336A-336B, 337A-337B, and 3378A-338B can each communicate with shared memory 346 via the interconnect fabric 327. The interconnect fabric 327 can arbitrate communication within the graphics multiprocessor 325 to ensure a fair bandwidth allocation between components.

FIG. 3B shows a graphics multiprocessor 350 according to an additional embodiment. The graphics processor includes multiple sets of execution resources 356A-356D, where each set of execution resource includes multiple instruction units, register files, GPGPU cores, and load store units, as illustrated in FIG. 2D and FIG. 3A. The execution resources 356A-356D can work in concert with texture unit(s) 360A-360D for texture operations, while sharing an instruction cache 354, and shared memory 353. In one embodiment the execution resources 356A-356D can share an instruction cache 354 and shared memory 353, as well as multiple instances of a texture and/or data cache memory 358A-358B. The various components can communicate via an interconnect fabric 352 similar to the interconnect fabric 327 of FIG. 3A.

Persons skilled in the art will understand that the architecture described in FIGS. 1, 2A-2D, and 3A-3B are descriptive and not limiting as to the scope of the present embodiments. Thus, the techniques described herein may be implemented on any properly configured processing unit, including, without limitation, one or more mobile application processors, one or more desktop or server central processing units (CPUs) including multi-core CPUs, one or more parallel processing units, such as the parallel processing unit 202 of FIG. 2A, as well as one or more graphics processors or special purpose processing units, without departure from the scope of the embodiments described herein.

In some embodiments a parallel processor or GPGPU as described herein is communicatively coupled to host/processor cores to accelerate graphics operations, machine-learning operations, pattern analysis operations, and various general purpose GPU (GPGPU) functions. The GPU may be communicatively coupled to the host processor/cores over a bus or other interconnect (e.g., a high-speed interconnect such as PCIe or NVLink). In other embodiments, the GPU may be integrated on the same package or chip as the cores and communicatively coupled to the cores over an internal processor bus/interconnect (i.e., internal to the package or chip). Regardless of the manner in which the GPU is connected, the processor cores may allocate work to the GPU in the form of sequences of commands/instructions contained in a work descriptor. The GPU then uses dedicated circuitry/logic for efficiently processing these commands/instructions.

Techniques for GPU to Host Processor Interconnection

Figure 4A:
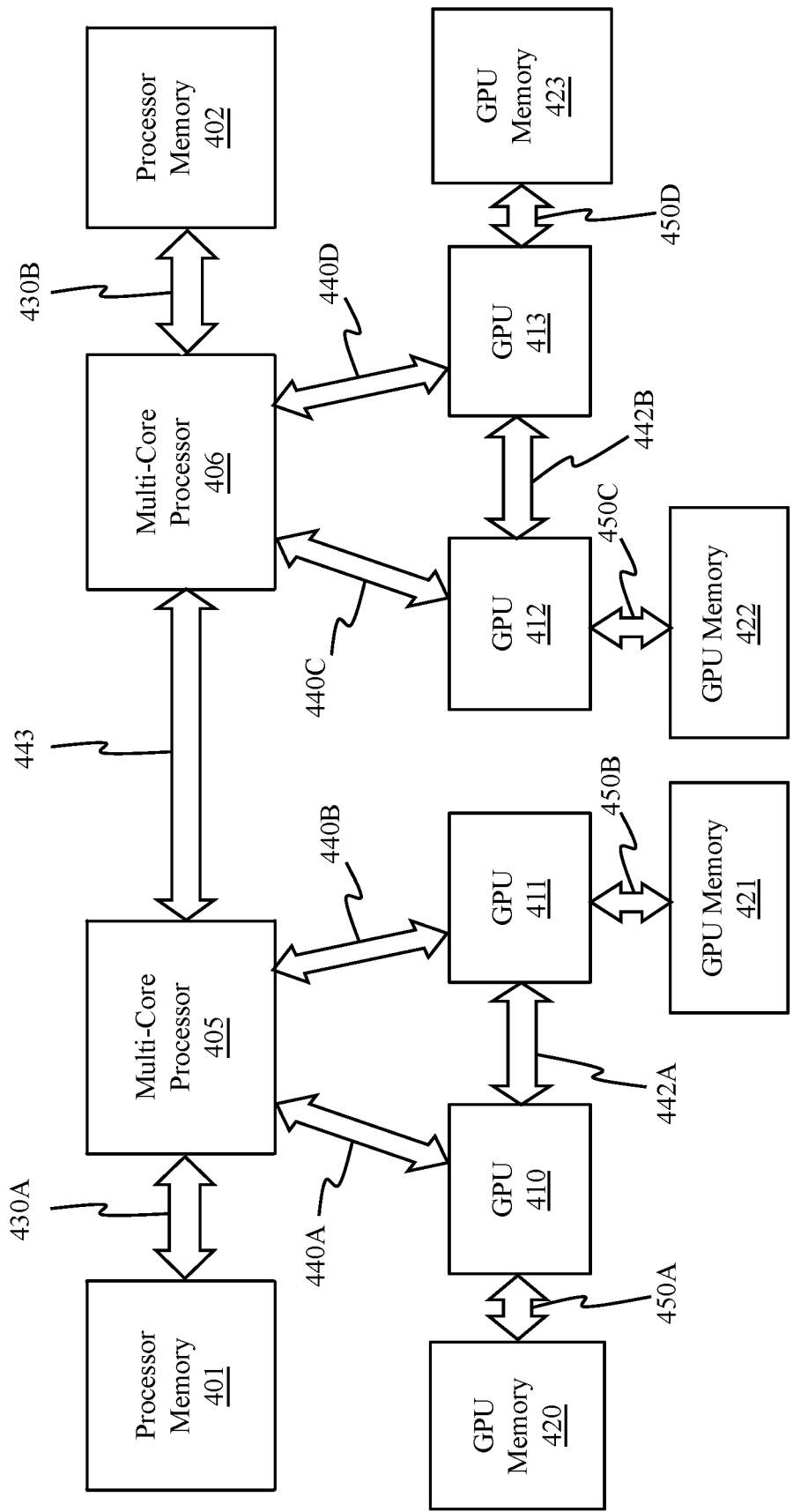
FIG. 4A-4F illustrate an exemplary architecture in which a plurality of GPUs is communicatively coupled to a plurality of multi-core processors.

FIG. 4A illustrates an exemplary architecture in which a plurality of GPUs 410-413 is communicatively coupled to a plurality of multi-core processors 405-406 over high-speed links 440A-440D (e.g., buses, point-to-point interconnects, etc.). In one embodiment, the high-speed links 440A-440D support a communication throughput of 4 GB/s, 30 GB/s, 80 GB/s or higher, depending on the implementation. Various interconnect protocols may be used including, but not limited to, PCIe 4.0 or 5.0 and NVLink (e.g., NVLink 1.0, NVLink 2.0, or another Nvidia high-speed signaling interconnect (NVHS)). However, the underlying principles of the invention are not limited to any particular communication protocol or throughput.

In addition, in one embodiment, two or more of the GPUs 410-413 are interconnected over high-speed links 442A-442B, which may be implemented using the same or different protocols/links than those used for high-speed links 440A-440D. Similarly, two or more of the multi-core processors 405-406 may be connected over high speed link 443 which may be symmetric multi-processor (SMP) buses operating at 20 GB/s, 30 GB/s, 120 GB/s or higher. Alternatively, all communication between the various system components shown in FIG. 4A may be accomplished using the same protocols/links (e.g., over a common interconnection fabric). As mentioned, however, the underlying principles of the invention are not limited to any particular type of interconnect technology.

In one embodiment, each multi-core processor 405-406 is communicatively coupled to a processor memory 401-402, via memory interconnects 430A-430B, respectively, and each GPU 410-413 is communicatively coupled to GPU memory 420-423 over GPU memory interconnects 450A-450D, respectively. The memory interconnects 430A-430B and 450A-450D may utilize the same or different memory access technologies. By way of example, and not limitation, the processor memories 401-402 and GPU memories 420-423 may be volatile memories such as dynamic random access memories (DRAMs) (including stacked DRAMs), Graphics DDR SDRAM (GDDR) (e.g., GDDR5, GDDR6), or High Bandwidth Memory (HBM) and/or may be non-volatile memories such as 3D XPoint or Nano-Ram. In one embodiment, some portion of the memories may be volatile memory and another portion may be non-volatile memory (e.g., using a two-level memory (2LM) hierarchy).

As described below, although the various processors 405-406 and GPUs 410-413 may be physically coupled to a particular memory 401-402, 420-423, respectively, a unified memory architecture may be implemented in which the same virtual system address space (also referred to as the "effective address" space) is distributed among all of the various physical memories. For example, processor memories 401-402 may each comprise 64 GB of the system memory address space and GPU memories 420-423 may each comprise 32 GB of the system memory address space (resulting in a total of 256 GB addressable memory in this example).

Figure 4B:
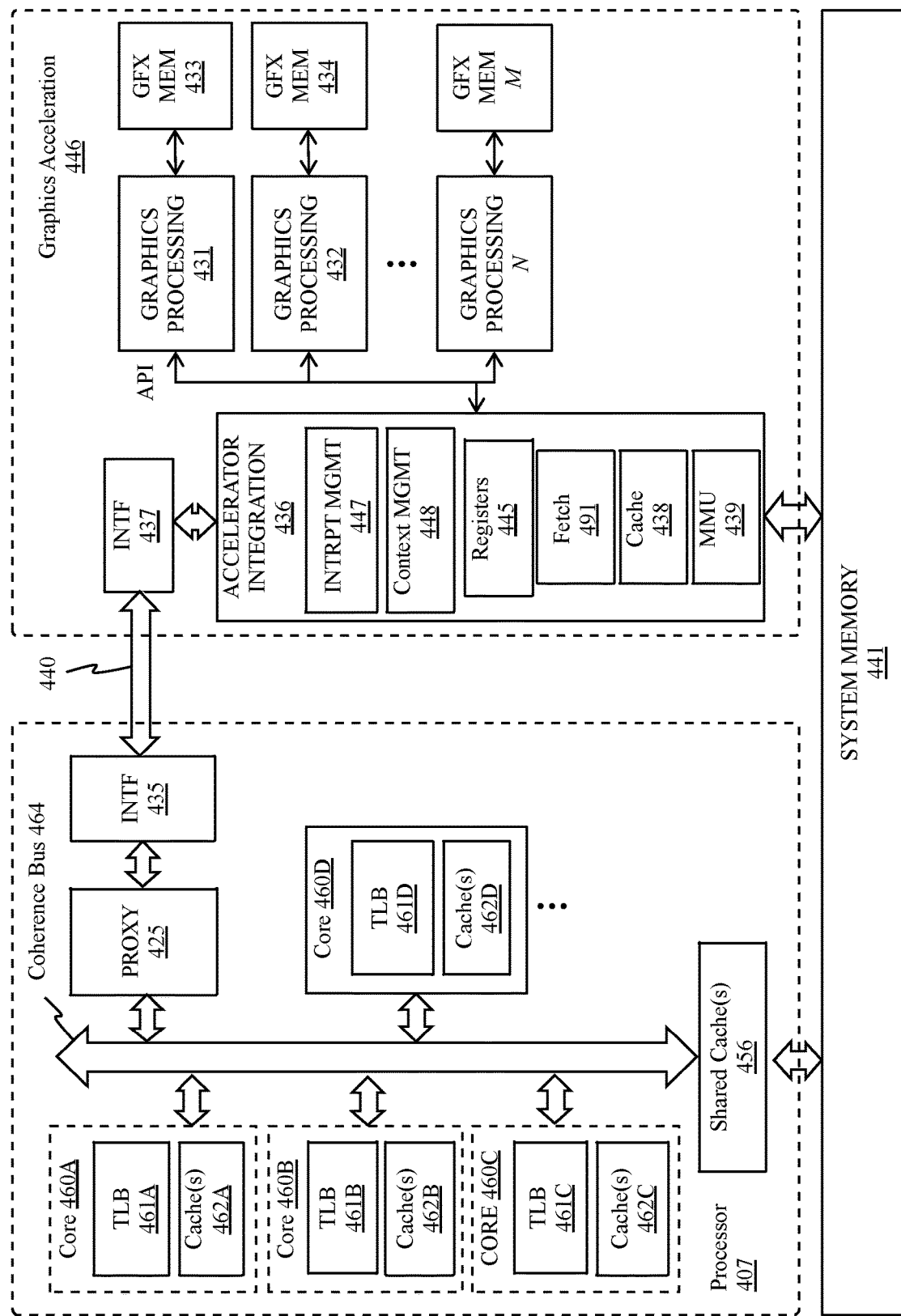

FIG. 4B illustrates additional details for an interconnection between a multi-core processor 407 and a graphics acceleration module 446 in accordance with one embodiment. The graphics acceleration module 446 may include one or more GPU chips integrated on a line card which is coupled to the processor 407 via the high-speed link 440. Alternatively, the graphics acceleration module 446 may be integrated on the same package or chip as the processor 407.

The illustrated processor 407 includes a plurality of cores 460A-460D, each with a translation lookaside buffer 461A-461D and one or more caches 462A-462D. The cores may include various other components for executing instructions and processing data which are not illustrated to avoid obscuring the underlying principles of the invention (e.g., instruction fetch units, branch prediction units, decoders, execution units, reorder buffers, etc.). The caches 462A-462D may comprise level 1 (L1) and level 2 (L2) caches. In addition, one or more shared caches 456 may be included in the caching hierarchy and shared by sets of the cores 460A-460D. For example, one embodiment of the processor 407 includes 24 cores, each with its own L1 cache, twelve shared L2 caches, and twelve shared L3 caches. In this embodiment, one of the L2 and L3 caches are shared by two adjacent cores. The processor 407 and the graphics accelerator integration module 446 connect with system memory 441, which may include processor memories 401-402.

Coherency is maintained for data and instructions stored in the various caches 462A-462D, 456 and system memory 441 via inter-core communication over a coherence bus 464. For example, each cache may have cache coherency logic/circuitry associated therewith to communicate to over the coherence bus 464 in response to detected reads or writes to particular cache lines. In one implementation, a cache snooping protocol is implemented over the coherence bus 464 to snoop cache accesses. Cache snooping/coherency techniques are well understood by those of skill in the art and will not be described in detail here to avoid obscuring the underlying principles of the invention.

In one embodiment, a proxy circuit 425 communicatively couples the graphics acceleration module 446 to the coherence bus 464, allowing the graphics acceleration module 446 to participate in the cache coherence protocol as a peer of the cores. In particular, an interface 435 provides connectivity to the proxy circuit 425 over high-speed link 440 (e.g., a PCIe bus, NVLink, etc.) and an interface 437 connects the graphics acceleration module 446 to the high-speed link 440.

In one implementation, an accelerator integration circuit 436 provides cache management, memory access, context management, and interrupt management services on behalf of a plurality of graphics processing engines 431, 432, N of the graphics acceleration module 446. The graphics processing engines 431, 432, N may each comprise a separate graphics processing unit (GPU). Alternatively, the graphics processing engines 431, 432, N may comprise different types of graphics processing engines within a GPU such as graphics execution units, media processing engines (e.g., video encoders/decoders), samplers, and blit engines. In other words, the graphics acceleration module may be a GPU with a plurality of graphics processing engines 431-432, N or the graphics processing engines 431-432, N may be individual GPUs integrated on a common package, line card, or chip.

In one embodiment, the accelerator integration circuit 436 includes a memory management unit (MMU) 439 for performing various memory management functions such as virtual-to-physical memory translations (also referred to as effective-to-real memory translations) and memory access protocols for accessing system memory 441. The MMU 439 may also include a translation lookaside buffer (TLB) (not shown) for caching the virtual/effective to physical/real address translations. In one embodiment, the accelerator integration circuit 436 includes a fetch unit 491 to fetch commands, instructions, work descriptors, etc., that define operations to be performed. In one implementation, a cache 438 stores commands and data for efficient access by the graphics processing engines 431-432, N. In one embodiment, the data stored in cache 438 and graphics memories 433-434, M is kept coherent with the core caches 462A-462D, 456 and system memory 441. As mentioned, this may be accomplished via proxy circuit 425 which takes part in the cache coherency mechanism on behalf of cache 438 and memories 433-434, M (e.g., sending updates to the cache 438 related to modifications/accesses of cache lines on processor caches 462A-462D, 456 and receiving updates from the cache 438).

A set of registers 445 store context data for threads executed by the graphics processing engines 431-432, N and a context management circuit 448 manages the thread contexts. For example, the context management circuit 448 may perform save and restore operations to save and restore contexts of the various threads during contexts switches (e.g., where a first thread is saved and a second thread is stored so that the second thread can be execute by a graphics processing engine). For example, on a context switch, the context management circuit 448 may store current register values to a designated region in memory (e.g., identified by a context pointer). It may then restore the register values when returning to the context. In one embodiment, an interrupt management circuit 447 receives and processes interrupts received from system devices.

In one implementation, virtual/effective addresses from a graphics processing engine 431 are translated to real/physical addresses in system memory 441 by the MMU 439. One embodiment of the accelerator integration circuit 436 supports multiple (e.g., 4, 8, 16) graphics accelerator modules 446 and/or other accelerator devices. The graphics accelerator module 446 may be dedicated to a single application executed on the processor 407 or may be shared between multiple applications. In one embodiment, a virtualized graphics execution environment is presented in which the resources of the graphics processing engines 431-432, N are shared with multiple applications or virtual machines (VMs). The resources may be subdivided into "slices" which are allocated to different VMs and/or applications based on the processing requirements and priorities associated with the VMs and/or applications.

Thus, the accelerator integration circuit acts as a bridge to the system for the graphics acceleration module 446 and provides address translation and system memory cache services. In addition, the accelerator integration circuit 436 may provide virtualization facilities for the host processor to manage virtualization of the graphics processing engines, interrupts, and memory management.

Because hardware resources of the graphics processing engines 431-432, N are mapped explicitly to the real address space seen by the host processor 407, any host processor can address these resources directly using an effective address value. One function of the accelerator integration circuit 436, in one embodiment, is the physical separation of the graphics processing engines 431-432, N so that they appear to the system as independent units.

As mentioned, in the illustrated embodiment, one or more graphics memories 433-434, M are coupled to each of the graphics processing engines 431-432, N, respectively. The graphics memories 433-434, M store instructions and data being processed by each of the graphics processing engines 431-432, N. The graphics memories 433-434, M may be volatile memories such as DRAMs (including stacked DRAMs), GDDR memory (e.g., GDDR5, GDDR6), or HBM, and/or may be non-volatile memories such as 3D XPoint or Nano-Ram.

In one embodiment, to reduce data traffic over the high-speed link 440, biasing techniques are used to ensure that the data stored in graphics memories 433-434, M is data which will be used most frequently by the graphics processing engines 431-432, N and preferably not used by the cores 460A-460D (at least not frequently). Similarly, the biasing mechanism attempts to keep data needed by the cores (and preferably not the graphics processing engines 431-432, N) within the caches 462A-462D, 456 of the cores and system memory 441.

Figure 4C:
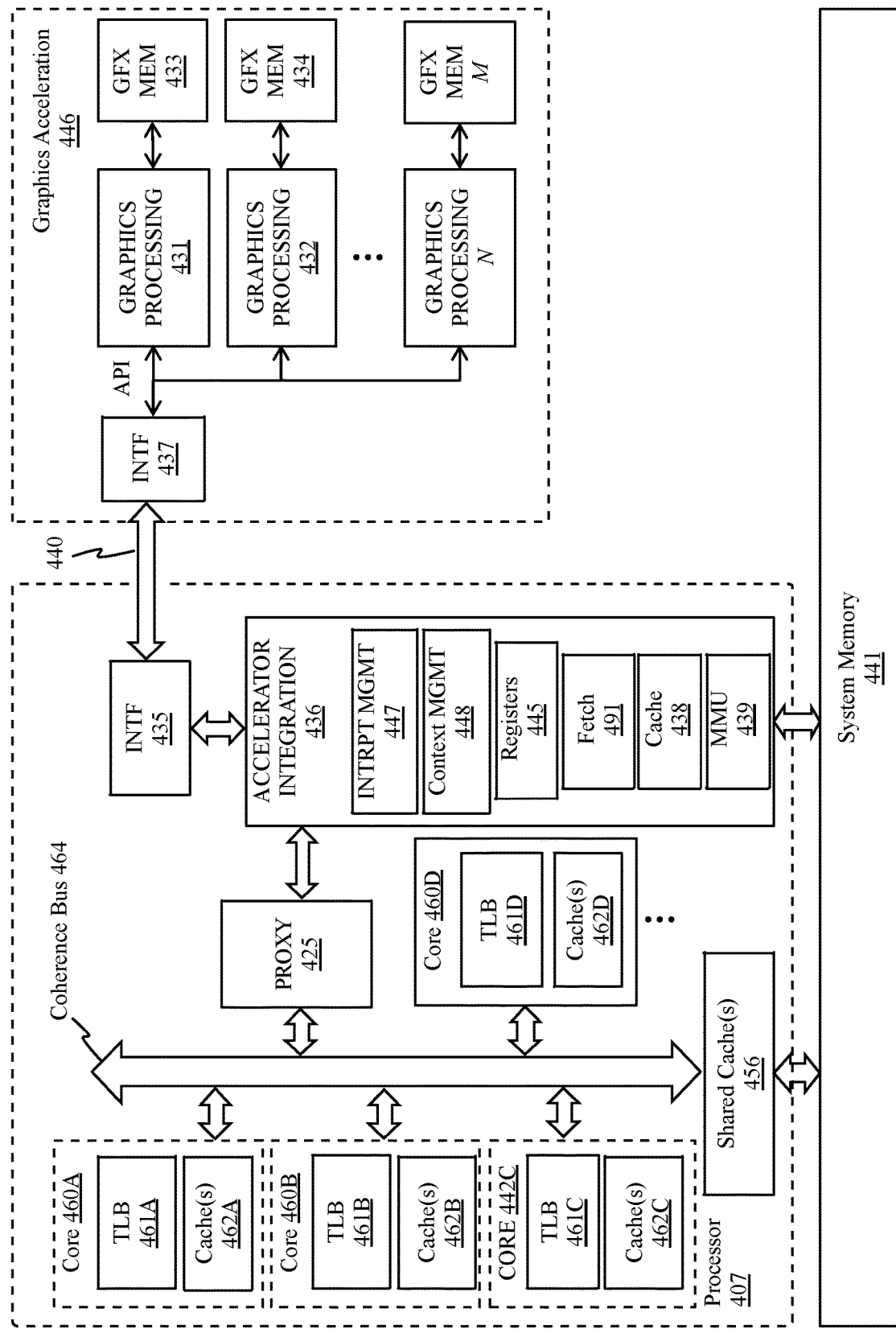

FIG. 4C illustrates another embodiment in which the accelerator integration circuit 436 is integrated within the processor 407. In this embodiment, the graphics processing engines 431-432, N communicate directly over the high-speed link 440 to the accelerator integration circuit 436 via interface 437 and interface 435 (which, again, may be utilize any form of bus or interface protocol). The accelerator integration circuit 436 may perform the same operations as those described with respect to FIG. 4B, but potentially at a higher throughput given its close proximity to the coherence bus 464 and caches 462A-462D, 456.

One embodiment supports different programming models including a dedicated-process programming model (no graphics acceleration module virtualization) and shared programming models (with virtualization). The latter may include programming models which are controlled by the accelerator integration circuit 436 and programming models which are controlled by the graphics acceleration module 446.

In one embodiment of the dedicated process model, graphics processing engines 431-432, N are dedicated to a single application or process under a single operating system. The single application can funnel other application requests to the graphics engines 431-432, N, providing virtualization within a VM/partition.

In the dedicated-process programming models, the graphics processing engines 431-432, N, may be shared by multiple VM/application partitions. The shared models require a system hypervisor to virtualize the graphics processing engines 431-432, N to allow access by each operating system. For single-partition systems without a hypervisor, the graphics processing engines 431-432, N are owned by the operating system. In both cases, the operating system can virtualize the graphics processing engines 431-432, N to provide access to each process or application.

For the shared programming model, the graphics acceleration module 446 or an individual graphics processing engine 431-432, N selects a process element using a process handle. In one embodiment, process elements are stored in system memory 441 and are addressable using the effective address to real address translation techniques described herein. The process handle may be an implementation-specific value provided to the host process when registering its context with the graphics processing engine 431-432, N (that is, calling system software to add the process element to the process element linked list). The lower 16-bits of the process handle may be the offset of the process element within the process element linked list.

Figure 4D:
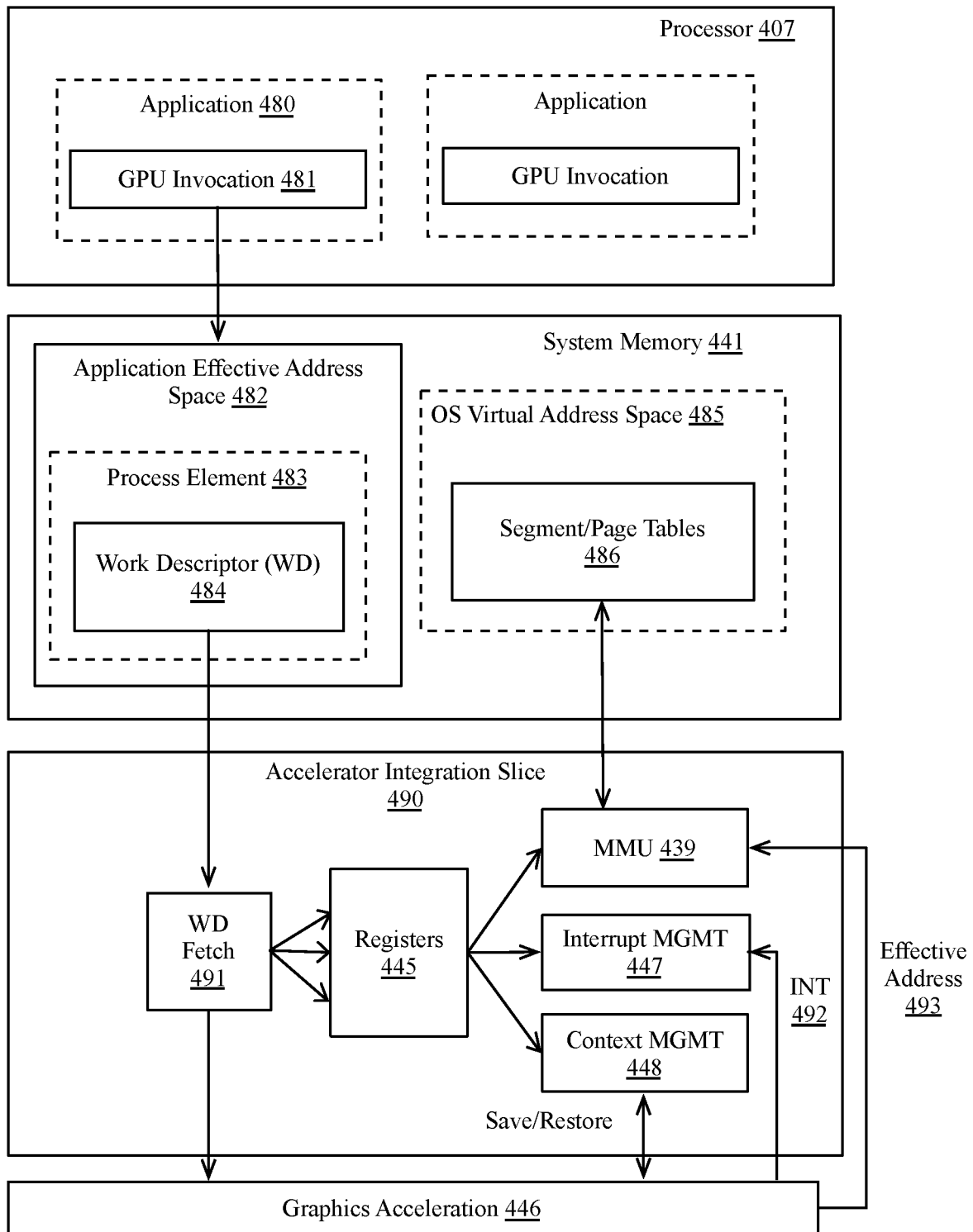

FIG. 4D illustrates an exemplary accelerator integration slice 490. As used herein, a "slice" comprises a specified portion of the processing resources of the accelerator integration circuit 436. Application effective address space 482 within system memory 441 stores process elements 483. In one embodiment, the process elements 483 are stored in response to GPU invocations 481 from applications 480 executed on the processor 407. A process element 483 contains the process state for the corresponding application 480. A work descriptor (WD) 484 contained in the process element 483 can be a single job requested by an application or may contain a pointer to a queue of jobs. In the latter case, the WD 484 is a pointer to the job request queue in the application's address space 482.

The graphics acceleration module 446 and/or the individual graphics processing engines 431-432, N can be shared by all or a subset of the processes in the system. Embodiments of the invention include an infrastructure for setting up the process state and sending a WD 484 to a graphics acceleration module 446 to start a job in a virtualized environment.

In one implementation, the dedicated-process programming model is implementation-specific. In this model, a single process owns the graphics acceleration module 446 or an individual graphics processing engine 431. Because the graphics acceleration module 446 is owned by a single process, the hypervisor initializes the accelerator integration circuit 436 for the owning partition and the operating system initializes the accelerator integration circuit 436 for the owning process at the time when the graphics acceleration module 446 is assigned.

In operation, a WD fetch unit 491 in the accelerator integration slice 490 fetches the next WD 484 which includes an indication of the work to be done by one of the graphics processing engines of the graphics acceleration module 446. Data from the WD 484 may be stored in registers 445 and used by the MMU 439, interrupt management circuit 447 and/or context management circuit 448 as illustrated. For example, one embodiment of the MMU 439 includes segment/page walk circuitry for accessing segment/page tables 486 within the OS virtual address space 485. The interrupt management circuit 447 may process interrupt events 492 received from the graphics acceleration module 446. When performing graphics operations, an effective address 493 generated by a graphics processing engine 431-432, N is translated to a real address by the MMU 439.

In one embodiment, the same set of registers 445 are duplicated for each graphics processing engine 431-432, N and/or graphics acceleration module 446 and may be initialized by the hypervisor or operating system. Each of these duplicated registers may be included in an accelerator integration slice 490. Exemplary registers that may be initialized by the hypervisor are shown in Table 1.

TABLE 1

| | Hypervisor Initialized Registers |
|---|---|
| 1 | Slice Control Register |
| 2 | Real Address (RA) Scheduled Processes Area Pointer |
| 3 | Authority Mask Override Register |
| 4 | Interrupt Vector Table Entry Offset |
| 5 | Interrupt Vector Table Entry Limit |
| 6 | State Register |
| 7 | Logical Partition ID |
| 8 | Real address (RA) Hypervisor Accelerator Utilization Record Pointer |
| 9 | Storage Description Register |

Exemplary registers that may be initialized by the operating system are shown in Table 2.

TABLE 2

| | Operating System Initialized Registers |
|---|---|
| 1 | Process and Thread Identification |
| 2 | Effective Address (EA) Context Save/Restore Pointer |
| 3 | Virtual Address (VA) Accelerator Utilization Record Pointer |
| 4 | Virtual Address (VA) Storage Segment Table Pointer |
| 5 | Authority Mask |
| 6 | Work descriptor |

In one embodiment, each WD 484 is specific to a particular graphics acceleration module 446 and/or graphics processing engine 431-432, N. It contains all the information a graphics processing engine 431-432, N requires to do its work or it can be a pointer to a memory location where the application has set up a command queue of work to be completed.

Figure 4E:
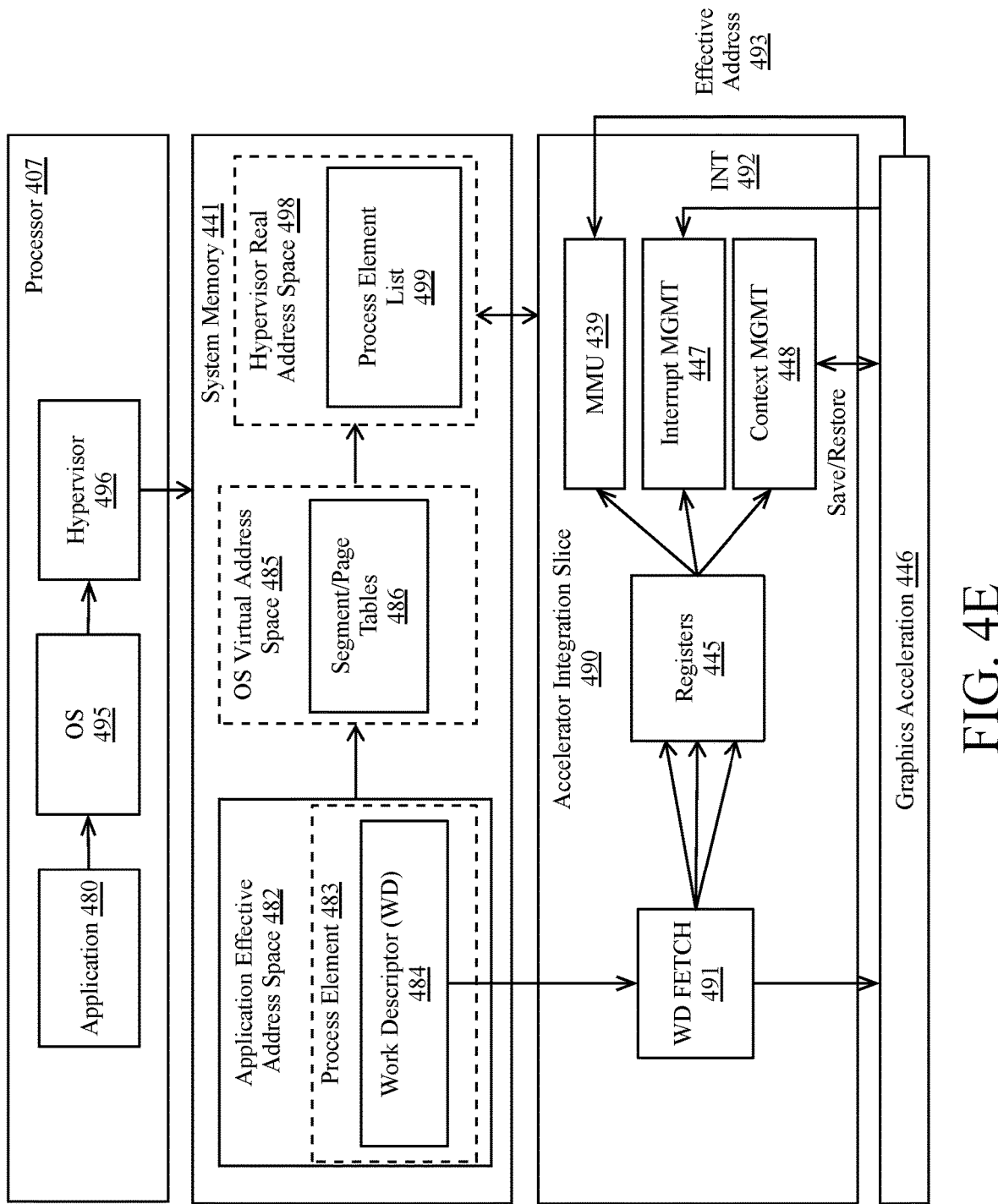

FIG. 4E illustrates additional details for one embodiment of a shared model. This embodiment includes a hypervisor real address space 498 in which a process element list 499 is stored. The hypervisor real address space 498 is accessible via a hypervisor 496 which virtualizes the graphics acceleration module engines for the operating system 495.

The shared programming models allow for all or a subset of processes from all or a subset of partitions in the system to use a graphics acceleration module 446. There are two programming models where the graphics acceleration module 446 is shared by multiple processes and partitions: time-sliced shared and graphics directed shared.

In this model, the system hypervisor 496 owns the graphics acceleration module 446 and makes its function available to all operating systems 495. For a graphics acceleration module 446 to support virtualization by the system hypervisor 496, the graphics acceleration module 446 may adhere to the following requirements: 1) An application's job request must be autonomous (that is, the state does not need to be maintained between jobs), or the graphics acceleration module 446 must provide a context save and restore mechanism. 2) An application's job request is guaranteed by the graphics acceleration module 446 to complete in a specified amount of time, including any translation faults, or the graphics acceleration module 446 provides the ability to preempt the processing of the job. 3) The graphics acceleration module 446 must be guaranteed fairness between processes when operating in the directed shared programming model.

In one embodiment, for the shared model, the application 480 is required to make an operating system 495 system call with a graphics acceleration module 446 type, a work descriptor (WD), an authority mask register (AMR) value, and a context save/restore area pointer (CSRP). The graphics acceleration module 446 type describes the targeted acceleration function for the system call. The graphics acceleration module 446 type may be a system-specific value. The WD is formatted specifically for the graphics acceleration module 446 and can be in the form of a graphics acceleration module 446 command, an effective address pointer to a user-defined structure, an effective address pointer to a queue of commands, or any other data structure to describe the work to be done by the graphics acceleration module 446. In one embodiment, the AMR value is the AMR state to use for the current process. The value passed to the operating system is similar to an application setting the AMR. If the accelerator integration circuit 436 and graphics acceleration module 446 implementations do not support a User Authority Mask Override Register (UAMOR), the operating system may apply the current UAMOR value to the AMR value before passing the AMR in the hypervisor call. The hypervisor 496 may optionally apply the current Authority Mask Override Register (AMOR) value before placing the AMR into the process element 483. In one embodiment, the CSRP is one of the registers 445 containing the effective address of an area in the application's address space 482 for the graphics acceleration module 446 to save and restore the context state. This pointer is optional if no state is required to be saved between jobs or when a job is preempted. The context save/restore area may be pinned system memory.

Upon receiving the system call, the operating system 495 may verify that the application 480 has registered and been given the authority to use the graphics acceleration module 446. The operating system 495 then calls the hypervisor 496 with the information shown in Table 3.

TABLE 3

OS to Hypervisor Call Parameters

| | |
|---|---|
| 1 | A work descriptor (WD) |
| 2 | An Authority Mask Register (AMR) value (potentially masked). |
| 3 | An effective address (EA) Context Save/Restore Area Pointer (CSRP) |
| 4 | A process ID (PID) and optional thread ID (TID) |
| 5 | A virtual address (VA) accelerator utilization record pointer (AURP) |
| 6 | The virtual address of the storage segment table pointer (SSTP) |
| 7 | A logical interrupt service number (LISN) |

Upon receiving the hypervisor call, the hypervisor 496 verifies that the operating system 495 has registered and been given the authority to use the graphics acceleration module 446. The hypervisor 496 then puts the process element 483 into the process element linked list for the corresponding graphics acceleration module 446 type. The process element may include the information shown in Table 4.

TABLE 4

Process Element Information

| | |
|---|---|
| 1 | A work descriptor (WD) |
| 2 | An Authority Mask Register (AMR) value (potentially masked). |
| 3 | An effective address (EA) Context Save/Restore Area Pointer (CSRP) |
| 4 | A process ID (PID) and optional thread ID (TID) |
| 5 | A virtual address (VA) accelerator utilization record pointer (AURP) |
| 6 | The virtual address of the storage segment table pointer (SSTP) |

TABLE 4-continued

Process Element Information

| | |
|---|---|
| 7 | A logical interrupt service number (LISN) |
| 8 | Interrupt vector table, derived from the hypervisor call parameters. |
| 9 | A state register (SR) value |
| 10 | A logical partition ID (LPID) |
| 11 | A real address (RA) hypervisor accelerator utilization record pointer |
| 12 | The Storage Descriptor Register (SDR) |

In one embodiment, the hypervisor initializes a plurality of accelerator integration slice 490 registers 445.

Figure 4F:
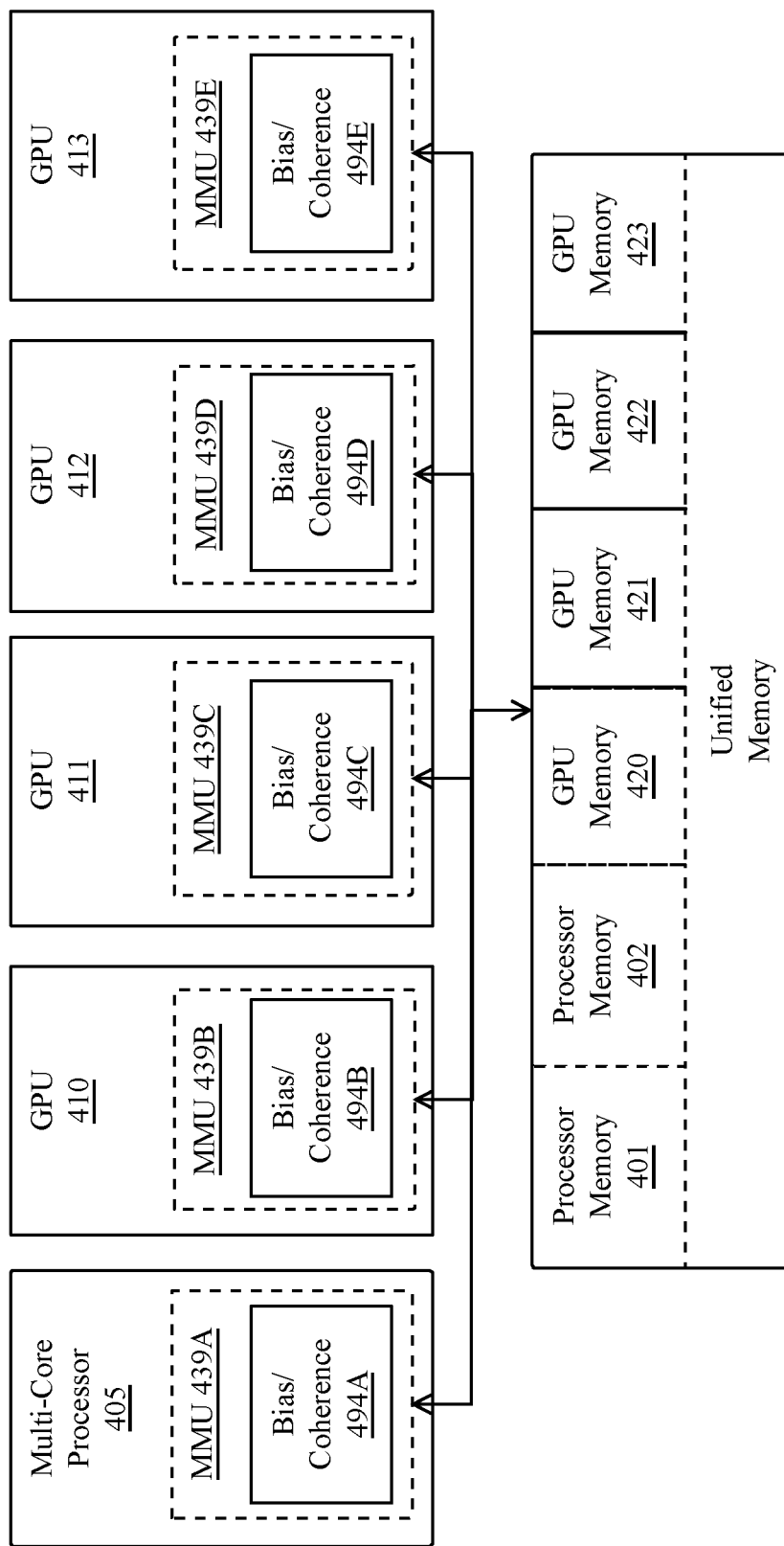

As illustrated in FIG. 4F, one embodiment of the invention employs a unified memory addressable via a common virtual memory address space used to access the physical processor memories 401-402 and GPU memories 420-423. In this implementation, operations executed on the GPUs 410-413 utilize the same virtual/effective memory address space to access the processors memories 401-402 and vice versa, thereby simplifying programmability. In one embodiment, a first portion of the virtual/effective address space is allocated to the processor memory 401, a second portion to the second processor memory 402, a third portion to the GPU memory 420, and so on. The entire virtual/effective memory space (sometimes referred to as the effective address space) is thereby distributed across each of the processor memories 401-402 and GPU memories 420-423, allowing any processor or GPU to access any physical memory with a virtual address mapped to that memory.

In one embodiment, bias/coherence management circuitry 494A-494E within one or more of the MMNUs 439A-439E ensures cache coherence between the caches of the host processors (e.g., 405) and the GPUs 410-413 and implements biasing techniques indicating the physical memories in which certain types of data should be stored. While multiple instances of bias/coherence management circuitry 494A-494E are illustrated in FIG. 4F, the bias/coherence circuitry may be implemented within the MMU of one or more host processors 405 and/or within the accelerator integration circuit 436.

One embodiment allows GPU-attached memory 420-423 to be mapped as part of system memory, and accessed using shared virtual memory (SVM) technology, but without suffering the typical performance drawbacks associated with full system cache coherence. The ability to GPU-attached memory 420-423 to be accessed as system memory without onerous cache coherence overhead provides a beneficial operating environment for GPU offload. This arrangement allows the host processor 405 software to setup operands and access computation results, without the overhead of tradition I/O DMA data copies. Such traditional copies involve driver calls, interrupts and memory mapped I/O (MMIO) accesses that are all inefficient relative to simple memory accesses. At the same time, the ability to access GPU attached memory 420-423 without cache coherence overheads can be critical to the execution time of an off-loaded computation. In cases with substantial streaming write memory traffic, for example, cache coherence overhead can significantly reduce the effective write bandwidth seen by a GPU 410-413. The efficiency of operand setup, the efficiency of results access, and the efficiency of GPU computation all play a role in determining the effectiveness of GPU offload.

In one implementation, the selection of between GPU bias and host processor bias is driven by a bias tracker data structure. A bias table may be used, for example, which may be a page-granular structure (i.e., controlled at the granularity of a memory page) that includes 1 or 2 bits per GPU-attached memory page. The bias table may be implemented in a stolen memory range of one or more GPU-attached memories 420-423, with or without a bias cache in the GPU 410-413 (e.g., to cache frequently/recently used entries of the bias table). Alternatively, the entire bias table may be maintained within the GPU.

In one implementation, the bias table entry associated with each access to the GPU-attached memory 420-423 is accessed prior the actual access to the GPU memory, causing the following operations. First, local requests from the GPU 410-413 that find their page in GPU bias are forwarded directly to a corresponding GPU memory 420-423. Local requests from the GPU that find their page in host bias are forwarded to the processor 405 (e.g., over a high-speed link as discussed above). In one embodiment, requests from the processor 405 that find the requested page in host processor bias complete the request like a normal memory read. Alternatively, requests directed to a GPU-biased page may be forwarded to the GPU 410-413. The GPU may then transition the page to a host processor bias if it is not currently using the page.

The bias state of a page can be changed either by a software-based mechanism, a hardware-assisted software-based mechanism, or, for a limited set of cases, a purely hardware-based mechanism.

One mechanism for changing the bias state employs an API call (e.g. OpenCL), which, in turn, calls the GPU's device driver which, in turn, sends a message (or enqueues a command descriptor) to the GPU directing it to change the bias state and, for some transitions, perform a cache flushing operation in the host. The cache flushing operation is required for a transition from host processor 405 bias to GPU bias, but is not required for the opposite transition.

In one embodiment, cache coherency is maintained by temporarily rendering GPU-biased pages uncacheable by the host processor 405. To access these pages, the processor 405 may request access from the GPU 410 which may or may not grant access right away, depending on the implementation. Thus, to reduce communication between the host processor 405 and GPU 410 it is beneficial to ensure that GPU-biased pages are those which are required by the GPU but not the host processor 405 and vice versa.

Graphics Processing Pipeline

Figure 5:
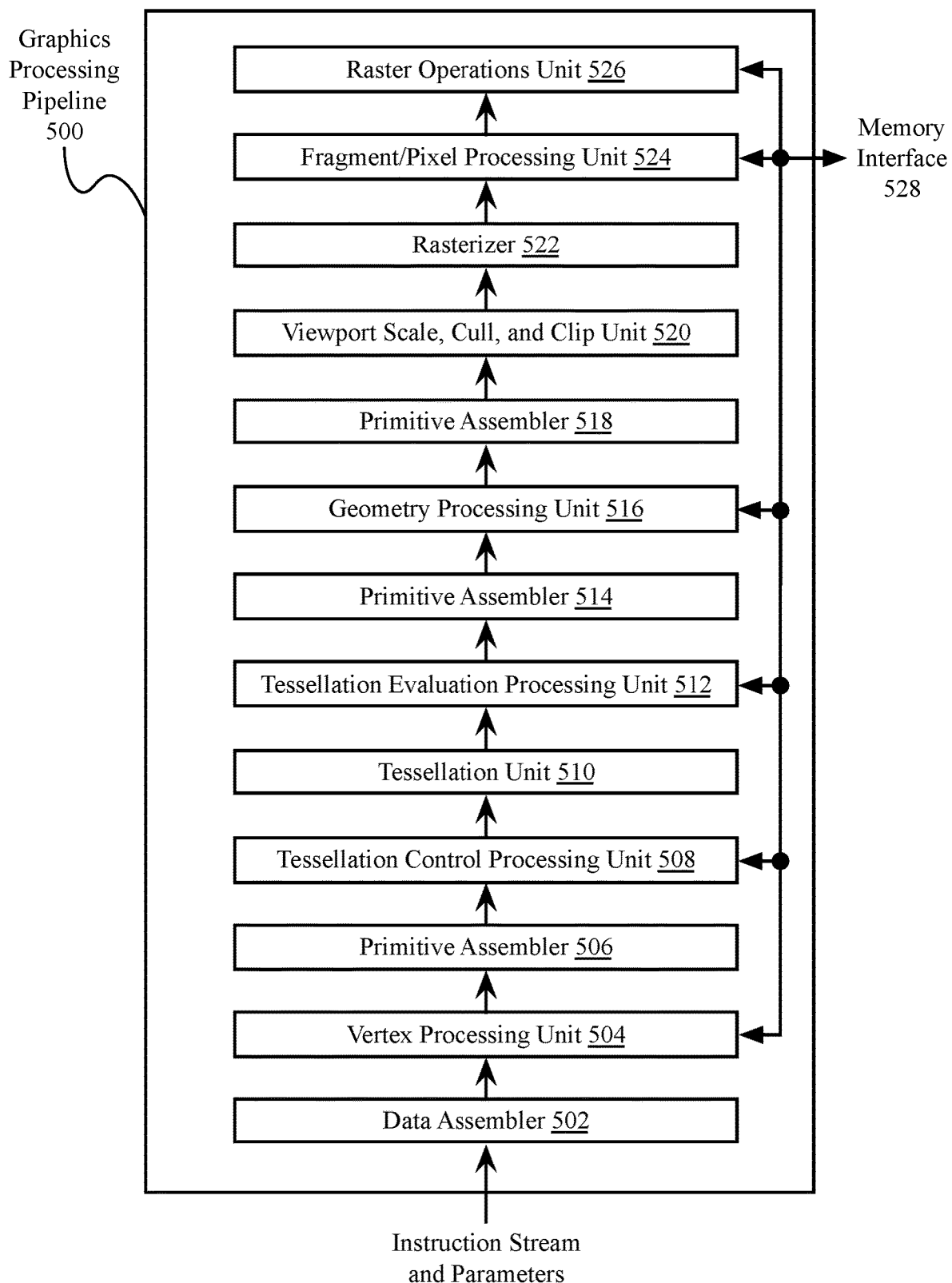
FIG. 5 illustrates a graphics processing pipeline, according to an embodiment.

FIG. 5 illustrates a graphics processing pipeline 500, according to an embodiment. In one embodiment a graphics processor can implement the illustrated graphics processing pipeline 500. The graphics processor can be included within the parallel processing subsystems as described herein, such as the parallel processor 200 of FIG. 2A, which, in one embodiment, is a variant of the parallel processor(s) 112 of FIG. 1. The various parallel processing systems can implement the graphics processing pipeline 500 via one or more instances of the parallel processing unit (e.g., parallel processing unit 202 of FIG. 2A) as described herein. For example, a shader unit (e.g., graphics multiprocessor 234 of FIG. 2C) may be configured to perform the functions of one or more of a vertex processing unit 504, a tessellation control processing unit 508, a tessellation evaluation processing unit 512, a geometry processing unit 516, and a fragment/pixel processing unit 524. The functions of data assembler 502, primitive assemblers 506, 514, 518, tessellation unit 510, rasterizer 522, and raster operations unit 526 may also be performed by other processing engines within a processing cluster (e.g., processing cluster 214 of FIG. 2A) and a corresponding partition unit (e.g., partition unit 220A-220N of FIG. 2A). The graphics processing pipeline 500 may also be implemented using dedicated processing units for one or more functions. In one embodiment, one or more portions of the graphics processing pipeline 500 can be performed by parallel processing logic within a general purpose processor (e.g., CPU). In one embodiment, one or more portions of the graphics processing pipeline 500 can access on-chip memory (e.g., parallel processor memory 222 as in FIG. 2A) via a memory interface 528, which may be an instance of the memory interface 218 of FIG. 2A.

In one embodiment the data assembler 502 is a processing unit that collects vertex data for surfaces and primitives. The data assembler 502 then outputs the vertex data, including the vertex attributes, to the vertex processing unit 504. The vertex processing unit 504 is a programmable execution unit that executes vertex shader programs, lighting and transforming vertex data as specified by the vertex shader programs. The vertex processing unit 504 reads data that is stored in cache, local or system memory for use in processing the vertex data and may be programmed to transform the vertex data from an object-based coordinate representation to a world space coordinate space or a normalized device coordinate space.

A first instance of a primitive assembler 506 receives vertex attributes from the vertex processing unit 504. The primitive assembler 506 readings stored vertex attributes as needed and constructs graphics primitives for processing by tessellation control processing unit 508. The graphics primitives include triangles, line segments, points, patches, and so forth, as supported by various graphics processing application programming interfaces (APIs).

The tessellation control processing unit 508 treats the input vertices as control points for a geometric patch. The control points are transformed from an input representation from the patch (e.g., the patch's bases) to a representation that is suitable for use in surface evaluation by the tessellation evaluation processing unit 512. The tessellation control processing unit 508 can also compute tessellation factors for edges of geometric patches. A tessellation factor applies to a single edge and quantifies a view-dependent level of detail associated with the edge. A tessellation unit 510 is configured to receive the tessellation factors for edges of a patch and to tessellate the patch into multiple geometric primitives such as line, triangle, or quadrilateral primitives, which are transmitted to a tessellation evaluation processing unit 512. The tessellation evaluation processing unit 512 operates on parameterized coordinates of the subdivided patch to generate a surface representation and vertex attributes for each vertex associated with the geometric primitives.

A second instance of a primitive assembler 514 receives vertex attributes from the tessellation evaluation processing unit 512, reading stored vertex attributes as needed, and constructs graphics primitives for processing by the geometry processing unit 516. The geometry processing unit 516 is a programmable execution unit that executes geometry shader programs to transform graphics primitives received from primitive assembler 514 as specified by the geometry shader programs. In one embodiment the geometry processing unit 516 is programmed to subdivide the graphics primitives into one or more new graphics primitives and calculate parameters used to rasterize the new graphics primitives.

In some embodiments the geometry processing unit 516 can add or delete elements in the geometry stream. The geometry processing unit 516 outputs the parameters and vertices specifying new graphics primitives to primitive assembler 518. The primitive assembler 518 receives the parameters and vertices from the geometry processing unit 516 and constructs graphics primitives for processing by a viewport scale, cull, and clip unit 520. The geometry processing unit 516 reads data that is stored in parallel processor memory or system memory for use in processing the geometry data. The viewport scale, cull, and clip unit 520 performs clipping, culling, and viewport scaling and outputs processed graphics primitives to a rasterizer 522.

The rasterizer 522 can perform depth culling and other depth-based optimizations. The rasterizer 522 also performs scan conversion on the new graphics primitives to generate fragments and output those fragments and associated coverage data to the fragment/pixel processing unit 524. The fragment/pixel processing unit 524 is a programmable execution unit that is configured to execute fragment shader programs or pixel shader programs. The fragment/pixel processing unit 524 transforming fragments or pixels received from rasterizer 522, as specified by the fragment or pixel shader programs. For example, the fragment/pixel processing unit 524 may be programmed to perform operations included but not limited to texture mapping, shading, blending, texture correction and perspective correction to produce shaded fragments or pixels that are output to a raster operations unit 526. The fragment/pixel processing unit 524 can read data that is stored in either the parallel processor memory or the system memory for use when processing the fragment data. Fragment or pixel shader programs may be configured to shade at sample, pixel, tile, or other granularities depending on the sampling rate configured for the processing units.

The raster operations unit 526 is a processing unit that performs raster operations including, but not limited to stencil, z-test, blending, and the like, and outputs pixel data as processed graphics data to be stored in graphics memory (e.g., parallel processor memory 222 as in FIG. 2A, and/or system memory 104 as in FIG. 1), to be displayed on the one or more display device(s) 110 or for further processing by one of the one or more processor(s) 102 or parallel processor(s) 112. In some embodiments the raster operations unit 526 is configured to compress z or color data that is written to memory and decompress z or color data that is read from memory.

Machine Learning Overview

A machine learning algorithm is an algorithm that can learn based on a set of data. Embodiments of machine learning algorithms can be designed to model high-level abstractions within a data set. For example, image recognition algorithms can be used to determine which of several categories to which a given input belong; regression algorithms can output a numerical value given an input; and pattern recognition algorithms can be used to generate translated text or perform text to speech and/or speech recognition.

An exemplary type of machine learning algorithm is a neural network. There are many types of neural networks; a simple type of neural network is a feedforward network. A feedforward network may be implemented as an acyclic graph in which the nodes are arranged in layers. Typically, a feedforward network topology includes an input layer and an output layer that are separated by at least one hidden layer. The hidden layer transforms input received by the input layer into a representation that is useful for generating output in the output layer. The network nodes are fully connected via edges to the nodes in adjacent layers, but there are no edges between nodes within each layer. Data received at the nodes of an input layer of a feedforward network are propagated (i.e., "fed forward") to the nodes of the output layer via an activation function that calculates the states of the nodes of each successive layer in the network based on coefficients ("weights") respectively associated with each of the edges connecting the layers. Depending on the specific model being represented by the algorithm being executed, the output from the neural network algorithm can take various forms.

Before a machine learning algorithm can be used to model a particular problem, the algorithm is trained using a training data set. Training a neural network involves selecting a network topology, using a set of training data representing a problem being modeled by the network, and adjusting the weights until the network model performs with a minimal error for all instances of the training data set. For example, during a supervised learning training process for a neural network, the output produced by the network in response to the input representing an instance in a training data set is compared to the "correct" labeled output for that instance, an error signal representing the difference between the output and the labeled output is calculated, and the weights associated with the connections are adjusted to minimize that error as the error signal is backward propagated through the layers of the network. The network is considered "trained" when the errors for each of the outputs generated from the instances of the training data set are minimized.

The accuracy of a machine learning algorithm can be affected significantly by the quality of the data set used to train the algorithm. The training process can be computationally intensive and may require a significant amount of time on a conventional general-purpose processor. Accordingly, parallel processing hardware is used to train many types of machine learning algorithms. This is particularly useful for optimizing the training of neural networks, as the computations performed in adjusting the coefficients in neural networks lend themselves naturally to parallel implementations. Specifically, many machine learning algorithms and software applications have been adapted to make use of the parallel processing hardware within general-purpose graphics processing devices.

Figure 6:
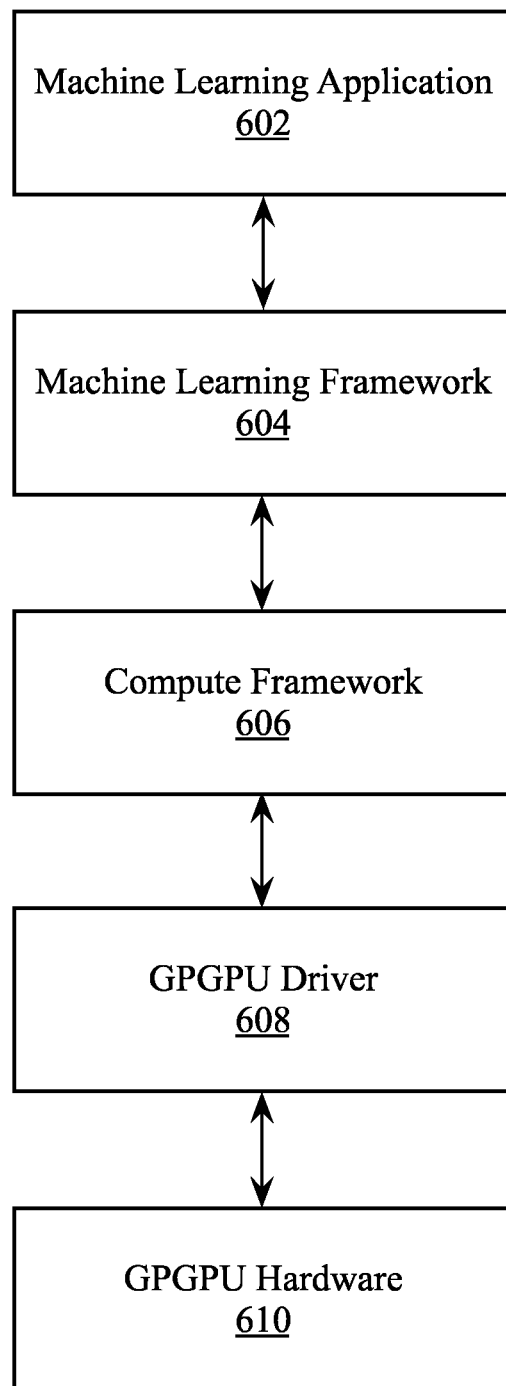
FIG. 6 illustrates a machine learning software stack, according to an embodiment.

FIG. 6 is a generalized diagram of a machine learning software stack 600. A machine learning application 602 can be configured to train a neural network using a training dataset or to use a trained deep neural network to implement machine intelligence. The machine learning application 602 can include training and inference functionality for a neural network and/or specialized software that can be used to train a neural network before deployment. The machine learning application 602 can implement any type of machine intelligence including but not limited to image recognition, mapping and localization, autonomous navigation, speech synthesis, medical imaging, or language translation.

Hardware acceleration for the machine learning application 602 can be enabled via a machine learning framework 604. The machine learning framework 604 can provide a library of machine learning primitives. Machine learning primitives are basic operations that are commonly performed by machine learning algorithms. Without the machine learning framework 604, developers of machine learning algorithms would be required to create and optimize the main computational logic associated with the machine learning algorithm, then re-optimize the computational logic as new parallel processors are developed. Instead, the machine learning application can be configured to perform the necessary computations using the primitives provided by the machine learning framework 604. Exemplary primitives include tensor convolutions, activation functions, and pooling, which are computational operations that are performed while training a convolutional neural network (CNN). The machine learning framework 604 can also provide primitives to implement basic linear algebra subprograms performed by many machine-learning algorithms, such as matrix and vector operations.

The machine learning framework 604 can process input data received from the machine learning application 602 and generate the appropriate input to a compute framework 606. The compute framework 606 can abstract the underlying instructions provided to the GPGPU driver 608 to enable the machine learning framework 604 to take advantage of hardware acceleration via the GPGPU hardware 610 without requiring the machine learning framework 604 to have intimate knowledge of the architecture of the GPGPU hardware 610. Additionally, the compute framework 606 can enable hardware acceleration for the machine learning framework 604 across a variety of types and generations of the GPGPU hardware 610.

GPGPU Machine Learning Acceleration

Figure 7:
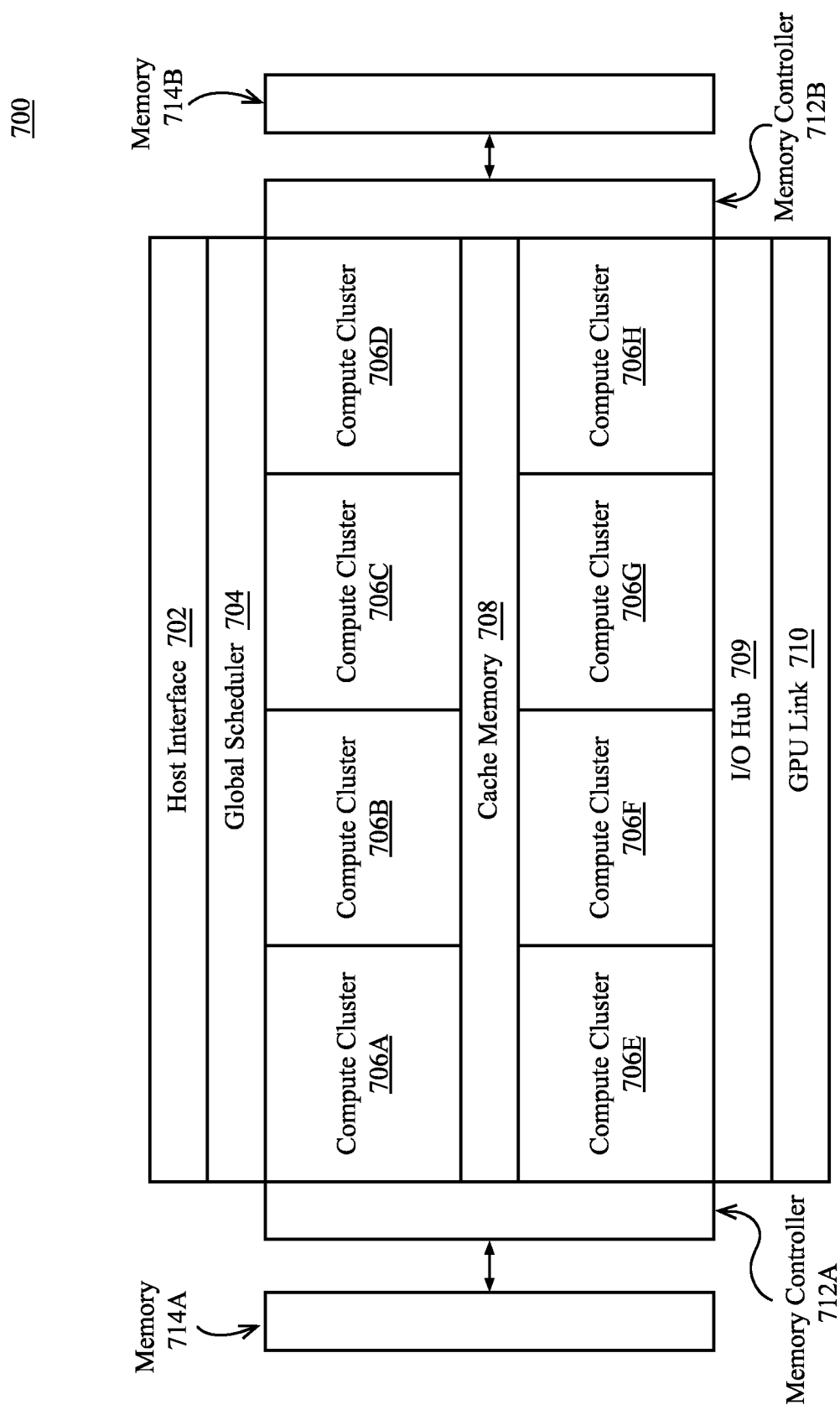
FIG. 7 illustrates a highly-parallel general-purpose graphics processing unit, according to an embodiment.

FIG. 7 illustrates a general-purpose graphics processing unit 700, according to an embodiment. In one embodiment, the general-purpose processing unit (GPGPU) 700 can be configured to be particularly efficient in processing the type of computational workloads associated with training deep neural networks. Additionally, the GPGPU 700 can be linked directly to other instances of the GPGPU to create a multi-GPU cluster to improve training speed for particularly deep neural networks.

The GPGPU 700 includes a host interface 702 to enable a connection with a host processor. In one embodiment the host interface 702 is a PCI Express interface. However, the host interface can also be a vendor specific communications interface or communications fabric. The GPGPU 700 receives commands from the host processor and uses a global scheduler 704 to distribute execution threads associated with those commands to a set of compute clusters 706A-706H. The compute clusters 706A-706H share a cache memory 708. The cache memory 708 can serve as a higher-level cache for cache memories within the compute clusters 706A-706H.

The GPGPU 700 includes memory 714A-714B coupled with the compute clusters 706A-706H via a set of memory controllers 712A-712B. In various embodiments, the memory 714A-714B can include various types of memory devices including dynamic random-access memory (DRAM) or graphics random-access memory, such as synchronous graphics random access memory (SGRAM), including graphics double data rate (GDDR) memory. In one embodiment, the memory 714A-714N may also include 3D stacked memory, including but not limited to high bandwidth memory (HBM).

In one embodiment, each of the compute clusters 706A-706H includes a set of graphics multiprocessors, such as the graphics multiprocessor 400 of FIG. 4A. The graphics multiprocessors of the compute cluster multiple types of integer and floating-point logic units that can perform computational operations at a range of precisions including suited for machine learning computations. For example, and in one embodiment at least a subset of the floating-point units in each of the compute clusters 706A-H can be configured to perform 16-bit or 32-bit floating point operations, while a different subset of the floating-point units can be configured to perform 64-bit floating point operations.

Multiple instances of the GPGPU 700 can be configured to operate as a compute cluster. The communication mechanism used by the compute cluster for synchronization and data exchange varies across embodiments. In one embodiment, the multiple instances of the GPGPU 700 communicate over the host interface 702. In one embodiment the GPGPU 700 includes an I/O hub 709 that couples the GPGPU 700 with a GPU link 710 that enables a direct connection to other instances of the GPGPU. In one embodiment the GPU link 710 is coupled to a dedicated GPU-to-GPU bridge that enables communication and synchronization between multiple instances of the GPGPU 700. In one embodiment the GPU link 710 couples with a high-speed interconnect to transmit and receive data to other GPGPUs or parallel processors. In one embodiment the multiple instances of the GPGPU 700 are located in separate data processing systems and communicate via a network device that is accessible via the host interface 702. In one embodiment the GPU link 710 can be configured to enable a connection to a host processor in addition to or as an alternative to the host interface 702.

While the illustrated configuration of the GPGPU 700 can be configured to train neural networks, one embodiment provides alternate configuration of the GPGPU 700 that can be configured for deployment within a high performance or low power inferencing platform. In an inferencing configuration, the GPGPU 700 includes fewer of the compute clusters 706A-706H relative to the training configuration. Additionally, memory technology associated with the memory 714A-714B may differ between inferencing and training configurations. In one embodiment, the inferencing configuration of the GPGPU 700 can support inferencing specific instructions. For example, an inferencing configuration can provide support for one or more 8-bit integer dot product instructions, which are commonly used during inferencing operations for deployed neural networks.

Figure 8:
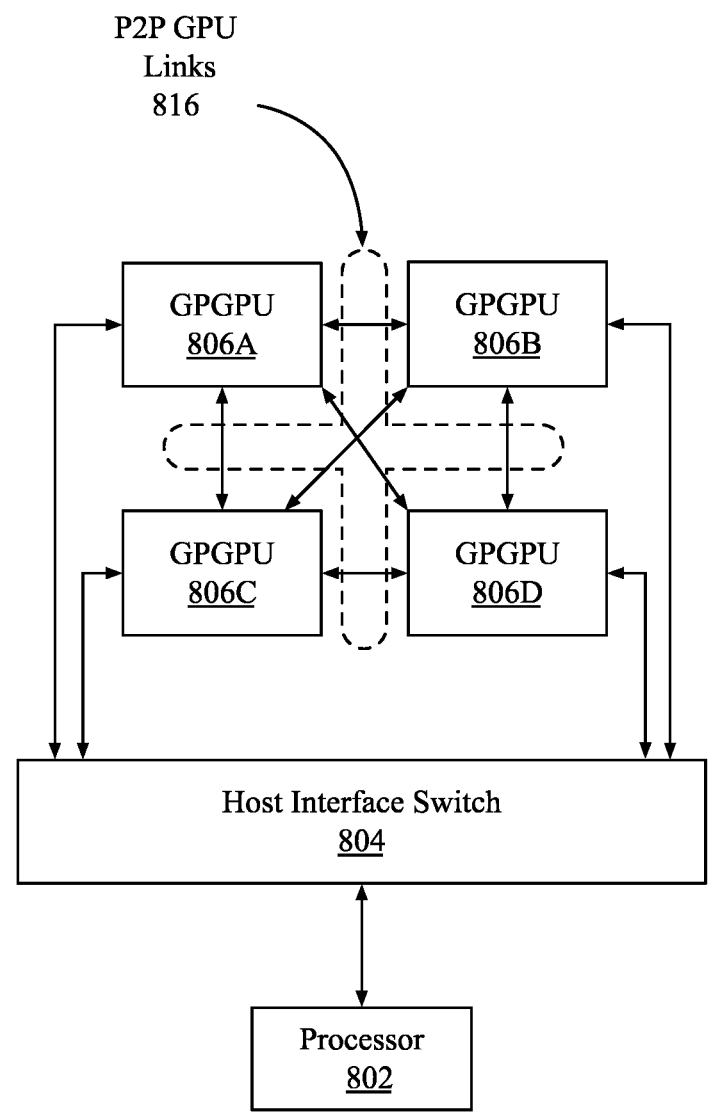
FIG. 8 illustrates a multi-GPU computing system, according to an embodiment.

FIG. 8 illustrates a multi-GPU computing system 800, according to an embodiment. The multi-GPU computing system 800 can include a processor 802 coupled to multiple GPGPUs 806A-D via a host interface switch 804. The host interface switch 804, in one embodiment, is a PCI express switch device that couples the processor 802 to a PCI express bus over which the processor 802 can communicate with the set of GPGPUs 806A-806D. Each of the multiple GPGPUs 806A-806D can be an instance of the GPGPU 700 of FIG. 7. The GPGPUs 806A-806D can interconnect via a set of high-speed point-to-point GPU to GPU links 816. The high-speed GPU to GPU links can connect to each of the GPGPUs 806A-806D via a dedicated GPU link, such as the GPU link 710 as in FIG. 7. The P2P GPU links 816 enable direct communication between each of the GPGPUs 806A-806D without requiring communication over the host interface bus to which the processor 802 is connected. With GPU-to-GPU traffic directed to the P2P GPU links, the host interface bus remains available for system memory access or to communicate with other instances of the multi-GPU computing system 800, for example, via one or more network devices. While in the illustrated embodiment the GPGPUs 806A-806D connect to the processor 802 via the host interface switch 804, in one embodiment the processor 802 includes direct support for the P2P GPU links 816 and can connect directly to the GPGPUs 806A-806D.

Machine Learning Neural Network Implementations

The computing architecture provided by embodiments described herein can be configured to perform the types of parallel processing that is particularly suited for training and deploying neural networks for machine learning. A neural network can be generalized as a network of functions having a graph relationship. As is well-known in the art, there are a variety of types of neural network implementations used in machine learning. One exemplary type of neural network is the feedforward network, as previously described.

A second exemplary type of neural network is the Convolutional Neural Network (CNN). A CNN is a specialized feedforward neural network for processing data having a known, grid-like topology, such as image data. Accordingly, CNNs are commonly used for compute vision and image recognition applications, but they also may be used for other types of pattern recognition such as speech and language processing. The nodes in the CNN input layer are organized into a set of "filters" (feature detectors inspired by the receptive fields found in the retina), and the output of each set of filters is propagated to nodes in successive layers of the network. The computations for a CNN include applying the convolution mathematical operation to each filter to produce the output of that filter. Convolution is a specialized kind of mathematical operation performed by two functions to produce a third function that is a modified version of one of the two original functions. In convolutional network terminology, the first function to the convolution can be referred to as the input, while the second function can be referred to as the convolution kernel. The output may be referred to as the feature map. For example, the input to a convolutional layer can be a multidimensional array of data that defines the various color components of an input image. The convolution kernel can be a multidimensional array of parameters, where the parameters are adapted by the training process for the neural network.

Recurrent neural networks (RNNs) are a family of feedforward neural networks that include feedback connections between layers. RNNs enable modeling of sequential data by sharing parameter data across different parts of the neural network. The architecture for a RNN includes cycles. The cycles represent the influence of a present value of a variable on its own value at a future time, as at least a portion of the output data from the RNN is used as feedback for processing subsequent input in a sequence. This feature makes RNNs particularly useful for language processing due to the variable nature in which language data can be composed.

The figures described below present exemplary feedforward, CNN, and RNN networks, as well as describe a general process for respectively training and deploying each of those types of networks. It will be understood that these descriptions are exemplary and non-limiting as to any specific embodiment described herein and the concepts illustrated can be applied generally to deep neural networks and machine learning techniques in general.

The exemplary neural networks described above can be used to perform deep learning. Deep learning is machine learning using deep neural networks. The deep neural networks used in deep learning are artificial neural networks composed of multiple hidden layers, as opposed to shallow neural networks that include only a single hidden layer. Deeper neural networks are generally more computationally intensive to train. However, the additional hidden layers of the network enable multistep pattern recognition that results in reduced output error relative to shallow machine learning techniques.

Deep neural networks used in deep learning typically include a front-end network to perform feature recognition coupled to a back-end network which represents a mathematical model that can perform operations (e.g., object classification, speech recognition, etc.) based on the feature representation provided to the model. Deep learning enables machine learning to be performed without requiring hand crafted feature engineering to be performed for the model. Instead, deep neural networks can learn features based on statistical structure or correlation within the input data. The learned features can be provided to a mathematical model that can map detected features to an output. The mathematical model used by the network is generally specialized for the specific task to be performed, and different models will be used to perform different task.

Once the neural network is structured, a learning model can be applied to the network to train the network to perform specific tasks. The learning model describes how to adjust the weights within the model to reduce the output error of the network. Backpropagation of errors is a common method used to train neural networks. An input vector is presented to the network for processing. The output of the network is compared to the desired output using a loss function and an error value is calculated for each of the neurons in the output layer. The error values are then propagated backwards until each neuron has an associated error value which roughly represents its contribution to the original output. The network can then learn from those errors using an algorithm, such as the stochastic gradient descent algorithm, to update the weights of the of the neural network.

Figure 9A:
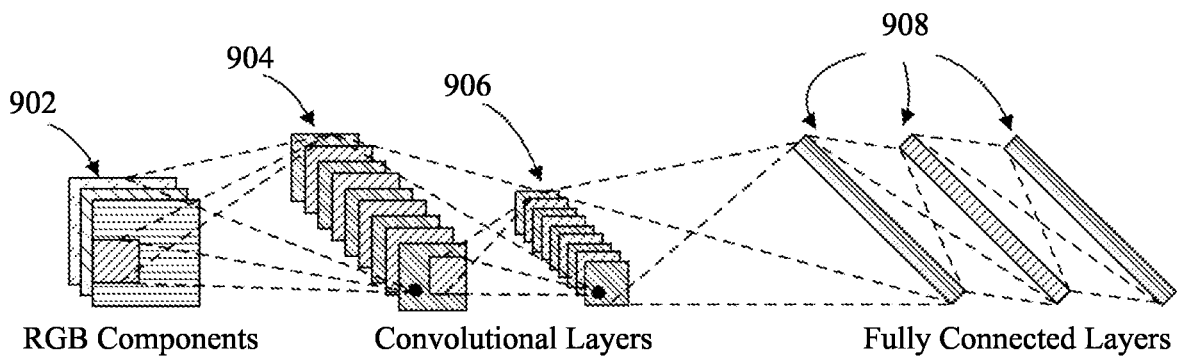
FIG. 9A-9B illustrate layers of exemplary deep neural networks.
Figure 9B:
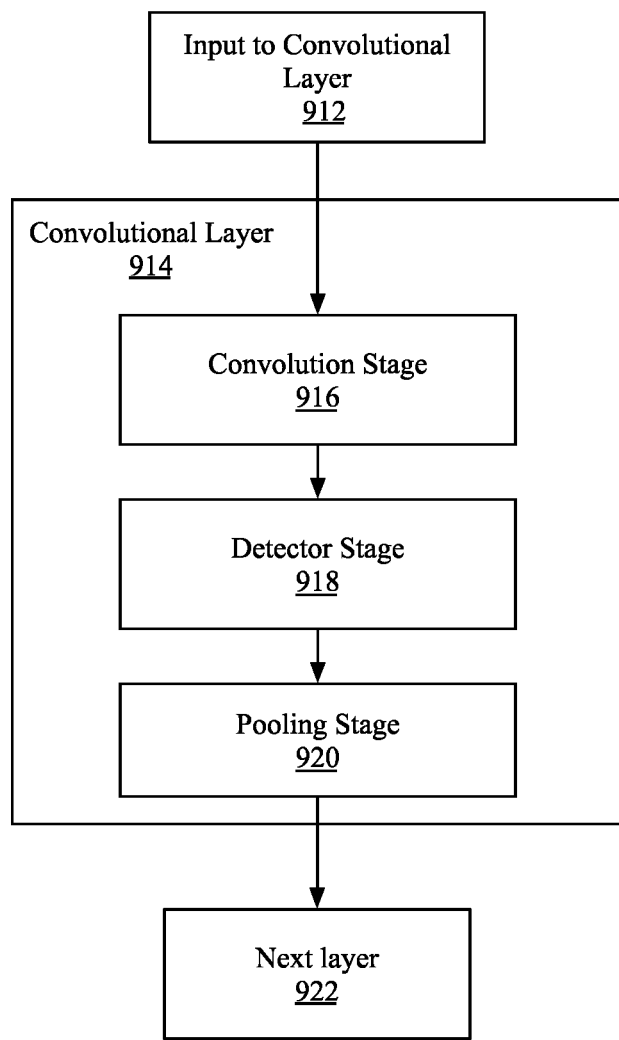

FIG. 9A-9B illustrate an exemplary convolutional neural network. FIG. 9A illustrates various layers within a CNN. As shown in FIG. 9A, an exemplary CNN used to model image processing can receive input 902 describing the red, green, and blue (RGB) components of an input image. The input 902 can be processed by multiple convolutional layers (e.g., convolutional layer 904, convolutional layer 906). The output from the multiple convolutional layers may optionally be processed by a set of fully connected layers 908. Neurons in a fully connected layer have full connections to all activations in the previous layer, as previously described for a feedforward network. The output from the fully connected layers 908 can be used to generate an output result from the network. The activations within the fully connected layers 908 can be computed using matrix multiplication instead of convolution. Not all CNN implementations make use of fully connected layers 908. For example, in some implementations the convolutional layer 906 can generate output for the CNN.

The convolutional layers are sparsely connected, which differs from traditional neural network configuration found in the fully connected layers 908. Traditional neural network layers are fully connected, such that every output unit interacts with every input unit. However, the convolutional layers are sparsely connected because the output of the convolution of a field is input (instead of the respective state value of each of the nodes in the field) to the nodes of the subsequent layer, as illustrated. The kernels associated with the convolutional layers perform convolution operations, the output of which is sent to the next layer. The dimensionality reduction performed within the convolutional layers is one aspect that enables the CNN to scale to process large images.

FIG. 9B illustrates exemplary computation stages within a convolutional layer of a CNN. Input to a convolutional layer 912 of a CNN can be processed in three stages of a convolutional layer 914. The three stages can include a convolution stage 916, a detector stage 918, and a pooling stage 920. The convolutional layer 914 can then output data to a successive convolutional layer. The final convolutional layer of the network can generate output feature map data or provide input to a fully connected layer, for example, to generate a classification value for the input to the CNN.

In the convolution stage 916 performs several convolutions in parallel to produce a set of linear activations. The convolution stage 916 can include an affine transformation, which is any transformation that can be specified as a linear transformation plus a translation. Affine transformations include rotations, translations, scaling, and combinations of these transformations. The convolution stage computes the output of functions (e.g., neurons) that are connected to specific regions in the input, which can be determined as the local region associated with the neuron. The neurons compute a dot product between the weights of the neurons and the region in the local input to which the neurons are connected. The output from the convolution stage 916 defines a set of linear activations that are processed by successive stages of the convolutional layer 914.

The linear activations can be processed by a detector stage 918. In the detector stage 918, each linear activation is processed by a non-linear activation function. The non-linear activation function increases the nonlinear properties of the overall network without affecting the receptive fields of the convolutional layer. Several types of non-linear activation functions may be used. One particular type is the rectified linear unit (ReLU), which uses an activation function defined as $f(x)=\max(0, x)$, such that the activation is thresholded at zero.

The pooling stage 920 uses a pooling function that replaces the output of the convolutional layer 906 with a summary statistic of the nearby outputs. The pooling function can be used to introduce translation invariance into the neural network, such that small translations to the input do not change the pooled outputs. Invariance to local translation can be useful in scenarios where the presence of a feature in the input data is more important than the precise location of the feature. Various types of pooling functions can be used during the pooling stage 920, including max pooling, average pooling, and l2-norm pooling. Additionally, some CNN implementations do not include a pooling stage. Instead, such implementations substitute and additional convolution stage having an increased stride relative to previous convolution stages.

The output from the convolutional layer 914 can then be processed by the next layer 922. The next layer 922 can be an additional convolutional layer or one of the fully connected layers 908. For example, the first convolutional layer 904 of FIG. 9A can output to the second convolutional layer 906, while the second convolutional layer can output to a first layer of the fully connected layers 908.

Figure 10:
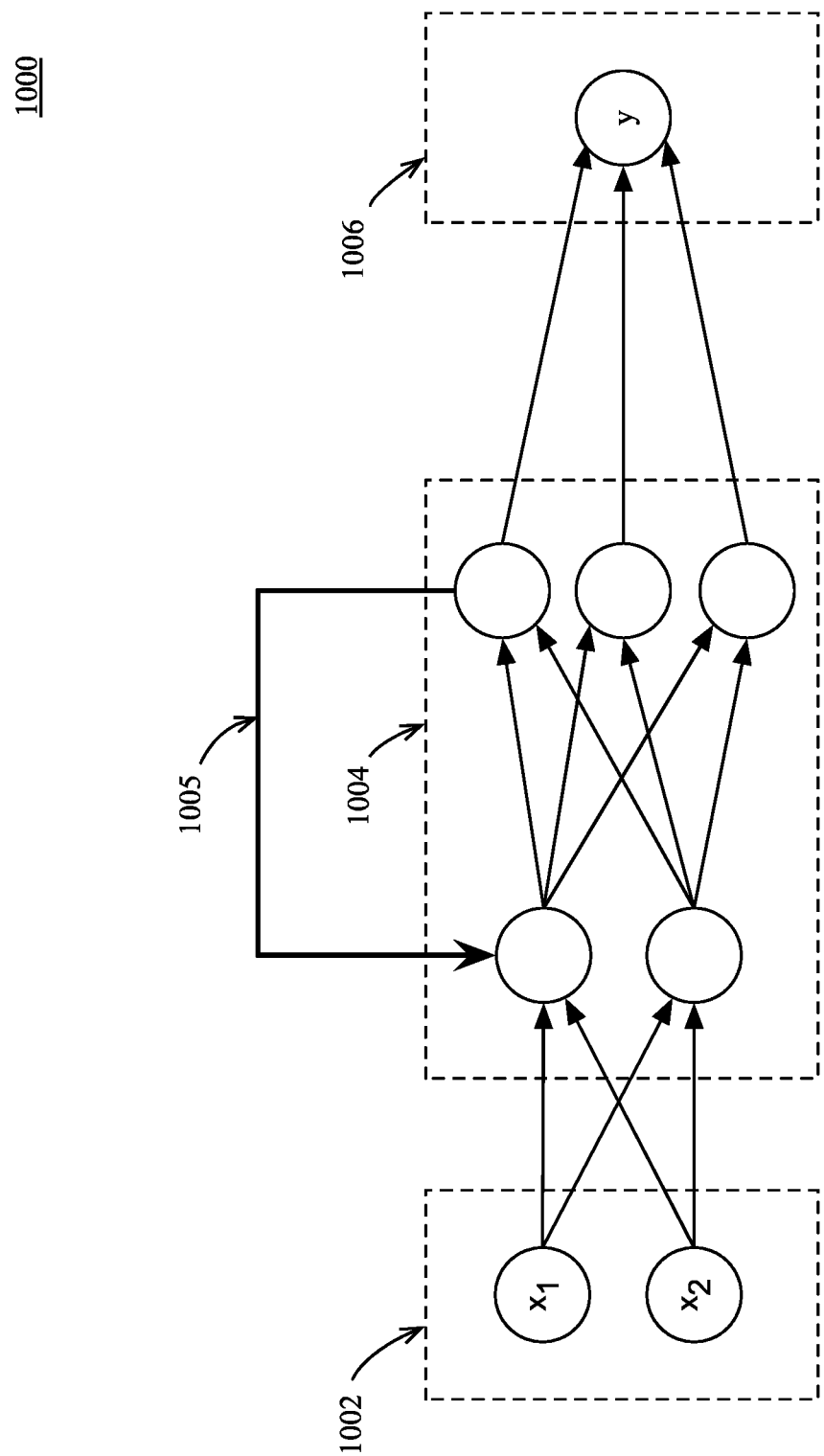
FIG. 10 illustrates an exemplary recurrent neural network.

FIG. 10 illustrates an exemplary recurrent neural network 1000. In a recurrent neural network (RNN), the previous state of the network influences the output of the current state of the network. RNNs can be built in a variety of ways using a variety of functions. The use of RNNs generally revolves around using mathematical models to predict the future based on a prior sequence of inputs. For example, an RNN may be used to perform statistical language modeling to predict an upcoming word given a previous sequence of words. The illustrated RNN 1000 can be described has having an input layer 1002 that receives an input vector, hidden layers 1004 to implement a recurrent function, a feedback mechanism 1005 to enable a 'memory' of previous states, and an output layer 1006 to output a result. The RNN 1000 operates based on time-steps. The state of the RNN at a given time step is influenced based on the previous time step via the feedback mechanism 1005. For a given time step, the state of the hidden layers 1004 is defined by the previous state and the input at the current time step. An initial input ($x_1$) at a first time step can be processed by the hidden layer 1004. A second input ($x_2$) can be processed by the hidden layer 1004 using state information that is determined during the processing of the initial input ($x_1$). A given state can be computed as $s_t=f(Ux_t+Ws_{t-1})$, where U and W are parameter matrices. The function $f$ is generally a non-linearity, such as the hyperbolic tangent function (Tanh) or a variant of the rectifier function $f(x)=\max(0, x)$. However, the specific mathematical function used in the hidden layers 1004 can vary depending on the specific implementation details of the RNN 1000.

In addition to the basic CNN and RNN networks described, variations on those networks may be enabled. One example RNN variant is the long short-term memory (LS™) RNN. LSTM RNNs are capable of learning long-term dependencies that may be necessary for processing longer sequences of language. A variant on the CNN is a convolutional deep belief network, which has a structure similar to a CNN and is trained in a manner similar to a deep belief network. A deep belief network (DBN) is a generative neural network that is composed of multiple layers of stochastic (random) variables. DBNs can be trained layer-by-layer using greedy unsupervised learning. The learned weights of the DBN can then be used to provide pre-train neural networks by determining an optimal initial set of weights for the neural network.

Figure 11:
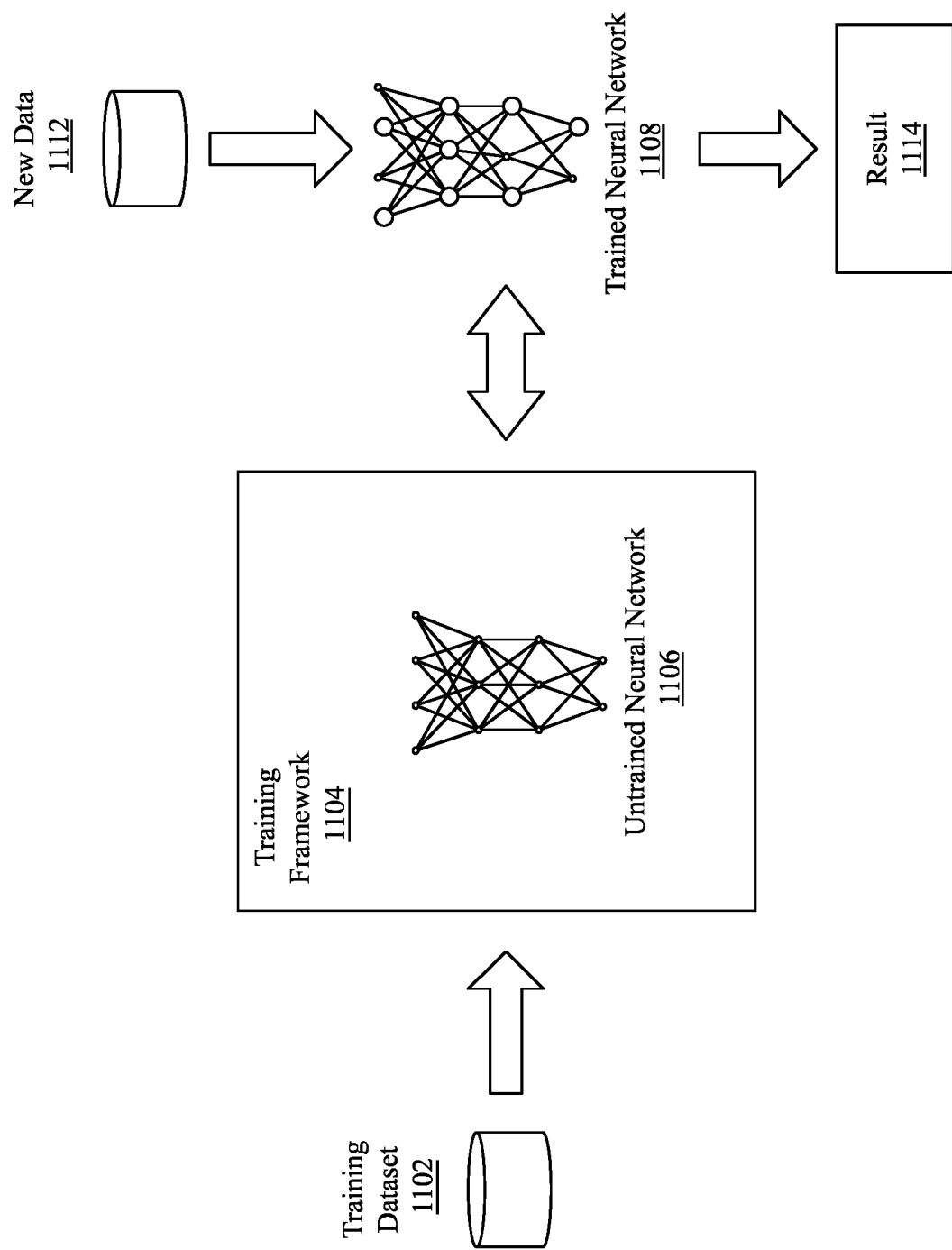
FIG. 11 illustrates training and deployment of a deep neural network.

FIG. 11 illustrates training and deployment of a deep neural network. Once a given network has been structured for a task the neural network is trained using a training dataset 1102. Various training frameworks 1104 have been developed to enable hardware acceleration of the training process. For example, the machine learning framework 604 of FIG. 6 may be configured as a training framework 1104. The training framework 1104 can hook into an untrained neural network 1106 and enable the untrained neural net to be trained using the parallel processing resources described herein to generate a trained neural network 1108.

To start the training process the initial weights may be chosen randomly or by pre-training using a deep belief network. The training cycle then be performed in either a supervised or unsupervised manner.

Supervised learning is a learning method in which training is performed as a mediated operation, such as when the training dataset 1102 includes input paired with the desired output for the input, or where the training dataset includes input having known output and the output of the neural network is manually graded. The network processes the inputs and compares the resulting outputs against a set of expected or desired outputs. Errors are then propagated back through the system. The training framework 1104 can adjust to adjust the weights that control the untrained neural network 1106. The training framework 1104 can provide tools to monitor how well the untrained neural network 1106 is converging towards a model suitable to generate correct answers based on known input data. The training process occurs repeatedly as the weights of the network are adjusted to refine the output generated by the neural network. The training process can continue until the neural network reaches a statistically desired accuracy associated with a trained neural network 1108. The trained neural network 1108 can then be deployed to implement any number of machine learning operations to generate an inference result 1114 based on input of new data 1112.

Unsupervised learning is a learning method in which the network attempts to train itself using unlabeled data. Thus, for unsupervised learning the training dataset 1102 will include input data without any associated output data. The untrained neural network 1106 can learn groupings within the unlabeled input and can determine how individual inputs are related to the overall dataset. Unsupervised training can be used to generate a self-organizing map, which is a type of trained neural network 1108 capable of performing operations useful in reducing the dimensionality of data. Unsupervised training can also be used to perform anomaly detection, which allows the identification of data points in an input dataset that deviate from the normal patterns of the data.

Variations on supervised and unsupervised training may also be employed. Semi-supervised learning is a technique in which in the training dataset 1102 includes a mix of labeled and unlabeled data of the same distribution. Incremental learning is a variant of supervised learning in which input data is continuously used to further train the model. Incremental learning enables the trained neural network 1108 to adapt to the new data 1112 without forgetting the knowledge instilled within the network during initial training.

Whether supervised or unsupervised, the training process for particularly deep neural networks may be too computationally intensive for a single compute node. Instead of using a single compute node, a distributed network of computational nodes can be used to accelerate the training process.

Figure 12:
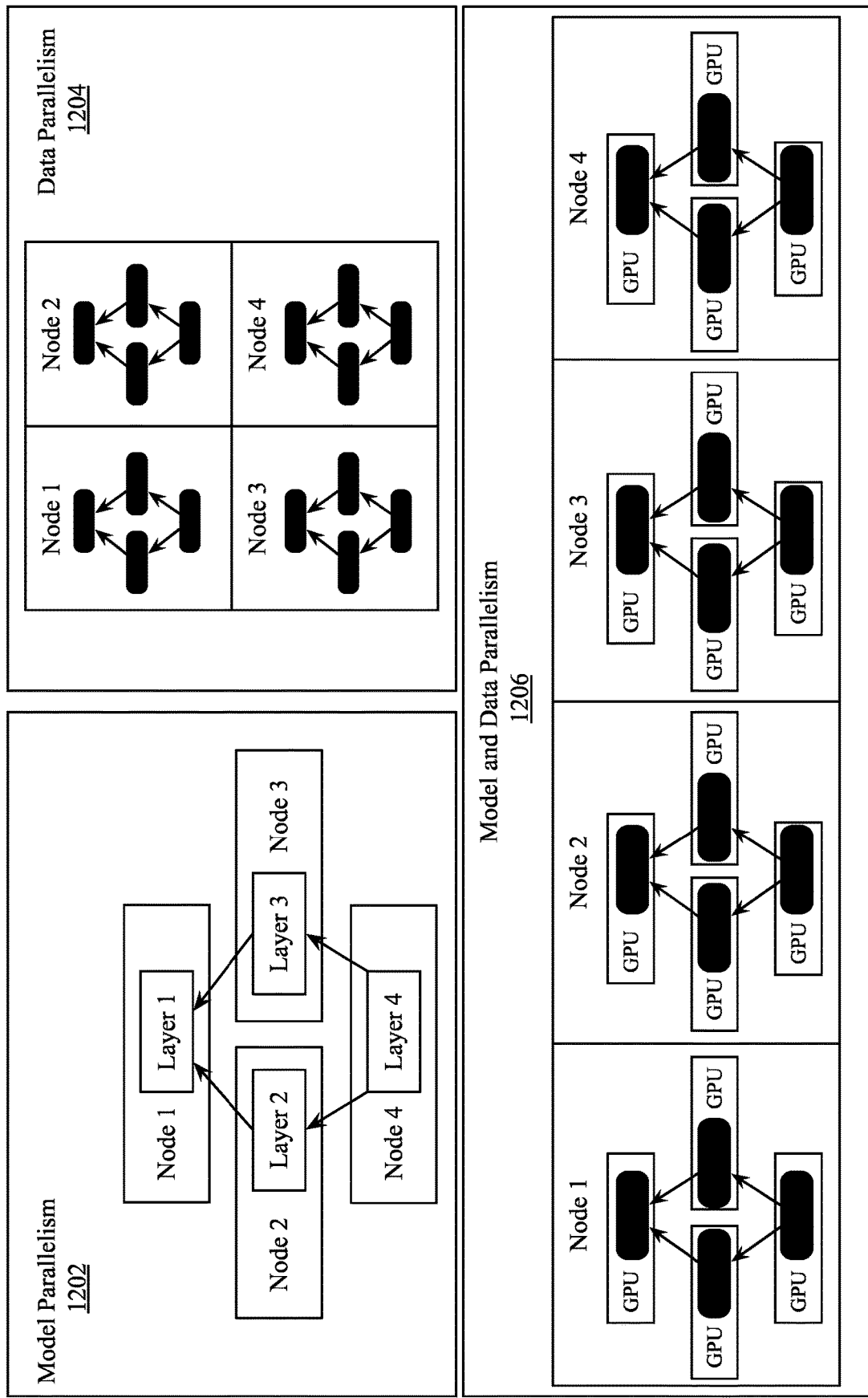
FIG. 12 is a block diagram illustrating distributed learning.

FIG. 12 is a block diagram illustrating distributed learning. Distributed learning is a training model that uses multiple distributed computing nodes to perform supervised or unsupervised training of a neural network. The distributed computational nodes can each include one or more host processors and one or more of the general-purpose processing nodes, such as the highly-parallel general-purpose graphics processing unit 700 as in FIG. 7. As illustrated, distributed learning can be performed model parallelism 1202, data parallelism 1204, or a combination of model and data parallelism 1204.

In model parallelism 1202, different computational nodes in a distributed system can perform training computations for different parts of a single network. For example, each layer of a neural network can be trained by a different processing node of the distributed system. The benefits of model parallelism include the ability to scale to particularly large models. Splitting the computations associated with different layers of the neural network enables the training of very large neural networks in which the weights of all layers would not fit into the memory of a single computational node. In some instances, model parallelism can be particularly useful in performing unsupervised training of large neural networks. In another example of model parallelism, computation in one or more layers of a neural network model can be split across multiple compute nodes across feature map dimension to reduce size of per node model parameters.

In data parallelism 1204, the different nodes of the distributed network have a complete instance of the model and each node receives a different portion of the data. The results from the different nodes are then combined. While different approaches to data parallelism are possible, data parallel training approaches all require a technique of combining results and synchronizing the model parameters between each node. Exemplary approaches to combining data include parameter averaging and update based data parallelism. Parameter averaging trains each node on a subset of the training data and sets the global parameters (e.g., weights, biases) to the average of the parameters from each node. Parameter averaging uses a central parameter server that maintains the parameter data. Update based data parallelism is similar to parameter averaging except that instead of transferring parameters from the nodes to the parameter server, the updates to the model are transferred. Additionally, update-based data parallelism can be performed in a decentralized manner, where the updates are compressed and transferred between nodes.

Combined model and data parallelism 1206 can be implemented, for example, in a distributed system in which each computational node includes multiple GPUs. Each node can have a complete instance of the model with separate GPUs within each node are used to train different portions of the model.

Distributed training has increased overhead relative to training on a single machine. However, the parallel processors and GPGPUs described herein can each implement various techniques to reduce the overhead of distributed training, including techniques to enable high bandwidth GPU-to-GPU data transfer and accelerated remote data synchronization.

Exemplary Machine Learning Applications

Machine learning can be applied to solve a variety of technological problems, including but not limited to computer vision, autonomous driving and navigation, speech recognition, and language processing. Computer vision has traditionally been one of the most active research areas for machine learning applications. Applications of computer vision range from reproducing human visual abilities, such as recognizing faces, to creating new categories of visual abilities. For example, computer vision applications can be configured to recognize sound waves from the vibrations induced in objects visible in a video. Parallel processor accelerated machine learning enables computer vision applications to be trained using significantly larger training dataset than previously feasible and enables inferencing systems to be deployed using low power parallel processors.

Parallel processor accelerated machine learning has autonomous driving applications including lane and road sign recognition, obstacle avoidance, navigation, and driving control. Accelerated machine learning techniques can be used to train driving models based on datasets that define the appropriate responses to specific training input. The parallel processors described herein can enable rapid training of the increasingly complex neural networks used for autonomous driving solutions and enables the deployment of low power inferencing processors in a mobile platform suitable for integration into autonomous vehicles.

Parallel processor accelerated deep neural networks have enabled machine learning approaches to automatic speech recognition (ASR). ASR includes the creation of a function that computes the most probable linguistic sequence given an input acoustic sequence. Accelerated machine learning using deep neural networks have enabled the replacement of the hidden Markov models (HMMs) and Gaussian mixture models (GMMs) previously used for ASR.

Parallel processor accelerated machine learning can also be used to accelerate natural language processing. Automatic learning procedures can make use of statistical inference algorithms to produce models that are robust to erroneous or unfamiliar input. Exemplary natural language processor applications include automatic machine translation between human languages.

The parallel processing platforms used for machine learning can be divided into training platforms and deployment platforms. Training platforms are generally highly parallel and include optimizations to accelerate multi-GPU single node training and multi-node, multi-GPU training. Exemplary parallel processors suited for training include the highly-parallel general-purpose graphics processing unit 700 of FIG. 7 and the multi-GPU computing system 800 of FIG. 8. On the contrary, deployed machine learning platforms generally include lower power parallel processors suitable for use in products such as cameras, autonomous robots, and autonomous vehicles.

Figure 13:
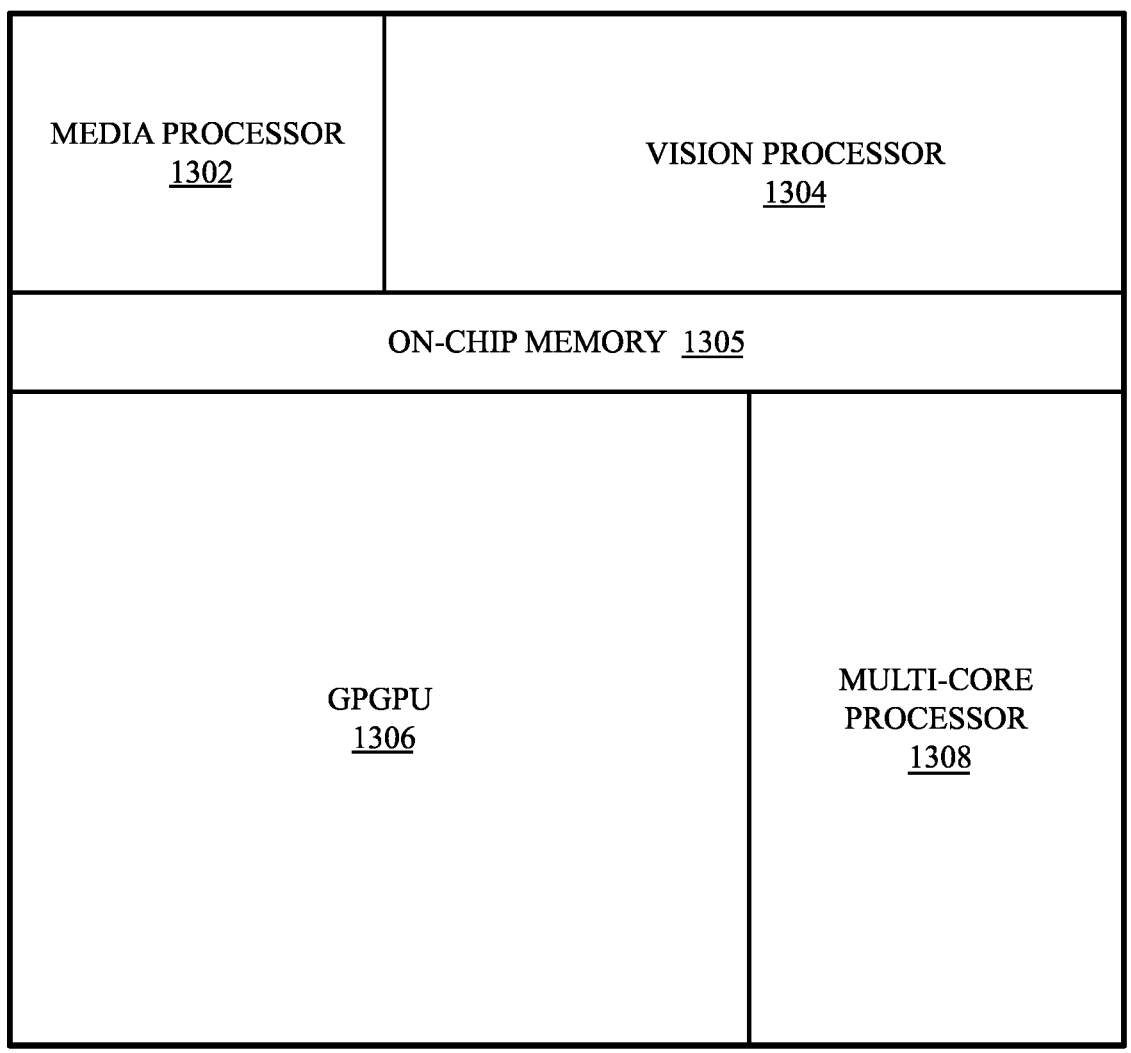
FIG. 13 illustrates an exemplary inferencing system on a chip (SOC) suitable for performing inferencing using a trained model.

FIG. 13 illustrates an exemplary inferencing system on a chip (SOC) 1300 suitable for performing inferencing using a trained model. The SOC 1300 can integrate processing components including a media processor 1302, a vision processor 1304, a GPGPU 1306 and a multi-core processor 1308. The SOC 1300 can additionally include on-chip memory 1305 that can enable a shared on-chip data pool that is accessible by each of the processing components. The processing components can be optimized for low power operation to enable deployment to a variety of machine learning platforms, including autonomous vehicles and autonomous robots. For example, one implementation of the SOC 1300 can be used as a portion of the main control system for an autonomous vehicle. Where the SOC 1300 is configured for use in autonomous vehicles the SOC is designed and configured for compliance with the relevant functional safety standards of the deployment jurisdiction.

During operation, the media processor 1302 and vision processor 1304 can work in concert to accelerate computer vision operations. The media processor 1302 can enable low latency decode of multiple high-resolution (e.g., 4K, 8K) video streams. The decoded video streams can be written to a buffer in the on-chip-memory 1305. The vision processor 1304 can then parse the decoded video and perform preliminary processing operations on the frames of the decoded video in preparation of processing the frames using a trained image recognition model. For example, the vision processor 1304 can accelerate convolution operations for a CNN that is used to perform image recognition on the high-resolution video data, while back end model computations are performed by the GPGPU 1306.

The multi-core processor 1308 can include control logic to assist with sequencing and synchronization of data transfers and shared memory operations performed by the media processor 1302 and the vision processor 1304. The multi-core processor 1308 can also function as an application processor to execute software applications that can make use of the inferencing compute capability of the GPGPU 1306. For example, at least a portion of the navigation and driving logic can be implemented in software executing on the multi-core processor 1308. Such software can directly issue computational workloads to the GPGPU 1306 or the computational workloads can be issued to the multi-core processor 1308, which can offload at least a portion of those operations to the GPGPU 1306.

The GPGPU 1306 can include compute clusters such as a low power configuration of the compute clusters 706A-706H within the highly-parallel general-purpose graphics processing unit 700. The compute clusters within the GPGPU 1306 can support instruction that are specifically optimized to perform inferencing computations on a trained neural network. For example, the GPGPU 1306 can support instructions to perform low precision computations such as 8-bit and 4-bit integer vector operations.

Quantization Framework for Deep Learning Applications

A method and apparatus are described to perform quantization and data representation of low-precision tensors in deep learning applications. Each low-precision tensor may contain a data buffer and associated metadata represented as a data structure. The metadata may contain information pertaining to data type (integer, fixed-point, float or any other custom data type), precision and shared exponent(s)/scaling factor(s) necessary for performing data conversions and arithmetic operations. The data buffer may be stored as one contiguous block or many smaller blocks with as many exponents/scaling factors corresponding to each block. Smaller blocks with fine-grained scaling maybe used to capture wider dynamic range (typically required for the gradients during training) with each block scaled independently to fit into the range and precision of the low-precision data type.

Embodiments described herein provide for a dynamic fixed-point representation that can be used to store quantized floating-point data. A method and apparatus are described to perform dynamic fixed-point quantization (DFPQ) to convert between floating-point numbers to integers with shared exponent. A dynamic fixed-point data representation is also described, along with associated formulas for performing basic arithmetic operations. In one embodiment, a 16-bit dynamic fixed-point representation is used that has a 1-bit sign, 15-bits of magnitude, and uses a separately stored 8-bit shared exponent. However, the size of the shared exponent can vary in different fixed-point representations. For example, 5-bit, 8-bit, 16-bit, or 32-bit shared exponents can be used. In one embodiment, any size of signed integer can be used as a shared exponent and data can be represented by any sized signed or unsigned integers. To convert from floating-point to traditional fixed-point, one can multiply the floating-point value by $2^{fb}$, where fb is the number of fractional bits for the target fixed-point representation (e.g., $2^8$, for 24.8 fixed-point) and round the result to the nearest integer. Alternatively, some implementations use lookup tables or hash tables to perform this conversion. However, these techniques can result in significant data loss, depending on the dynamic range of the data to be converted. Additionally, traditional systems generally use a single fixed-point format for the data set, instead of dynamically varying the representation per block of data (e.g., tensor, neural network layer, etc.). In some embodiments data can be processed in blocks, with each block having an associated shared exponent. While blocked dynamic fixed-point representations are described herein, the blocked data representation can also be used for any other standard or custom low precision fixed or floating-point data.

Figure 14:
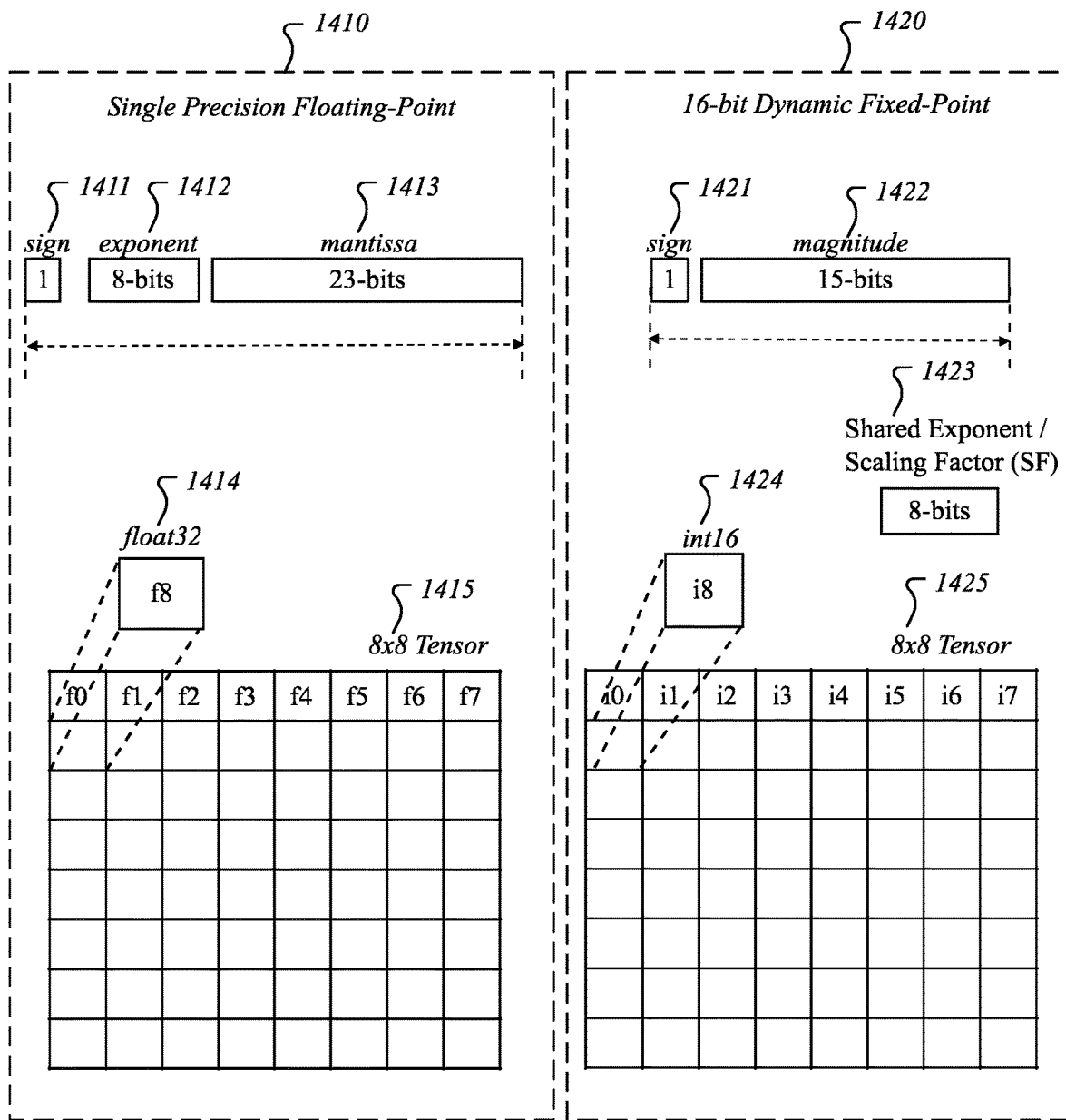
FIG. 14 illustrates a comparison between floating-point and a dynamic fixed-point format, according to an embodiment.

FIG. 14 illustrates a comparison between floating-point and a dynamic fixed-point format, according to an embodiment. Quantization is supported for multiple floating-point formats to multiple dynamic fixed-point bit-widths. Single precision (e.g., 32-bit) floating-point 1410 to 16-bit dynamic fixed-point 1420 are illustrated for exemplary purposes. The IEEE-754 single-precision encoding is illustrated in which a floating-point value includes a sign bit 1411, an 8-bit exponent 1412, and 23-bits of explicit mantissa 1413. An 8×8 tensor 1415 is illustrated in which 64 floating-point values are stored at 32-bits per entry.

The floating-point representation 1410 can be quantized into a 16-bit dynamic fixed-point representation 1420 with minimal data loss. The dynamic fixed-point representation enables an 8×8 tensor 1415 of 32-bit floating-point values 1414 to be stored in an 8×8 tensor 1425 of 16-bit integer values, each associated with an 8-bit shared exponent. The floating-point sign bit 1411 is preserved as the fixed-point sign bit 1421. 32-bits of exponent 1412 and mantissa 1413 (including the implicit leading bit) can be stored using a 15-bit magnitude 1422 and a shared exponent 1423, which is used as a scaling factor for the entire 8×8 tensor 1425.

Figure 15A:
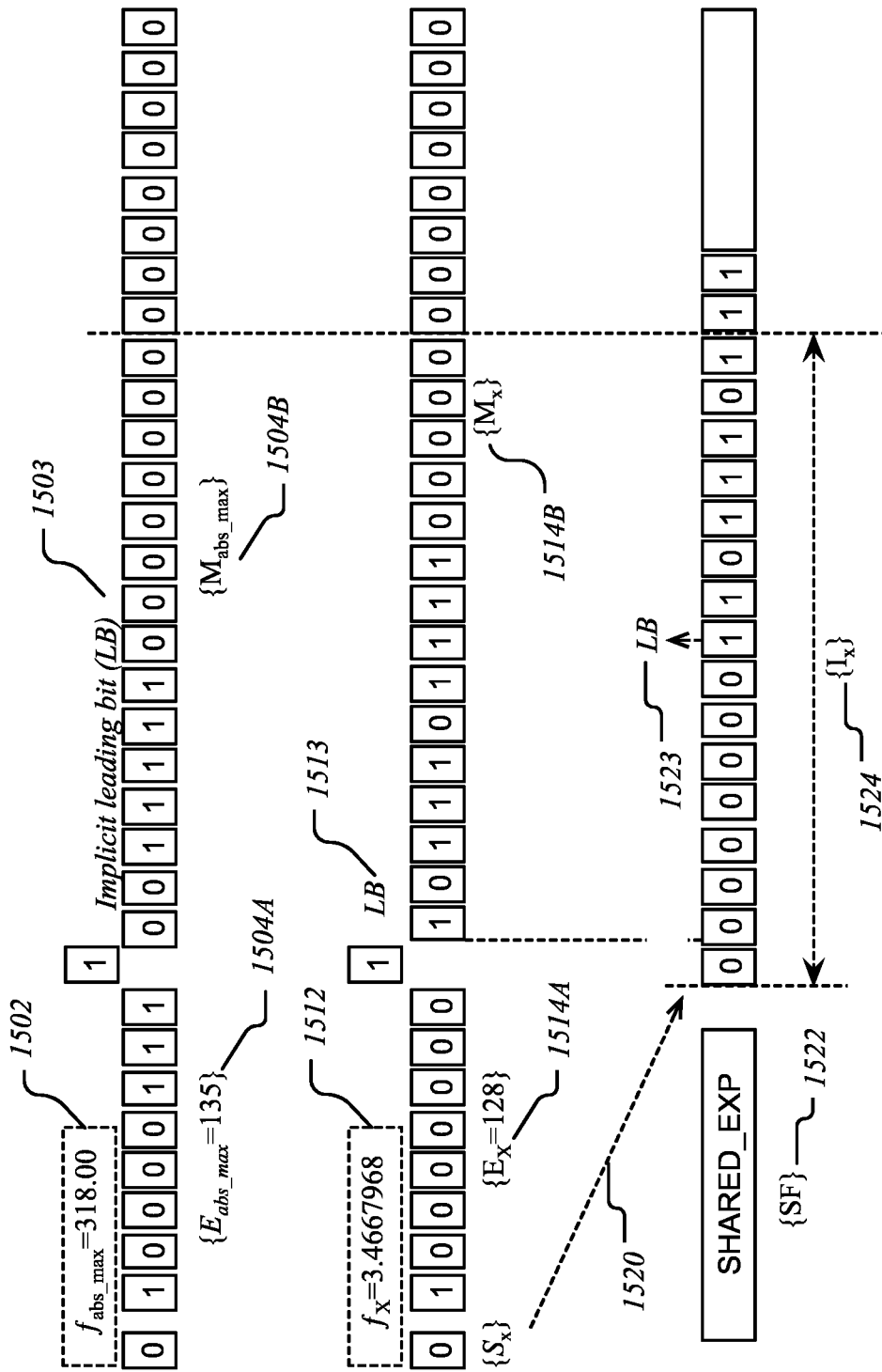
FIG. 15A illustrates dynamic fixed-point quantization, according to an embodiment.

FIG. 15A illustrates dynamic fixed-point quantization, according to an embodiment. Dynamic fixed-point quantization is performed based on the absolute max values within the tensor to be quantized. The illustrated quantization is performed as indicated by equation (1).

$$I_x = \{S_x, b_{Clip_{N-1}}(M_X >> ((E_{abs\_max} - E_x) + 1))\}, P = 16 \qquad (1)$$

The quantized value is associated with a shared scale factor (SF) which acts as a shared exponent for the tensor. SF is calculated as shown in equation (2).

$$SF = \{E_{abs\_max} - 127\} \qquad (2)$$

Equation (1) and equation (2) may be applied to quantize a value within a tensor, where the tensor has an absolute max value 1502 of 318.00 (($f_{abs\_max}$=318.00). The absolute max value 1502 is associated with an absolute max exponent 1504A and an absolute max mantissa 1504B, with the exemplary $E_{abs\_max}$=135. To quantize an exemplary floating-point value 1512 ($f_x$=3.4667968) having an exponent 1514A ($E_x$) and a mantissa 1514B (M), the mantissa 1514B is right shifted by the difference between the exponent 1514A and the absolute max value exponent to create a magnitude integer 1524 ($I_x$), with the implicit leading bit 1513 (LB) stored as an explicit bit 1523 within the magnitude integer 1524. The sign bit 1520 ($S_x$) is maintained for the quantized fixed-point value. The scaled exponent scale factor 1522 (SF) is computed as shown in equation (2) above.

Figure 15B:
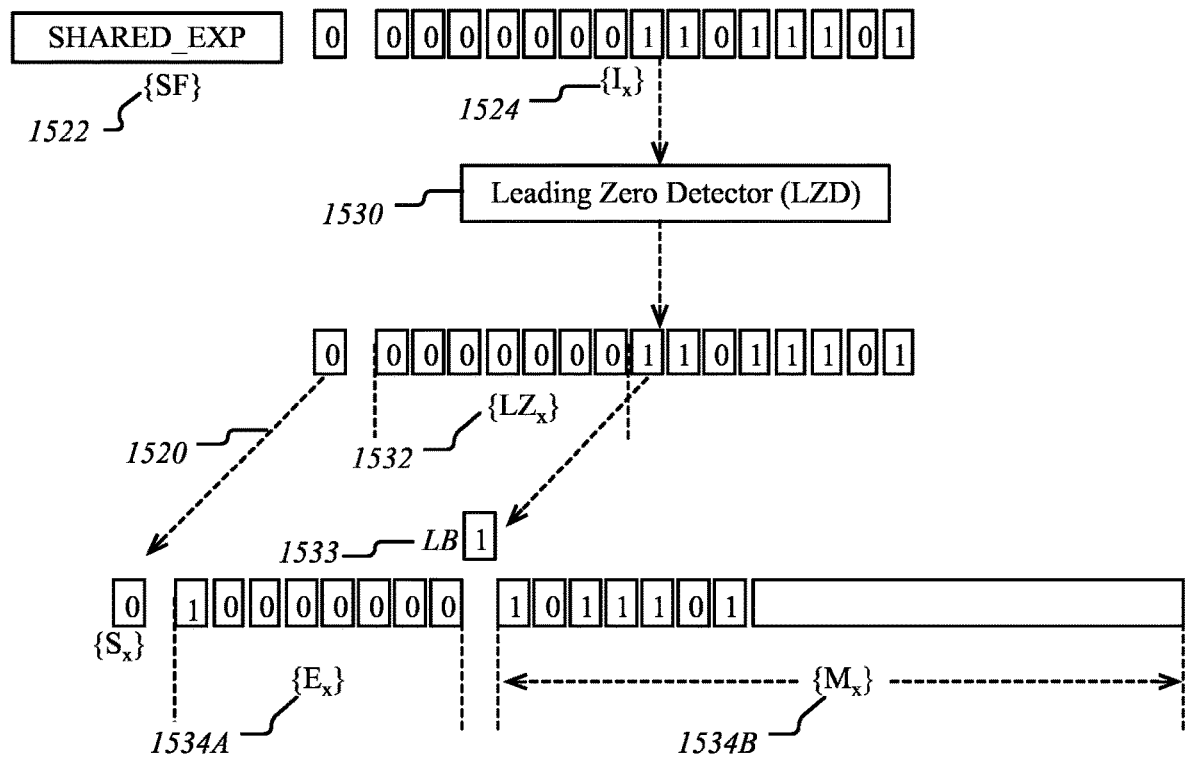
FIG. 15B illustrates de-quantization, according to an embodiment.

FIG. 15B illustrates de-quantization, according to an embodiment. In one embodiment de-quantization is the reverse of quantization. The common scale factor 1522 can be used to convert each magnitude integer 1524 ($I_x$) into a floating-point value after a round of fixed-point computations. The magnitude integer 1524 ($I_x$) is converted by passing the value into a leading zero detector logic 1530 (LZD) to generate an $LZ_x$ value 1532 that indicates the number of leading zeros in the magnitude integer 1524. The magnitude integer 1524 ($I_x$) is left shifted by shift logic based on the $LZ_x$ value 1532 and the explicitly stored leading bit is restored to an implicit leading bit 1533. As with quantization, the sign bit 1520 is unchanged. The de-quantized exponent 1534A ($E_x$) is computed as shown in equation (3).

$$E_x = \{127 + SF + LZ_x + 1\} \qquad (3)$$

The floating-point value can then be constructed based on the de-quantized sign, exponent, and mantissa.

A generic dynamic fixed-point formulation is shown in the equations to follow. To convert a 32-bit floating-point tensor $f_{tensor}$ into dfp$_{tensor}$, where $f_{tensor} = \{f_0, f_1, f_2, \ldots f_n\}$, a shared block exponent (e.g., scale factor SF) is computed via equation (4).

$$SF = SH_{exp} = E(\text{maxabs}(f_{tensor})) - 127 \qquad (4)$$

Furthermore, dfp$_{tensor} = \{I_{tensor}, SF\}$, where $I_{tensor} = \{I_0, I_1, I_2, \ldots I_n\}$. Elements of $I_{tensor}$ are computed as in equation (5).

$$I_x = \lfloor f_x \times 2^{(P-SF-2)} \rfloor \qquad (5)$$

In equation (5), P is the number of bits used to represent $I_x$. For example, for a 16-bit dynamic fixed-point value (dfp$^{16}$), P=16.

FIG. 16A illustrates equations for arithmetic operations (addition, multiplication) and down conversion to support input and output of a 16-bit dynamic fixed-point format. The equations are defined where dfp$_1^{16}$=⟨$I_1^6$, SF$_1$⟩ and dfp$_2^{16}$=⟨$I_2^{16}$, SF$_2$⟩ are values from two different 16-bit dfp tensors, then addition 1610, multiplication 1620, and down conversion 1630 can be defined as illustrated. The addition 1610 arithmetic operation is defined as:

$$dfp_1^{16} + dfp_2^{16} = \langle I_{sum}^{16}, \max(SF_1, SF_2) \rangle, \text{ where}$$

$$I_{sum}^{16} = (I_1^{16} >> (\max(SF_1, SF_2) - SF_1)) + (I_2^{16} >> (\max(SF_1, SF_2) - SF_2))$$

The multiplication 1620 arithmetic operation is defined as:

$$dfp_{prod}^{32} = dfp_1 \times dfp_2 = \langle I_{prod}^{32}, (SF_1 + SF_2) \rangle, \text{ where}$$

$$I_{prod}^{32} = I_1^{16} * I_2^{16} \text{ is a 32-bit integer}$$

The down conversion 1630 arithmetic operation (dft$^{32}$→dft$^{16}$) is defined as:

$$dfp_{dc}^{16} = \langle I_{dc}^{16}, (sf^{32} - R_{shift}) \rangle, \text{ where}$$

$$I_{dc}^{16} = (I^{32} >> R_{shift}) \text{ and } R_{shift} = (16 - LZC(I^{32}) - 1)$$

In the above equation, LZC refers to a leading zero count operation.

Embodiments described herein are not limited to computations using 16-bit dynamic fixed-point data types. One embodiment provides for computational logic having support for hardware accelerated primitives to perform conversion between floating-point and dynamic fixed-point data of varying sizes. Such embodiment can also provide support for hardware accelerated primitives to perform arithmetic operations on dynamic fixed-point data.

When converting floating-point tensors to dynamic fixed-point, the shared exponent is derived from the exponent of absolute maximum value of the floating-point tensor. If F if a floating-point tensor, the exponent is the absolute maximum value as expressed by equation (6).

$$E_{fmax} = E\binom{max}{\forall f \in F}|f| \qquad (6)$$

The value of the shared exponent $E_s$ is a function of $E_{fmax}$ and the number of bits P used by the output integer tensor I, as shown in equation (7).

$$E_s = E_{fmax} - (P - 2) \qquad (7)$$

The relationship of the resulting DFP tensor ⟨I–$E_s$⟩ with the input floating-point tensor F is expressed as in equation (8).

$$\forall i_n \in I, f_n = i_n \times 2^{E_s}, \text{ where } f_n \in F \qquad (8)$$

Based on the basic formulation above, a set of dynamic fixed-point primitives for use in neural network training can be defined as shown below, and as illustrated in FIG. 16B.

FIG. 16B illustrates equations for hardware accelerated dynamic fixed-point primitives, according to an embodiment. Operations for an addition 1640 primitive can be defined as:

$$i_{a+b} = \begin{cases} i_a + (i_b \gg (E_s^a - E_s^b)), & \text{when } E_s^a > E_s^b \\ i_b + (i_a \gg (E_s^b - E_s^a)), & \text{when } E_s^b > E_s^a \end{cases} \text{ and exponent, } E_s^{a+b} = \max_{E_s^a, E_s^b}$$

Operations for a multiplication primitive 1650 can be defined as:

$$i_{ab} = i_a \times i_b \text{ and exponent, } E_s^{ab} = E_s^a + E_s^b$$

In one embodiment, when a fused multiply and add operation is performed, all products can have the same shared exponent: $E_s^{ab} = E_s^a + E_s^b$, hence the sum of such products has the same shared exponent.

Down conversion can be performed to scale higher-precision dynamic fixed-point data output from one layer of a neural network to a lower precision for input to a subsequent layer. Data of an N-bit I tensor can be right-shifted R S bits to fit into a lower precision tensor. Operations for a down-conversion primitive 1660 can be defined as:

$$R_s = P - LZC\binom{max}{\forall i_{ab} \in I^N} |i_{ab}|)$$

$$I_{ab}^d = i_{ab} \gg R_s \text{ and exponent, } E_s^{ab} + = R_s$$

While dynamic precision is described herein with respect to fixed-point computations, dynamic precision operations can be also extended to floating-point, low precision floating-point, and custom defined floating-point data types. In particular, blocked dynamic precision operations, as described further in FIG. 21A-21D, can be applied generally to low-precision data types to enable computations on data having a larger dynamic range that could otherwise be supported by low-precision data types.

Biased Rounding for Training Low-Precision Integer Neural Networks

One embodiment provides a method and apparatus for biased rounding to improve training accuracy using low-precision integer networks. The biased rounding technique described herein realizes performance equal to or better than stochastic rounding techniques in use in some implementations of low-precision training. The biased rounding technique avoids the requirement of a random number generator for computing the random numbers used in stochastic rounding, enabling reduced latency and power consumption relative to stochastic rounding.

In one embodiment, biased rounding techniques are performed when performing a quantization from a 32-bit floating-point value to a 16-bit dynamic fixed-point value or when down-converting a 32-bit dynamic fixed-point value to a 16-bit dynamic fixed-point value. The biased rounding techniques improve the likelihood that the quantized or down-converted data set has a similar data distribution as the pre-quantized or pre-down-converted data The biased rounding logic is configured to have a bias towards rounding up. In one embodiment this bias is enabled using an extra bit that represents 0.25ε as the bias bit, where ε is the smallest value that can be represented in the target precision. A truth table for the rounding decision for a single bias bit is shown in Table 5.

TABLE 5

| Biased Rounding Truth Table | | |
|---|---|---|
| Round Bit | Bias Bit | Rounding |
| 0 | 0 | DOWN |
| 1 | 0 | UP |
| 0 | 1 | UP |
| 1 | 1 | UP |

The bias towards rounding up is shown in Table 5, where a round-up is performed unless both the round bit and the bias bit are zero. The truth table of Table 5 is exemplary of one embodiment in which a single round bit and a single bias bit are present. In one embodiment, two bias bits are present. In other embodiments, three or more bias bits are present. In such embodiments, the bias can be adjusted based on the input data distribution.

Figure 17:
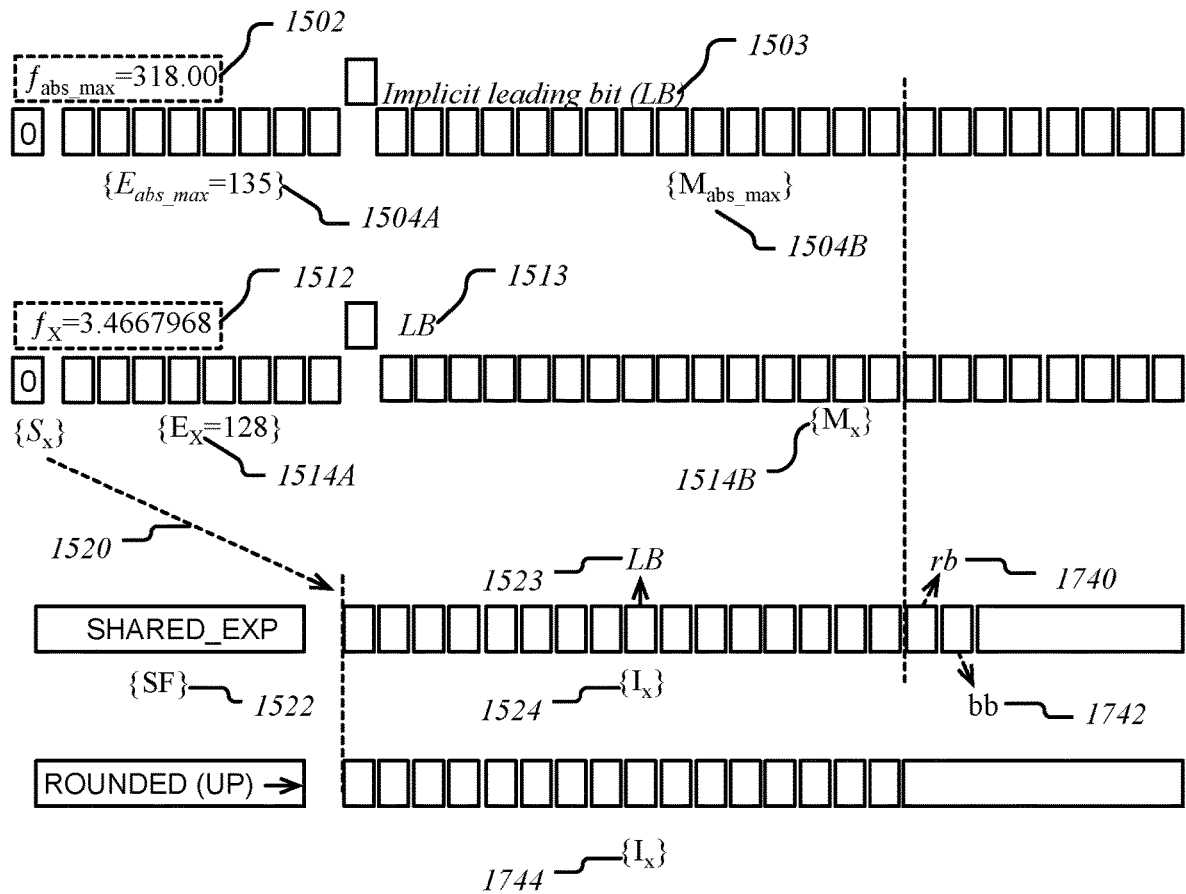
FIG. 17 illustrates floating-point to dynamic fixed-point biased rounding, according to an embodiment.

FIG. 17 illustrates floating-point to dynamic fixed-point biased rounding, according to an embodiment. Quantization with biased rounding as illustrated in FIG. 17 is similar to quantization as illustrated in FIG. 15A. Additionally, a round bit 1740 and a bias bit 1742 are used to capture bits that would otherwise be lost during the right shift to generate the integer magnitude value. Based on the round bit 1740 and bias bit 1742 valued, a truth function or truth table, such as the truth table shown in Table 5, is applied based on the round and bias values. A rounded magnitude 1744 can then be generated that is rounded or not rounded based on the truth table.

Dynamic Precision Management for Integer Deep Learning Primitives

Overflow and/or saturation of accumulator during integer arithmetic operations introduces significant computational errors while performing longer accumulation chains (such as GEMM or Convolution). One embodiment enables techniques to dynamically adjust the effective precision of the input using dynamic fixed-point representation to prevent such errors with a minimum impact on accuracy.

Figure 18:
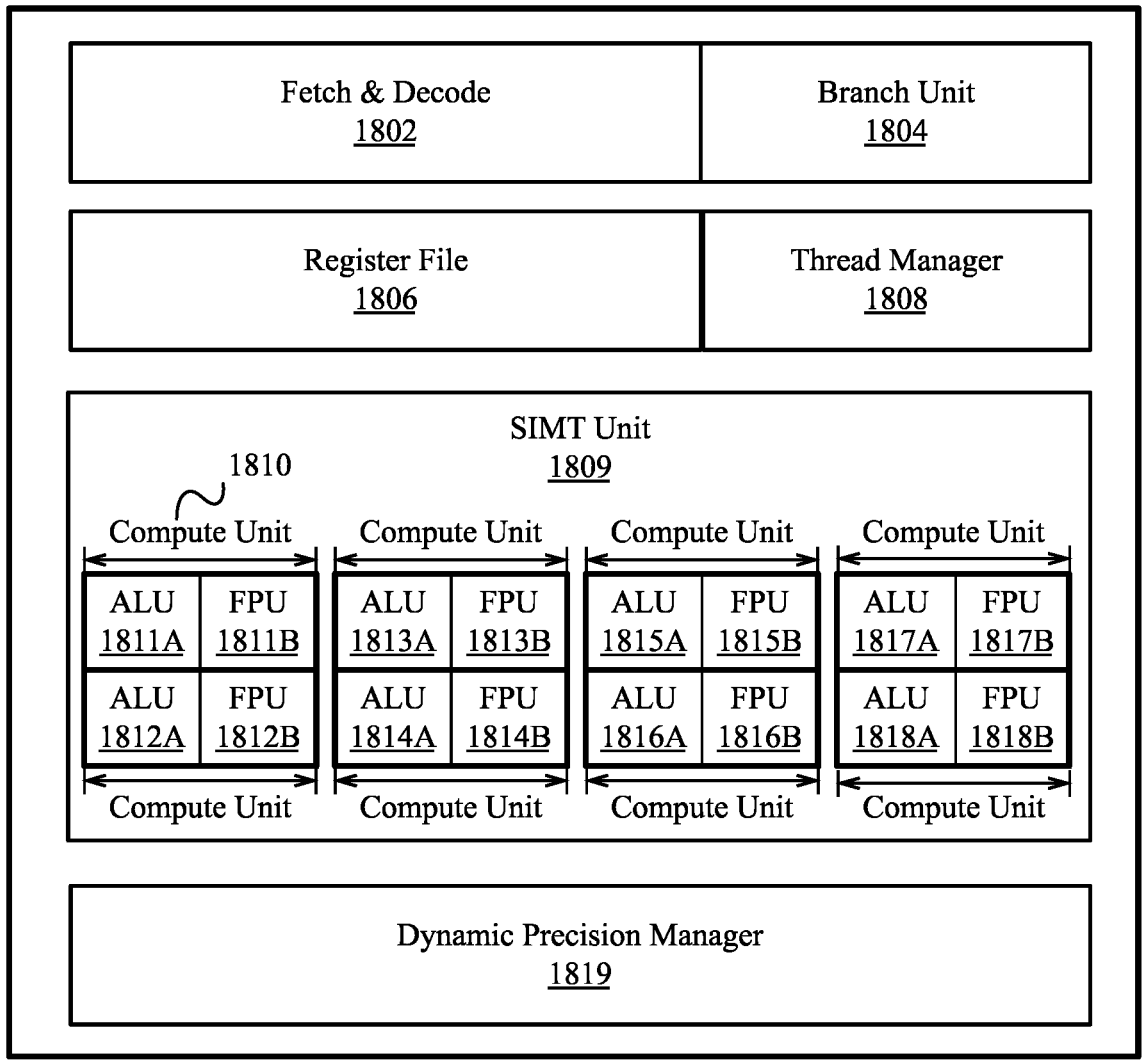
FIG. 18 is a block diagram of a multiprocessor unit, according to an embodiment.

FIG. 18 is a block diagram of a multiprocessor unit 1800, according to an embodiment. The multiprocessor unit 1800 can be a variant of a graphics multiprocessor 234 of FIG. 2D. The multiprocessor unit 1800 includes a fetch and decode unit 1802, a branch unit 1804, a register file 1806, a thread manager 1808, a single instruction multiple thread unit (SIMT unit 1809), and a dynamic precision manager 1819. The fetch and decode unit 1802 can fetch an instruction for execution by the multiprocessor unit 1800. The instruction can cause one or more of the compute units (e.g., compute unit 1810) of the SIMT unit 1809 to perform computational operations associated with a neural network as described herein. In one embodiment, the instruction causes a compute unit 1810 to perform a dynamic precision computation using a dynamic fixed-point data type as described herein. The branch unit 1804 can compute instruction pointer adjustments based on an executed jump instruction. The register file 1806 can store general-purpose and architectural registers used by the SIMT unit 1809. The thread manager 1808 can distribute and re-distribute threads among the compute units of the SIMT unit 1809. In one embodiment, the SIMT unit 1809 is configured to execute a single instruction as multiple threads, with each thread of the instruction executed by a separate compute unit. In one embodiment compute unit 1811 through compute unit 1818 each includes an integer ALU (e.g., ALU 1811A-1818A) and a floating-point unit (e.g., FPU 1811B-1818B). The voltage and frequency of each compute unit 1811-1818 within the SIMT unit 1809 can be dynamically managed by a voltage and frequency manager, which can increase or decrease the voltage and clock frequency supplied to the various compute units as components of the compute units are enabled and disabled.

In some previously enable configurations, each compute unit can execute a single thread of either an integer instruction or a floating-point instruction. If any of ALU 1811A-1818A is tasked to execute a thread of an integer instruction, respective FPU 1811B-FPU 1418B is unavailable for use to execute a thread of a floating-point instruction and may be power gated during the operation of the corresponding ALU 1811A-ALU 1818A. For example, while ALU 1811A may execute a thread of an integer instruction while FPU 1813B executes a thread of a floating-point instruction, FPU 1811B is power gated while ALU 1813A is active. Embodiments described herein overcome such limitations by enabling, for example, ALU 1811A to execute thread of an instruction while FPU 1811B executes a thread of a different instruction. Furthermore, one embodiment provides support for mixed precision or mixed data-type operands, such that a single instruction can simultaneously perform operations for an instruction having floating-point and integer operands and/or operands having different precisions.

Embodiments described herein enable increased operational throughput for a cluster of compute units by making all logic units within each compute unit available to perform computations. In such embodiments, logic units within a compute unit that are designed to perform computations selectively at one of multiple precisions or multiple data types can be configured to perform multiple simultaneous operations for each precision or data type supported by the compute unit. For a given compute unit 1811-1818, ALUs 1811A-1818A can perform integer operations while FPU 1811B-1818B perform floating-point operations. These operations can be performed for a single instruction or for multiple instruction In one embodiment, the dynamic precision manager 1819 can be configured to dynamically adjust the precision of compute operations, for example, to prevent overflows from occurring during a chain of accumulations. Longer accumulation chains typically require larger accumulators. The number of extra bits needed for the accumulator are ~$\log_2 n$, where n is the number of accumulations. Some embodiments described herein can be configured to dynamically adjust the 'effective precision' of the computation. Such techniques can be applied on input data and/or the intermediate output of the ongoing accumulation chain. Intermediate data is shifted 'right' by $R_{shift}$ before passing the *intermedia* data through next iteration of computation. The $R_{shift}$ value is computed based on heuristics and can be incremented or decremented to keep as many precision bits as possible while keeping overflow in check.

Figure 19A:
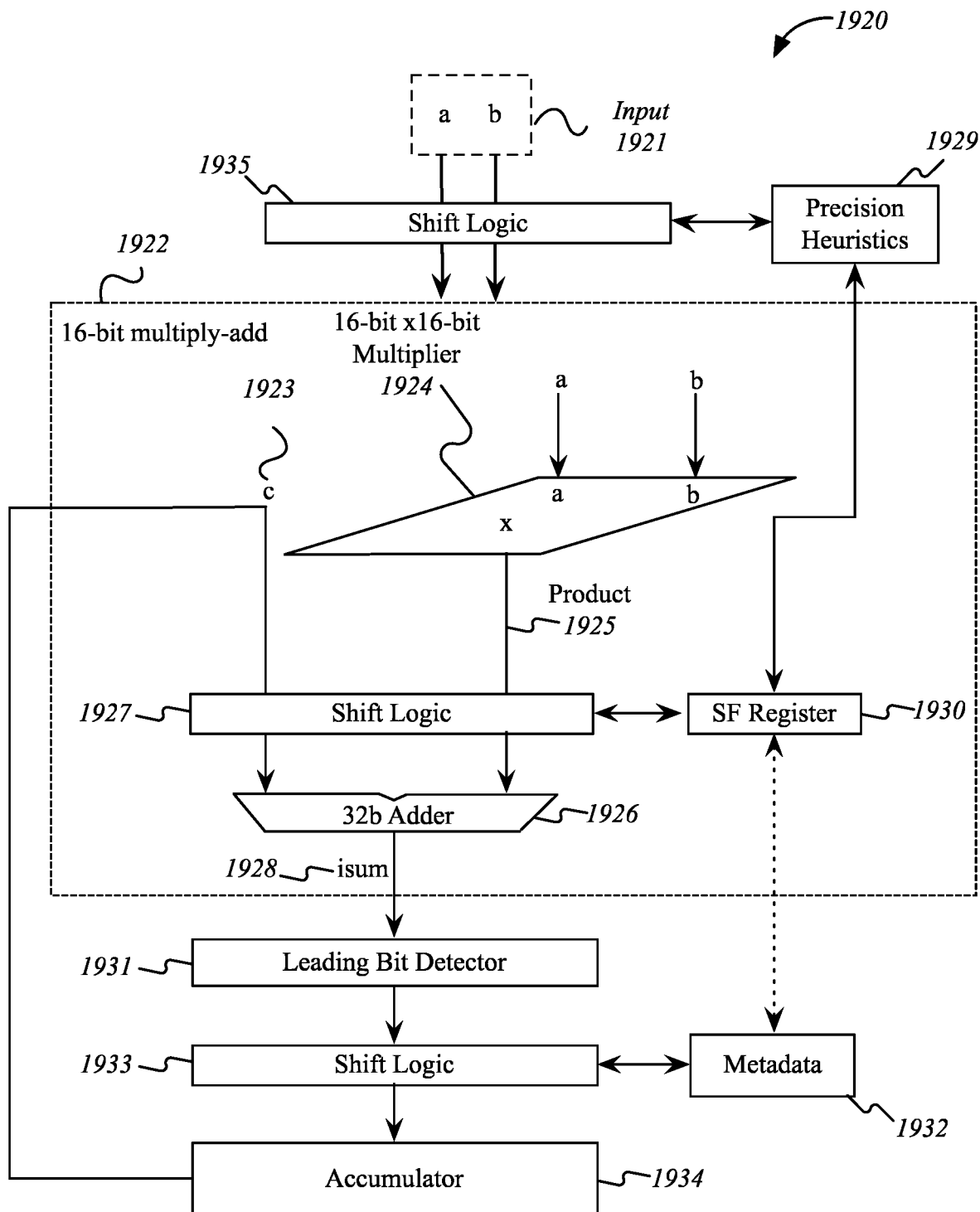
FIG. 19A-19B illustrates a logic unit that can be configured with dynamic precision capability, according to an embodiment.
Figure 19B:
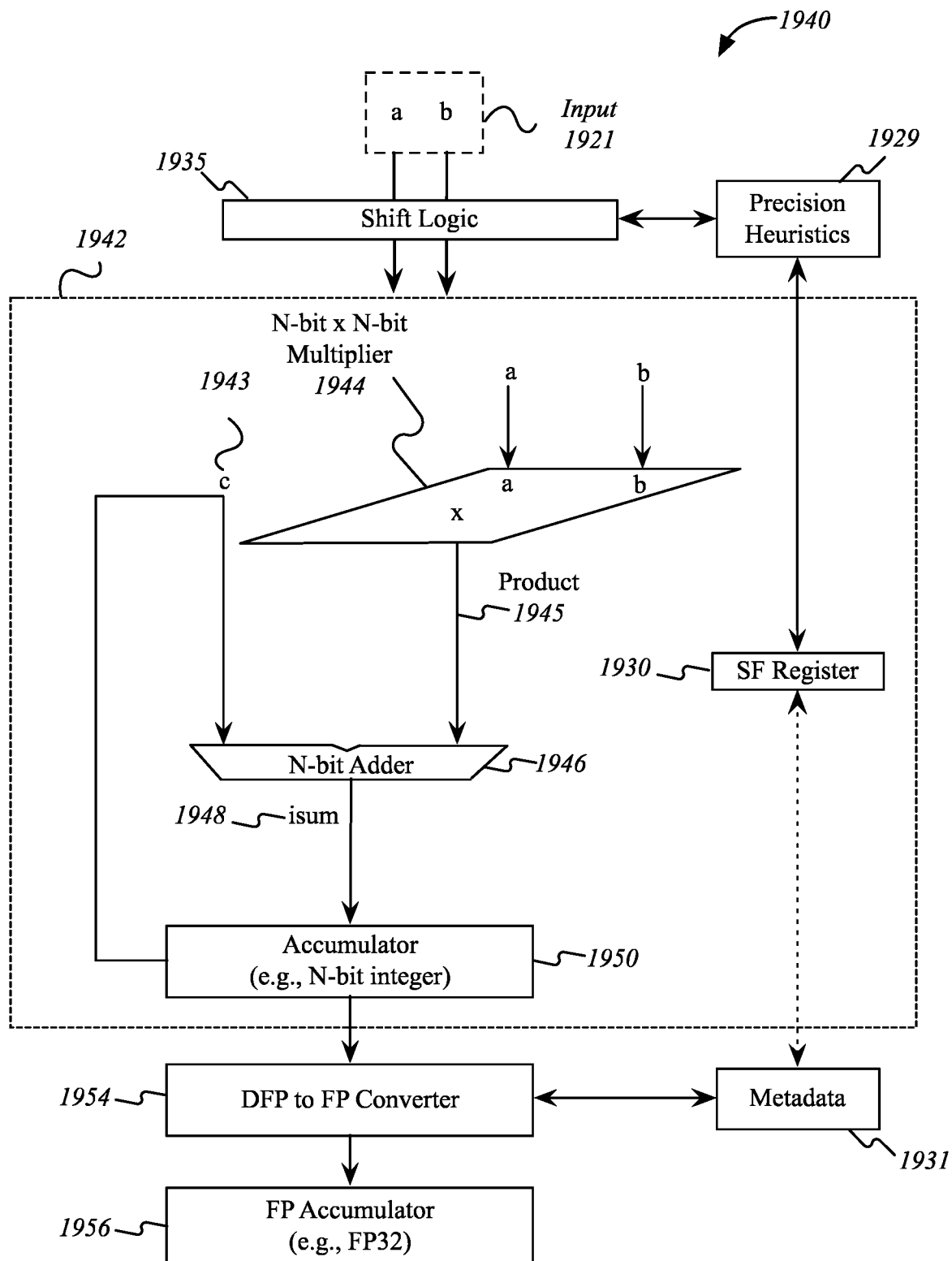

FIG. 19A-19B illustrates logic units 1920, 1940 configured with dynamic precision capability, according to embodiments. In one embodiment, the logic units 1920, 1940 can reside within a compute unit 1810 as in FIG. 18.

As shown in FIG. 19A, a logic unit 1920 can process input values 1921 by 16-bit multiply-add logic 1922 that includes a 16b×16b multiplier 1924 and a 32-bit adder 1926. The 32-bit adder 1926 can add a product 1925 of a multiply operation with an accumulator value 1923 read from an accumulator 1934, which in one embodiment is a 32-bit integer register. The 32-bit adder 1926 can output an integer sum 1928 that is in a dynamic fixed-point representation. At various points within the logic, shifters (e.g., shift logic 1927, 1933, 1935) can be used to shift the results to dynamically adjust precision and prevent overflow. A shared exponent, or scale factor (SF), can be stored in an SF register 1930 to enable reversion of the precision preserving shifts to generate output data. The scale factor stored in the SF register 1930 can be determined based on a precision heuristics unit 1929, which can adjust the scale factor to keep as many precision bits as possible without overflowing. The precision heuristics unit 1929, in one embodiment, can reside at least in part in the dynamic precision manager 1819 of FIG. 18.

In one embodiment, metadata 1932 can also be maintained along with a block of dynamic fixed-point data to track a shared scale factor for the data. The metadata 1932 can be stored in line with a block of the dynamic fixed-point data or can be stored in a separate metadata structure that tracks scale factors for multiple blocks of dynamic fixed-point data. In one embodiment, the metadata can be, or can be derived from, scale factor data that is stored in the scale factor register 1930. In one embodiment the metadata for a block of dynamic fixed-point data can be used by shift logic 1933 to shift the dynamic fixed-point data before storing the data in an accumulator 1934. In one embodiment, a leading bit detector 1931 can be used to detect leading ones or leading zeros in the integer sum 1928. In such embodiment, the number of leading zeros or leading ones can be used as a heuristic to determine whether to shift intermediate output. In one embodiment, the leading bit detector 1931 can be configured to detect only leading zeros when an absolute value is to be examined.

While specific sizes of data types and logic units are illustrated in FIG. 19A, embodiments are not limited to any specific size, as the size of the multiplier 1924, adder 1926, and other logic described herein can vary across embodiments. Additionally, dynamic precision logic described herein is not limited to dynamic precision fixed-point (e.g., integer) logic and data types.

FIG. 19B illustrates dynamic precision computation using combined dynamic fixed-point and floating-point operations. A logic unit 1940 similar to logic unit 1920 can replace shift logic 1927, 1933 with floating-point logic elements capable of computations with a larger dynamic range. Logic unit 1940 can include an inner block 1942 including an N-bit×N-bit integer multiplier 1944 that outputs an integer product 1945 of a pre-determined bit length based on the instruction or primitive to be executed, or parameters provided to the instruction or primitive to be executed. An N-bit adder 1946 can add the product 1945 with an accumulator value 1943 read from an accumulator 1950, which can be an integer register of one of multiple pre-determined sizes (e.g., 8-bit, 16-bit, 32-bit, 40-bit, etc.). The inner block 1942 can be configured to execute a number of multiply and accumulate passes on input data, where the number of passes is determined to be a number that will not overflow the bit length configured for the inner block 1942. In one embodiment, the number of passes to be performed by the inner block 1942 can be predetermined for an input 1921 by the dynamic precision manager 1819 as in FIG. 18 and configured via the precision heuristics unit 1929.

Once a pre-determined number of iterations has been performed by the inner block 1942, the data can be converted from dynamic fixed-point to floating-point via a dynamic fixed-point to floating-point converter unit 1954. The conversion can be performed based on a pre-scale factor stored as part of the metadata 1932 for the output tensor. The converted output can then be accumulated to a floating-point accumulator register 1956, which in one embodiment can be a 32-bit (FP32) register. In one embodiment, additional operations for the tensor data can be performed in floating-point. Logic 1940 can be used to enable training for a dataset to be performed at least in part in a dynamic fixed-point precision, enabling a performance and efficiency gain during the earlier portion of training, reducing the overall training time for a neural network.

Figure 20:
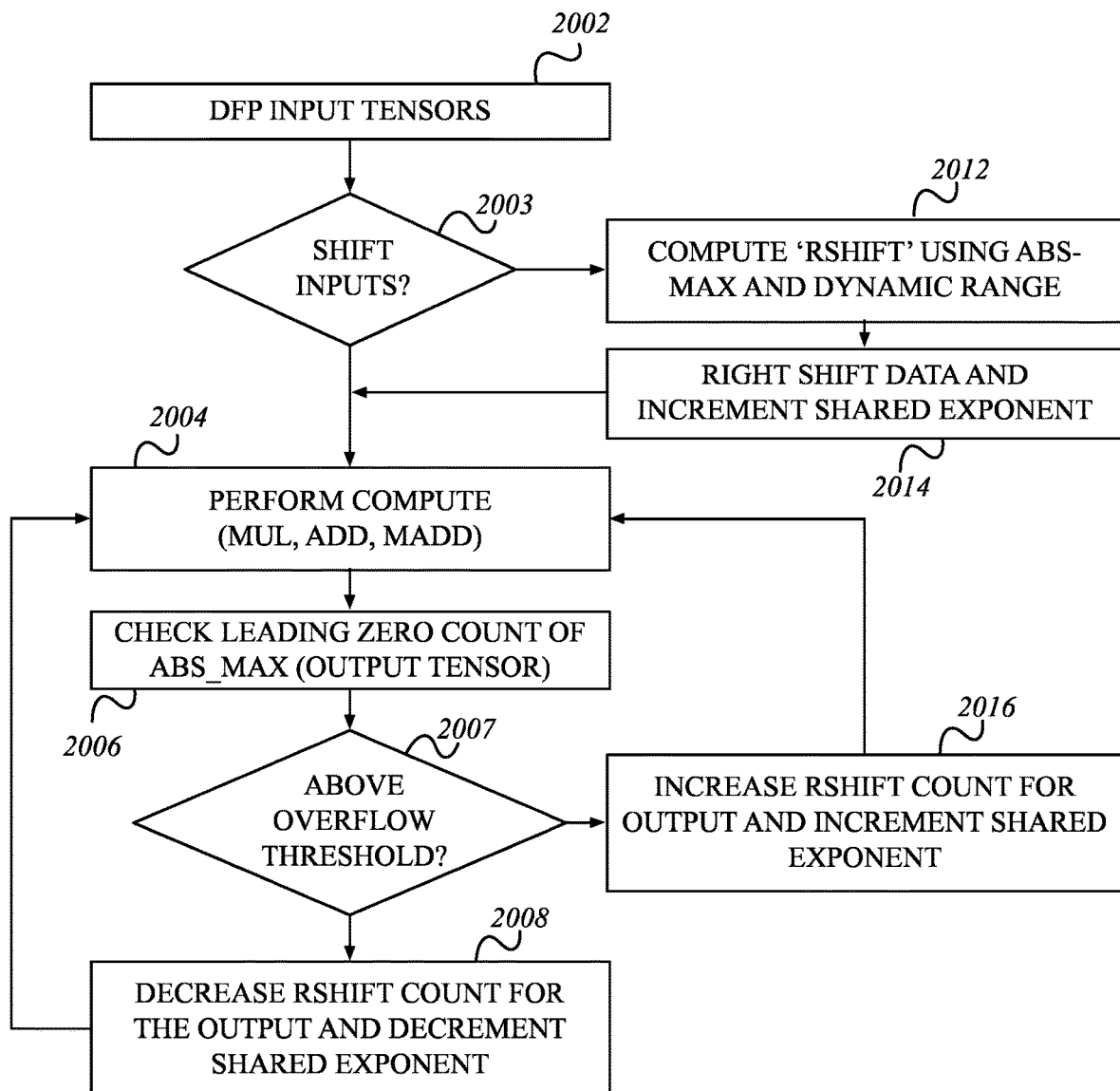
FIG. 20 is a flow diagram illustrating logic to enable dynamic precision management for integer deep learning primitives, according to an embodiment.

FIG. 20 is a flow diagram illustrating logic 2000 to enable dynamic precision management for integer deep learning primitives, according to an embodiment. The logic 2000 can receive a set of dynamic fixed-point tensors as input, as shown at block 2002. The logic 2000 can then determine whether the shift the inputs, as shown at block 2003. If the inputs are to be shifted, the logic 2000 can compute an 'rshift' (right-shift) value using the absolute max value and dynamic range of the tensors at block 2012. The logic 2000 can then right-shift the data based on rshift value and increment the shared exponent, as shown at block 2014. If a shift is not required, or after the shift is performed, the logic 2000 can then perform the necessary compute operations (e.g., MUL, ADD, MADD) at block 2004.

After the compute operation is performed at block 2004, the logic 2000 can then check the leading zero count of the absolute max of the output tensor at block 2006. If the leading zero count is above the overflow threshold at block 2007, then the logic 2000 can adjust the precision of the output tensor based on the leading zero count. Adjusting the precision of the output tensor includes adjusting the rshift count the shared exponent for the output. For example, the logic 2000 can increase the rshift count for the output and increment the shared exponent if the leading count zero is above the overflow threshold at block 2016. Otherwise the logic 2000 can decrease the rshift count for the output and decrement the shared exponent at block 2008. Adjusting the rshift count can include adjusting an rshift counter configured to track a degree of right-shift applied to the output tensor. Adjusting the right shift count can correspond with applying a right-shift to the output data. After the increasing or decreasing the rshift counter and incrementing or decrementing the shared exponent, additional compute operations can be performed by returning to block 2004.

FIG. 21A-21D illustrate blocked dynamic multi-precision data operations, according to embodiments described herein. Blocked dynamic multi-precision data operations can be performed for dynamic fixed-point data and can also be generalized to enable block level scaling for any low precision data type. In a training scenario, some tensors can be blocked, while other tensors can be non-blocked. For example, back propagation may require a larger dynamic range, so the computational logic can be configured to block the tensor data using smaller block sizes. For forward propagation computations, blocking may not be required.

In one embodiment, variable block sizes can be used, with the block sizes and scale factors maintained in metadata for the data block. When processing blocked, multi-precision tensor data, computational logic can read the metadata for a block and configure the computational units to perform logic operations on the data block.

Figure 21A:
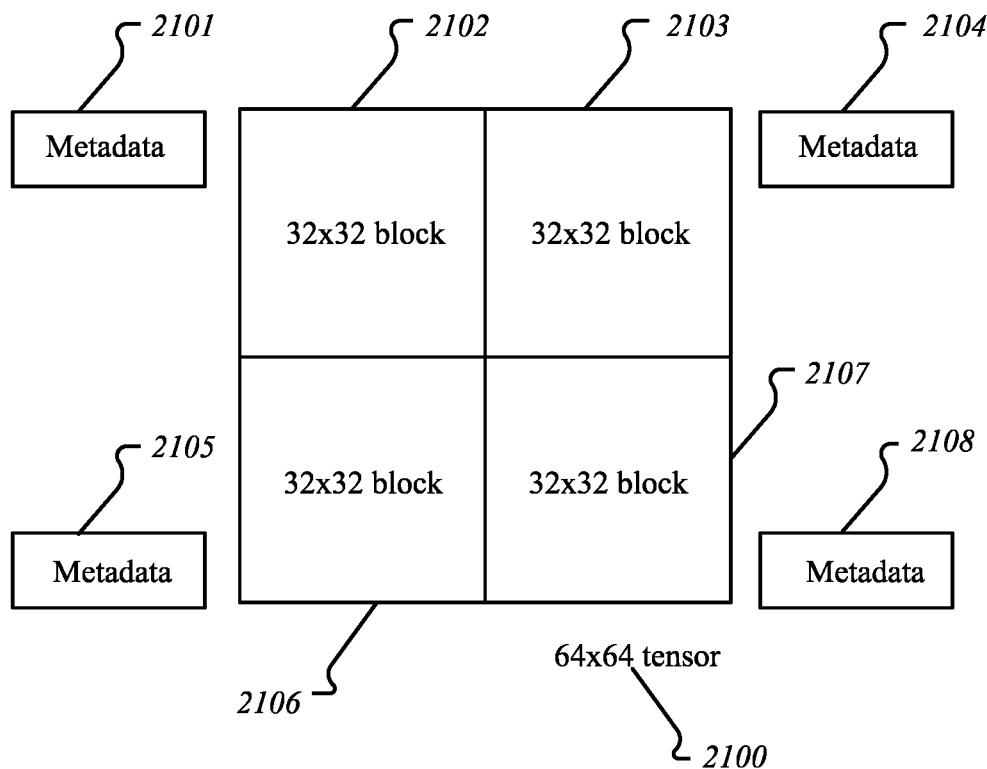
FIG. 21A-21D illustrate blocked dynamic fixed-point and low-precision floating-point data, according to embodiments described herein.
Figure 21B:
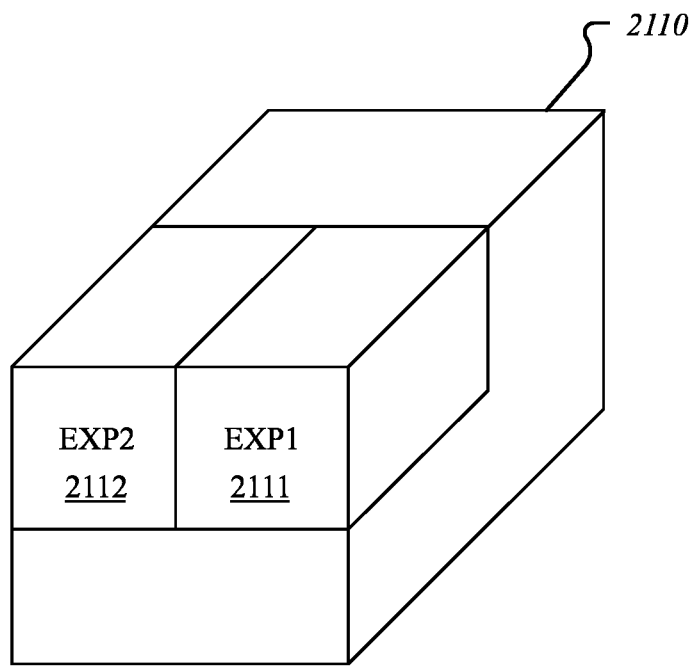
Figure 21C:
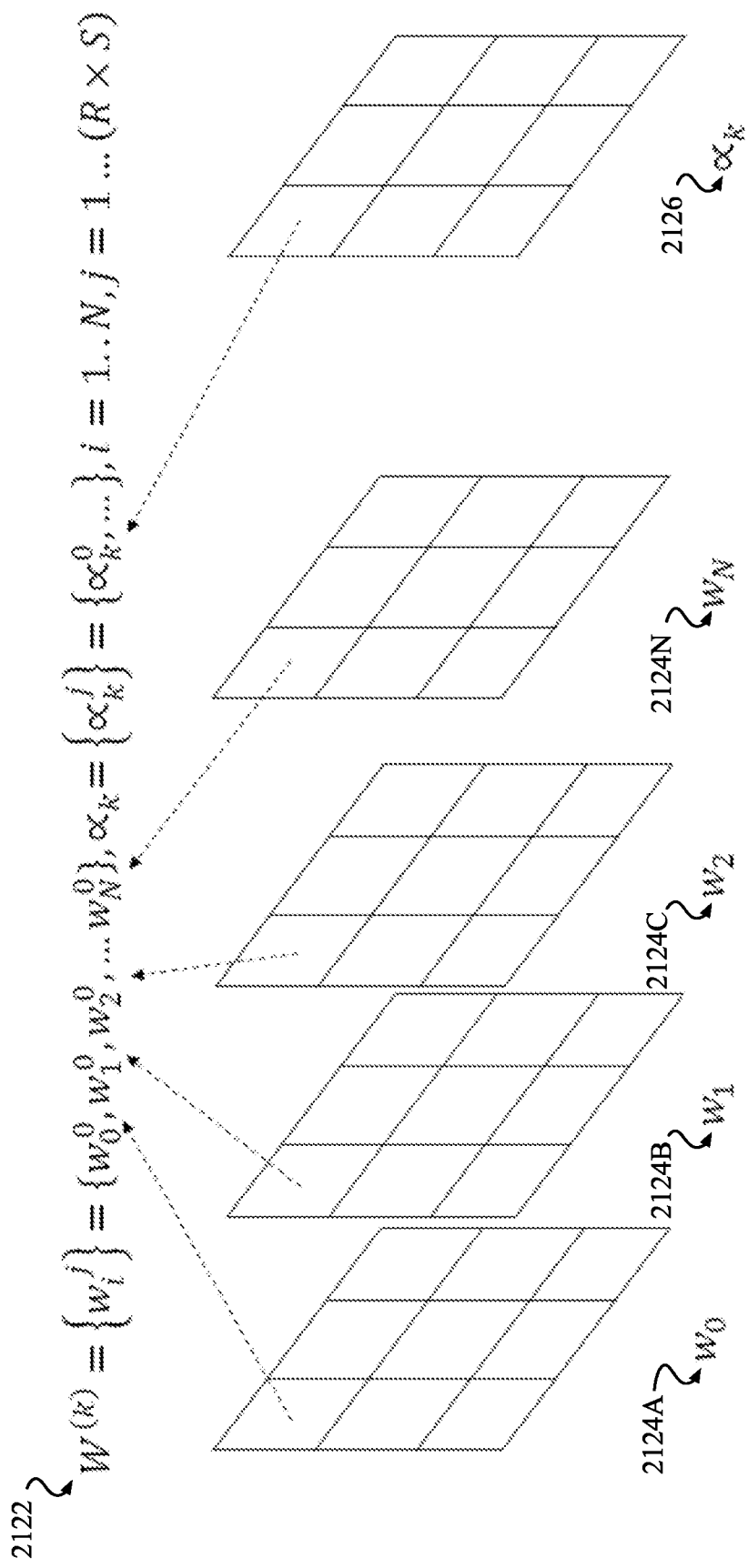
Figure 21D:
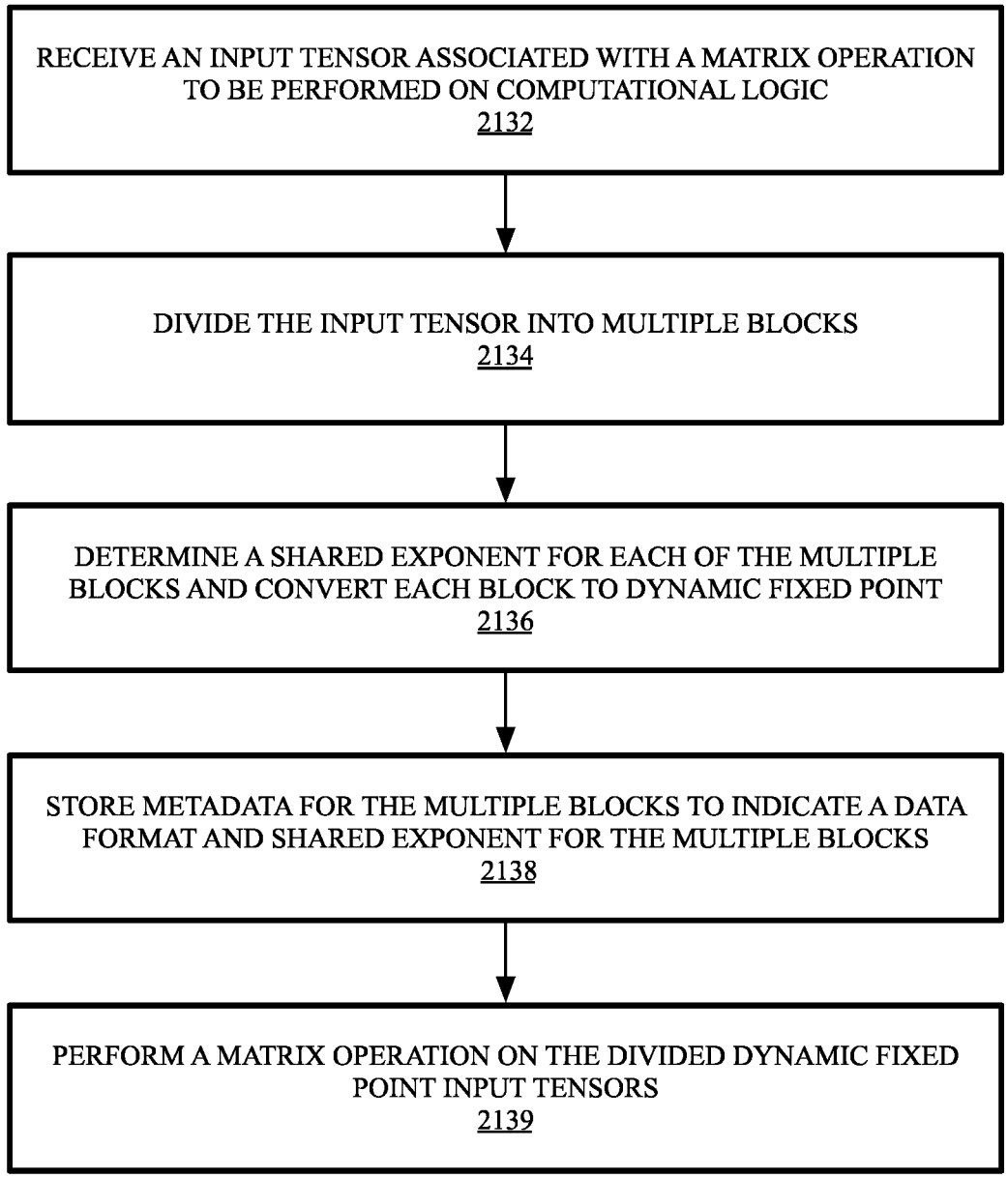

FIG. 21A illustrates a memory map associated with blocked dynamic fixed-point, according to an embodiment. FIG. 21B illustrates a blocked multi-dimensional fine-grained quantized tensor 2110, according to an embodiment. FIG. 21C shows an exemplary group 2120 of 3×3 filters that can be represented in a blocked dynamic-precision data type. FIG. 21D illustrates a process 2130 of performing blocked dynamic fixed-point operations, according to an embodiment.

A higher dynamic range requires more precision bits to represent the full range using integers. One solution is to split the tensor into smaller blocks with independent shared exponent while maintaining the integer data at lower precision. This technique is useful for expressing large matrix multiplication and convolution operations. Using smaller blocks enables higher effective precision within each block and helps achieve better overall accuracy using low-precision computation.

As illustrated in FIG. 21A, a 64×64 tensor 2100 can be divided into four 32×32 blocks 2102, 2103, 2106, 2107. Each of the 32×32 blocks can have a separate shared exponent/scaling factor in metadata 2101, 2104, 2105, 2108 associated with each block. The metadata 2101, 2104, 2105, 2108 can be stored contiguously with each of the 32×32 blocks 2102, 2103, 2106, 2107, or can be stored in a separate region of memory. In addition to shared exponent or scaling factor data, the metadata can also contain other terms used for data conversions, such as floating-point to fixed point or fixed-point to floating-point conversions. Additionally, blocking can be performed for tensors data stored in low-precision or custom floating-point formats, with the data being shifted or the floating-point format being adjusted to properly capture the dynamic range of the data within each block. Data to track the adjustments to the data and data format can be tracked via the metadata 2101, 2104, 2105, 2108.

While a 64×64 tensor 2100 is illustrated as having four 32×32 blocks 2102, 2103, 2106, 2107, embodiments are not limited to the illustrated tensor size and block size, and any tensor and block size can be used in various embodiments.

FIG. 21B illustrates a blocked multi-dimensional fine-grained quantized tensor 2110, according to an embodiment. The tensor 2110 can be partitioned into blocks along one or more dimensions, with each block having a separate shared exponent (e.g., EXP1 2111, EXP2 2112, etc.). The shared exponent data for the quantized tensor 2110 can be stored in metadata for the tensor. The metadata can maintain the exponent scaling factor for each block, as well as the block size for each block. In one embodiment, partitioning with variable block sizes can be performed along all dimensions of the tensor. A data representation can be generated that has variable size blocks in all dimensions of the tensor. For example, tensor data for use in a convolution operation can have N, C, H, and W dimensions corresponding sample, color channel, width, and height dimensions. Partitioning with variable block sizes can be performed along all dimensions of the tensor. Additionally, GEMM (general matrix multiply) kernels can have partitioning along M, N, and K dimensions that specify the number of rows and columns of matrices A and B to be multiplied (e.g., with M being the number of rows in matrix A, N being the number of columns in matrix B, and K being the number of columns in matrix A and the number of rows in matrix B). Multiple different types of blocking and clustering algorithms can be used to determine the block sizes for a tensor. Furthermore, tensor data can be blocked in a contiguous or non-contiguous manner using variable or non-uniform block sizes. Additionally, while blocked dynamic fixed-point representations are described herein, the blocked data representation can also be used for low precision floating-point data.

FIG. 21C shows an exemplary group 2140 of 3×3 filters that can be represented in a blocked dynamic-precision data type. The group 2140 of filters contains (R×S) sub groups of n elements from contiguous filters along the C dimension. The exemplary group 2140 can be described by equation 2142, which states $W^{(k)} = \{w_i^j\} = \{w_0^0, w_1^0, w_2^0, \ldots, w_N^0\}$, $\alpha_k = \{\alpha_k^j\}\{\alpha_k^J, \ldots\}$, i=1 . . . N, j=1 . . . (R×S). N filters 2144A-2144N ($w_0 \ldots w_N$) contain ternarized weights that are derived based on full precision weights. For each group 2140 of 3×3 filters, there will be a 3×3 filter containing a scaling factor 2146 ($a$) for each element in the filter. Hardware logic can be configured to perform low-precision computations using blocked, dynamic precision data. In one embodiment, the filter data can be quantized to a blocked, dynamic precision format that requires a reduced number of bits to store the data, while shifting the scale factor in a fine-grained manner to avoid data loss. The activations at each layer can be quantized to a low-precision format, such as a dynamic fixed-point or blocked flow-precision floating-point format.

As illustrated in FIG. 21D, computational logic to perform a process 2130 of implementing block dynamic fixed-point can receive an input tensor associated with a matrix operation to be performed on computational logic, as shown at block 2132. The computational logic can then divide the input tensor into multiple blocks, as shown at block 2134. For each of the multiple blocks, the computational logic can determine a shared exponent (e.g., scale factor) for each of the multiple blocks and concert each block to dynamic fixed-point, as shown at block 2136. The computational logic can then store metadata for the multiple blocks to indicate a data format for the shared exponent for the multiple blocks, as shown at block 2138. In one embodiment, the metadata for the multiple blocks is stored in a separate metadata segment in memory. In one embodiment, metadata for each of the multiple blocks is appended to or located adjacent to each block.

Once metadata is written for the input tensor, the computational logic can perform a matrix operation using the divided dynamic fixed-point input tensor, as shown at block 2139. In some embodiments, the computational logic includes hardware support for dynamic fixed-point. In one embodiment. metadata describing the data format of a block of the input tensor is stored at a pre-determined memory position relative to the tensor data. The hardware can automatically read the metadata for a block of the tensor and configure the logic units of the hardware to process the tensor data at the specified dynamic fixed-point configuration. For example, logic unit 1920 as in FIG. 19A, logic unit 1940 as in FIG. 19B, or a similar logic unit, can be configured to process tensor data in a dynamic fixed-point format.

Mixed precision training can be performed using low precision dynamic fixed-point data types to train a neural network at an accuracy similar to that of 32-bit floating point. One embodiment provides for a 16-bit dynamic fixed-point implementation, which was tested in training relative to training performed using FP32. Training was performed for several state of the art ImageNet-class CNNs using variants of the Berkeley Vision and Learning Center (BVLC) Caffe framework, with one variant modified add DFP16 data-type support. Using hardware acceleration of DFP16 compute primitives, an average of 1.8× speedup in training throughput was realize relative to baseline FP32 performance, with accuracy results as shown in Table 6 below.

TABLE 6

Training Configuration and ImageNet-1K Classification Accuracy

| Models | Batch-size/ Epochs | Baseline | | Mixed Precision DFP16 | |
| --- | --- | --- | --- | --- | --- |
| | | Top-1 | Top-5 | Top-1 | Top-5 |
| Resnet-50 | 1024/90 | 75.70% | 92.78% | 75.77% | 92.84% |
| GoogLeNet-v1 | 1024/80 | 69.26% | 89.31% | 69.34% | 89.31% |
| VGG-16 | 256/60 | 68.23% | 88.47% | 68.12% | 88.18% |
| AlexNet | 1024/88 | 57.43% | 80.65% | 56.94% | 80.06% |

As shown in Table 6 above, ImageNet-1K networks trained with DFP16 achieve state of the art accuracy, with some models exceeding the accuracy of the FP32 baseline. Convergence for DFP16 training tracks closely with FP32 training while realizing a potential of as much as 2X savings in computation, communication, and storage. While CNN training is illustrated, the techniques described herein can also be applied to other types of neural networks, such as RNNs, LSTM, and GANs (generative adversarial networks).

Additional Exemplary Graphics Processing System

Details of the embodiments described above can be incorporated within graphics processing systems and devices described below. The graphics processing system and devices of described below illustrate alternative systems and graphics processing hardware that can implement any and all of the techniques described above.

Figure 22:
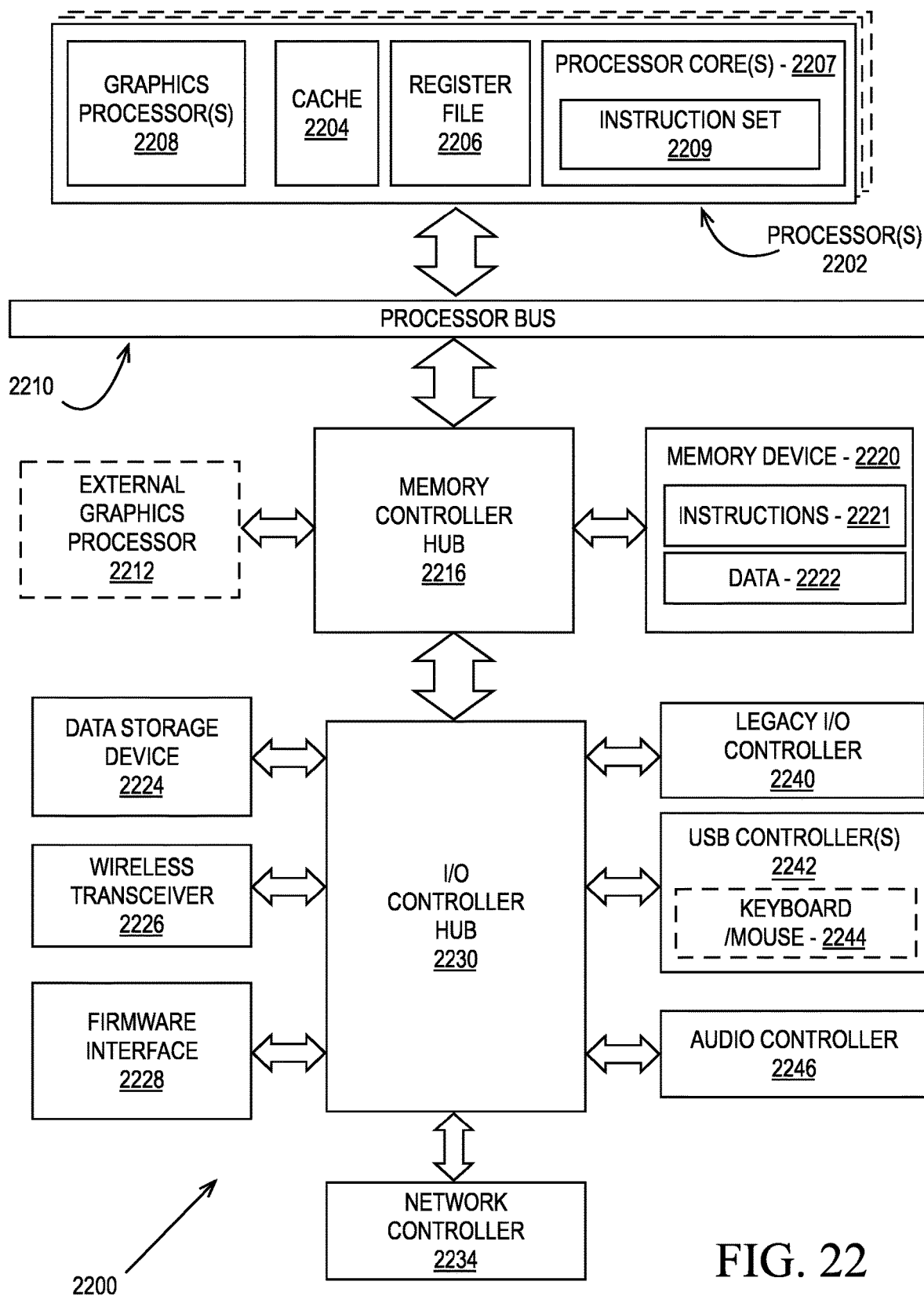
FIG. 22 is a block diagram of a processing system, according to an embodiment.

FIG. 22 is a block diagram of a processing system 2200, according to an embodiment. In various embodiments, the system 2200 includes one or more processors 2202 and one or more graphics processors 2208, and may be a single processor desktop system, a multiprocessor workstation system, or a server system having a large number of processors 2202 or processor cores 2207. In one embodiment, the system 2200 is a processing platform incorporated within a system-on-a-chip (SoC) integrated circuit for use in mobile, handheld, or embedded devices.

An embodiment of system 2200 can include or be incorporated within a server-based gaming platform, a game console, including a game and media console, a mobile gaming console, a handheld game console, or an online game console. In some embodiments system 2200 is a mobile phone, smart phone, tablet computing device or mobile Internet device. Data processing system 2200 can also include, couple with, or be integrated within a wearable device, such as a smart watch wearable device, smart eyewear device, augmented reality device, or virtual reality device. In some embodiments, data processing system 2200 is a television or set top box device having one or more processors 2202 and a graphical interface generated by one or more graphics processors 2208.

In some embodiments, the one or more processors 2202 each include one or more processor cores 2207 to process instructions which, when executed, perform operations for system and user software. In some embodiments, each of the one or more processor cores 2207 is configured to process a specific instruction set 2209. In some embodiments, instruction set 2209 may facilitate Complex Instruction Set Computing (CISC), Reduced Instruction Set Computing (RISC), or computing via a Very Long Instruction Word (VLIW). Multiple processor cores 2207 may each process a different instruction set 2209, which may include instructions to facilitate the emulation of other instruction sets. Processor core 2207 may also include other processing devices, such a Digital Signal Processor (DSP).

In some embodiments, the processor 2202 includes cache memory 2204. Depending on the architecture, the processor 2202 can have a single internal cache or multiple levels of internal cache. In some embodiments, the cache memory is shared among various components of the processor 2202. In some embodiments, the processor 2202 also uses an external cache (e.g., a Level-3 (L3) cache or Last Level Cache (LLC)) (not shown), which may be shared among processor cores 2207 using known cache coherency techniques. A register file 2206 is additionally included in processor 2202 which may include different types of registers for storing different types of data (e.g., integer registers, floating-point registers, status registers, and an instruction pointer register). Some registers may be general-purpose registers, while other registers may be specific to the design of the processor 2202.

In some embodiments, processor 2202 is coupled with a processor bus 2210 to transmit communication signals such as address, data, or control signals between processor 2202 and other components in system 2200. In one embodiment, the system 2200 uses an exemplary 'hub' system architecture, including a memory controller hub 2216 and an Input Output (I/O) controller hub 2230. A memory controller hub 2216 facilitates communication between a memory device and other components of system 2200, while an I/O Controller Hub (ICH) 2230 provides connections to I/O devices via a local I/O bus. In one embodiment, the logic of the memory controller hub 2216 is integrated within the processor.

Memory device 2220 can be a dynamic random-access memory (DRAM) device, a static random-access memory (SRAM) device, flash memory device, phase-change memory device, or some other memory device having suitable performance to serve as process memory. In one embodiment, the memory device 2220 can operate as system memory for the system 2200, to store data 2222 and instructions 2221 for use when the one or more processors 2202 executes an application or process. Memory controller hub 2216 also couples with an optional external graphics processor 2212, which may communicate with the one or more graphics processors 2208 in processors 2202 to perform graphics and media operations.

In some embodiments, ICH 2230 enables peripherals to connect to memory device 2220 and processor 2202 via a high-speed I/O bus. The I/O peripherals include, but are not limited to, an audio controller 2246, a firmware interface 2228, a wireless transceiver 2226 (e.g., Wi-Fi, Bluetooth), a data storage device 2224 (e.g., hard disk drive, flash memory, etc.), and a legacy I/O controller 2240 for coupling legacy (e.g., Personal System 2 (PS/2)) devices to the system. One or more Universal Serial Bus (USB) controllers 2242 connect input devices, such as keyboard and mouse 2244 combinations. A network controller 2234 may also couple with ICH 2230. In some embodiments, a high-performance network controller (not shown) couples with processor bus 2210. It will be appreciated that the system 2200 shown is exemplary and not limiting, as other types of data processing systems that are differently configured may also be used. For example, the I/O controller hub 2230 may be integrated within the one or more processor 2202, or the memory controller hub 2216 and I/O controller hub 2230 may be integrated into a discreet external graphics processor, such as the external graphics processor 2212.

Figure 23:
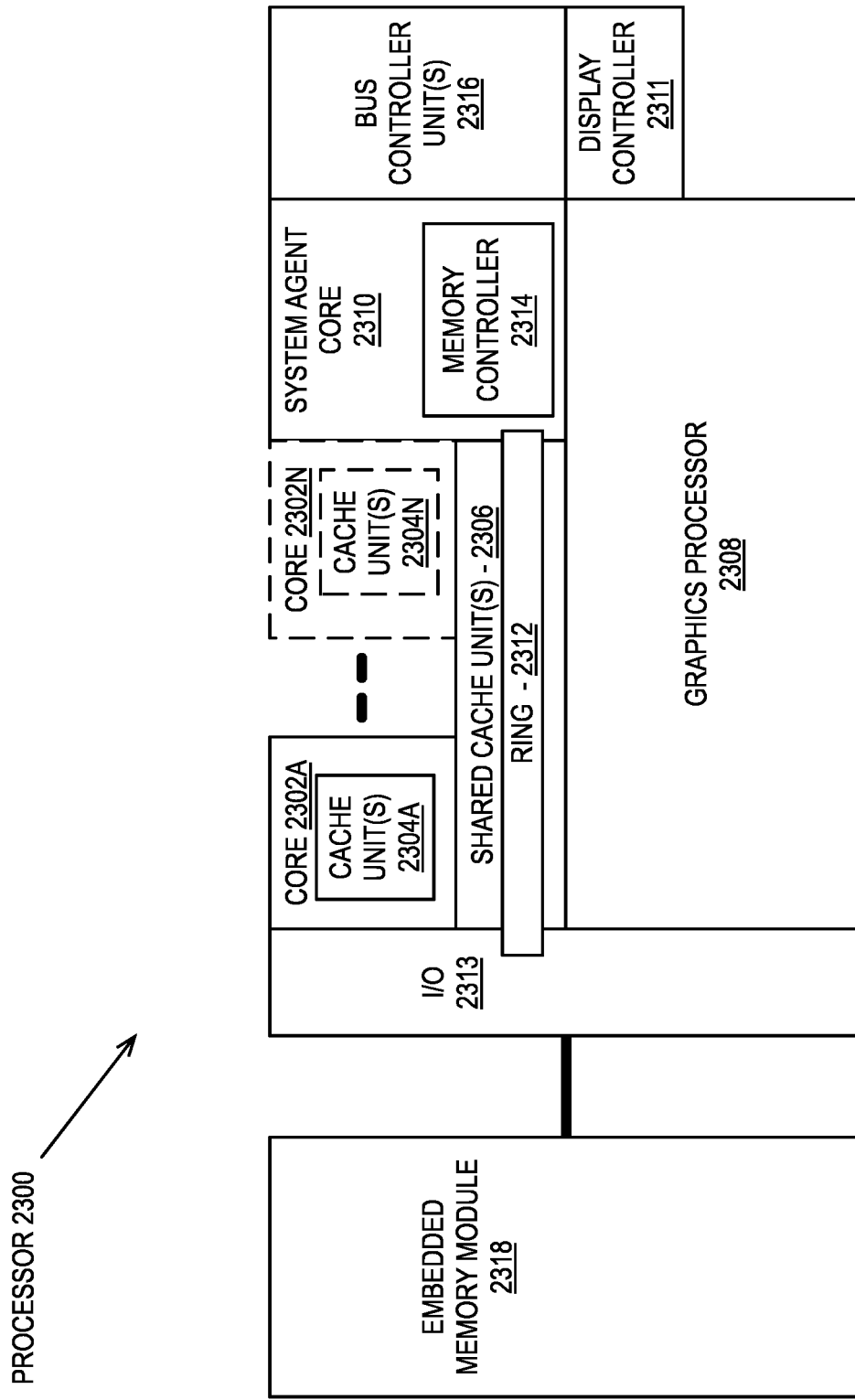
FIG. 23 is a block diagram of a processor according to an embodiment.

FIG. 23 is a block diagram of a processor 2300 having one or more processor cores 2302A-2302N, an integrated memory controller 2314, and an integrated graphics processor 2308. Those elements of FIG. 23 having the same reference numbers (or names) as the elements of any other figure herein can operate or function in any manner similar to that described elsewhere herein but are not limited to such. Processor 2300 can include additional cores up to and including additional core 2302N represented by the dashed lined boxes. Each of processor cores 2302A-2302N includes one or more internal cache units 2304A-2304N. In some embodiments, each processor core also has access to one or more shared cached units 2306.

The internal cache units 2304A-2304N and shared cache units 2306 represent a cache memory hierarchy within the processor 2300. The cache memory hierarchy may include at least one level of instruction and data cache within each processor core and one or more levels of shared mid-level cache, such as a Level 2 (L2), Level 3 (L3), Level 4 (L4), or other levels of cache, where the highest level of cache before external memory is classified as the LLC. In some embodiments, cache coherency logic maintains coherency between the various cache units 2306 and 2304A-2304N.

In some embodiments, processor 2300 may also include a set of one or more bus controller units 2316 and a system agent core 2310. The one or more bus controller units 2316 manage a set of peripheral buses, such as one or more Peripheral Component Interconnect buses (e.g., PCI, PCI Express). System agent core 2310 provides management functionality for the various processor components. In some embodiments, system agent core 2310 includes one or more integrated memory controllers 2314 to manage access to various external memory devices (not shown).

In some embodiments, one or more of the processor cores 2302A-2302N include support for simultaneous multi-threading. In such embodiment, the system agent core 2310 includes components for coordinating and operating cores 2302A-2302N during multi-threaded processing. System agent core 2310 may additionally include a power control unit (PCU), which includes logic and components to regulate the power state of processor cores 2302A-2302N and graphics processor 2308.

In some embodiments, processor 2300 additionally includes graphics processor 2308 to execute graphics processing operations. In some embodiments, the graphics processor 2308 couples with the set of shared cache units 2306, and the system agent core 2310, including the one or more integrated memory controllers 2314. In some embodiments, a display controller 2311 is coupled with the graphics processor 2308 to drive graphics processor output to one or more coupled displays. In some embodiments, display controller 2311 may be a separate module coupled with the graphics processor via at least one interconnect or may be integrated within the graphics processor 2308 or system agent core 2310.

In some embodiments, a ring-based interconnect 2312 is used to couple the internal components of the processor 2300. However, an alternative interconnect unit may be used, such as a point-to-point interconnect, a switched interconnect, or other techniques, including techniques well known in the art. In some embodiments, graphics processor 2308 couples with the ring-based interconnect 2312 via an I/O link 2313.

The exemplary I/O link 2313 represents at least one of multiple varieties of I/O interconnects, including an on package I/O interconnect which facilitates communication between various processor components and a high-performance embedded memory module 2318, such as an eDRAM module. In some embodiments, each of the processor cores 2302A-2302N and graphics processor 2308 use embedded memory modules 2318 as a shared Last Level Cache.

In some embodiments, processor cores 2302A-2302N are homogenous cores executing the same instruction set architecture. In another embodiment, processor cores 2302A-2302N are heterogeneous in terms of instruction set architecture (ISA), where one or more of processor cores 2302A-2302N execute a first instruction set, while at least one of the other cores executes a subset of the first instruction set or a different instruction set. In one embodiment processor cores 2302A-2302N are heterogeneous in terms of microarchitecture, where one or more cores having a relatively higher power consumption couple with one or more power cores having a lower power consumption. Additionally, processor 2300 can be implemented on one or more chips or as an SoC integrated circuit having the illustrated components, in addition to other components.

Figure 24:
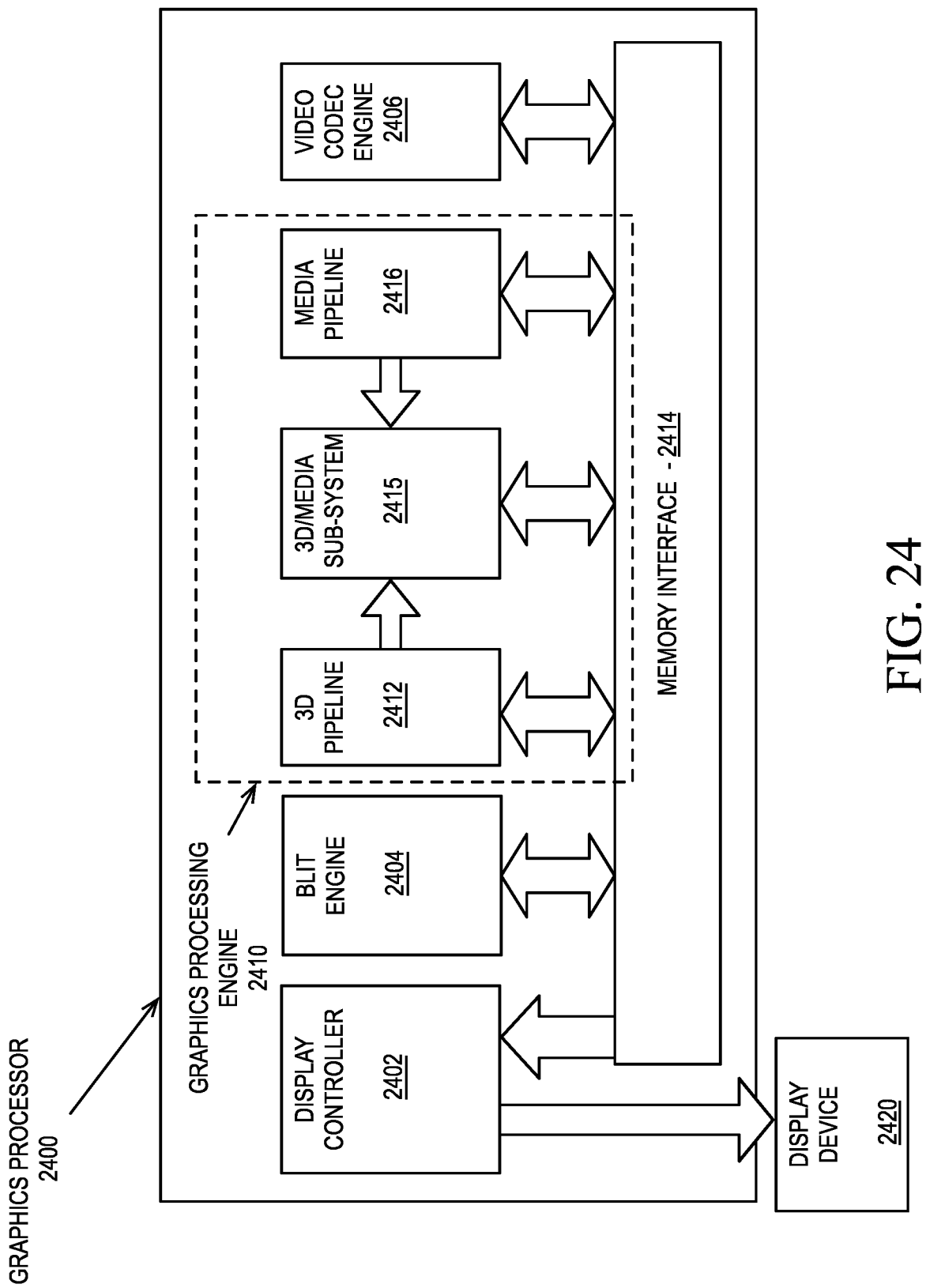
FIG. 24 is a block diagram of a graphics processor, according to an embodiment.

FIG. 24 is a block diagram of a graphics processor 2400, which may be a discrete graphics processing unit, or may be a graphics processor integrated with a plurality of processing cores. In some embodiments, the graphics processor communicates via a memory mapped I/O interface to registers on the graphics processor and with commands placed into the processor memory. In some embodiments, graphics processor 2400 includes a memory interface 2414 to access memory. Memory interface 2414 can be an interface to local memory, one or more internal caches, one or more shared external caches, and/or to system memory.

In some embodiments, graphics processor 2400 also includes a display controller 2402 to drive display output data to a display device 2420. Display controller 2402 includes hardware for one or more overlay planes for the display and composition of multiple layers of video or user interface elements. In some embodiments, graphics processor 2400 includes a video codec engine 2406 to encode, decode, or transcode media to, from, or between one or more media encoding formats, including, but not limited to Moving Picture Experts Group (MPEG) formats such as MPEG-2, Advanced Video Coding (AVC) formats such as H.264/MPEG-4 AVC, as well as the Society of Motion Picture & Television Engineers (SMPTE) 421M/VC-1, and Joint Photographic Experts Group (JPEG) formats such as JPEG, and Motion JPEG (MJPEG) formats.

In some embodiments, graphics processor 2400 includes a block image transfer (BLIT) engine 2404 to perform two-dimensional (2D) rasterizer operations including, for example, bit-boundary block transfers. However, in one embodiment, 2D graphics operations are performed using one or more components of graphics processing engine (GPE) 2410. In some embodiments, GPE 2410 is a compute engine for performing graphics operations, including three-dimensional (3D) graphics operations and media operations.

In some embodiments, GPE 310 includes a 3D pipeline 2412 for performing 3D operations, such as rendering three-dimensional images and scenes using processing functions that act upon 3D primitive shapes (e.g., rectangle, triangle, etc.). The 3D pipeline 2412 includes programmable and fixed function elements that perform various tasks within the element and/or spawn execution threads to a 3D/Media sub-system 2415. While 3D pipeline 2412 can be used to perform media operations, an embodiment of GPE 2410 also includes a media pipeline 2416 that is specifically used to perform media operations, such as video post-processing and image enhancement.

In some embodiments, media pipeline 2416 includes fixed function or programmable logic units to perform one or more specialized media operations, such as video decode acceleration, video de-interlacing, and video encode acceleration in place of, or on behalf of video codec engine 2406. In some embodiments, media pipeline 2416 additionally includes a thread spawning unit to spawn threads for execution on 3D/Media sub-system 2415. The spawned threads perform computations for the media operations on one or more graphics execution units included in 3D/Media sub-system 2415.

In some embodiments, 3D/Media sub-system 2415 includes logic for executing threads spawned by 3D pipeline 2412 and media pipeline 2416. In one embodiment, the pipelines send thread execution requests to 3D/Media sub-system 2415, which includes thread dispatch logic for arbitrating and dispatching the various requests to available thread execution resources. The execution resources include an array of graphics execution units to process the 3D and media threads. In some embodiments, 3D/Media sub-system 2415 includes one or more internal caches for thread instructions and data. In some embodiments, the subsystem also includes shared memory, including registers and addressable memory, to share data between threads and to store output data.

Additional Exemplary Graphics Processing Engine

Figure 25:
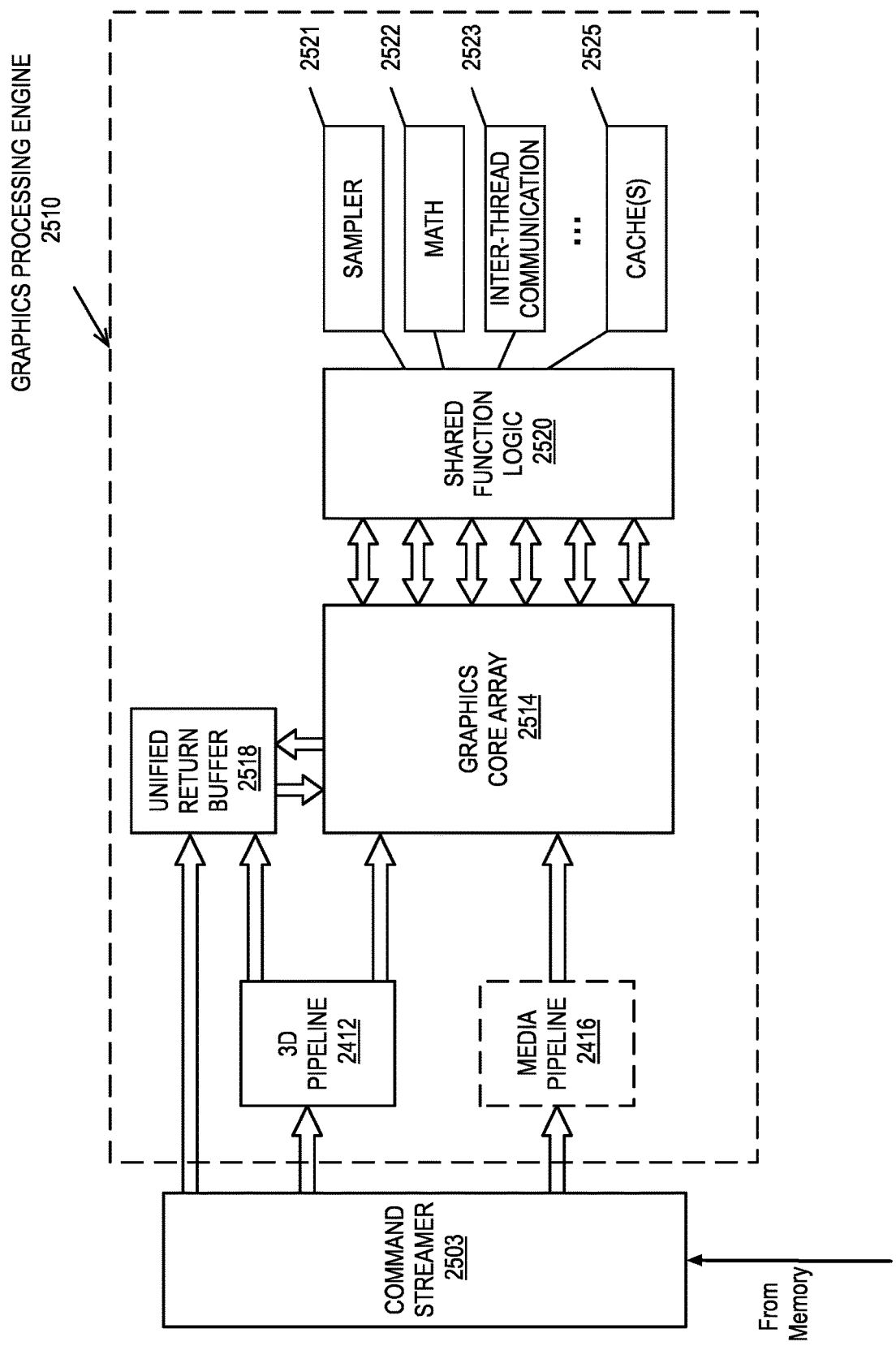
FIG. 25 is a block diagram of a graphics processing engine of a graphics processor in accordance with some embodiments.

FIG. 25 is a block diagram of a graphics processing engine 2510 of a graphics processor in accordance with some embodiments. In one embodiment, the graphics processing engine (GPE) 2510 is a version of the GPE 2410 shown in FIG. 24. Elements of FIG. 25 having the same reference numbers (or names) as the elements of any other figure herein can operate or function in any manner similar to that described elsewhere herein but are not limited to such. For example, the 3D pipeline 2412 and media pipeline 2416 of FIG. 24 are illustrated. The media pipeline 2416 is optional in some embodiments of the GPE 2510 and may not be explicitly included within the GPE 2510. For example, and in at least one embodiment, a separate media and/or image processor is coupled to the GPE 2510.

In some embodiments, GPE 2510 couples with or includes a command streamer 2503, which provides a command stream to the 3D pipeline 2412 and/or media pipelines 2416. In some embodiments, command streamer 2503 is coupled with memory, which can be system memory, or one or more of internal cache memory and shared cache memory. In some embodiments, command streamer 2503 receives commands from the memory and sends the commands to 3D pipeline 2412 and/or media pipeline 2416. The commands are directives fetched from a ring buffer, which stores commands for the 3D pipeline 2412 and media pipeline 2416. In one embodiment, the ring buffer can additionally include batch command buffers storing batches of multiple commands. The commands for the 3D pipeline 2412 can also include references to data stored in memory, such as but not limited to vertex and geometry data for the 3D pipeline 2412 and/or image data and memory objects for the media pipeline 2416. The 3D pipeline 2412 and media pipeline 2416 process the commands and data by performing operations via logic within the respective pipelines or by dispatching one or more execution threads to a graphics core array 2514.

In various embodiments, the 3D pipeline 2412 can execute one or more shader programs, such as vertex shaders, geometry shaders, pixel shaders, fragment shaders, compute shaders, or other shader programs, by processing the instructions and dispatching execution threads to the graphics core array 2514. The graphics core array 2514 provides a unified block of execution resources. Multi-purpose execution logic (e.g., execution units) within the graphics core array 2514 includes support for various 3D API shader languages and can execute multiple simultaneous execution threads associated with multiple shaders.

In some embodiments, the graphics core array 2514 also includes execution logic to perform media functions, such as video and/or image processing. In one embodiment, the execution units additionally include general-purpose logic that is programmable to perform parallel general purpose computational operations, in addition to graphics processing operations. The general-purpose logic can perform processing operations in parallel or in conjunction with general purpose logic within the processor core(s) 2207 of FIG. 22 or core 2302A-2302N as in FIG. 23.

Output data generated by threads executing on the graphics core array 2514 can output data to memory in a unified return buffer (URB) 2518. The URB 2518 can store data for multiple threads. In some embodiments, the URB 2518 may be used to send data between different threads executing on the graphics core array 2514. In some embodiments, the URB 2518 may additionally be used for synchronization between threads on the graphics core array and fixed function logic within the shared function logic 2520.

In some embodiments, graphics core array 2514 is scalable, such that the array includes a variable number of graphics cores, each having a variable number of execution units based on the target power and performance level of GPE 2510. In one embodiment, the execution resources are dynamically scalable, such that execution resources may be enabled or disabled as needed.

The graphics core array 2514 couples with shared function logic 2520 that includes multiple resources that are shared between the graphics cores in the graphics core array. The shared functions within the shared function logic 2520 are hardware logic units that provide specialized supplemental functionality to the graphics core array 2514. In various embodiments, shared function logic 2520 includes but is not limited to sampler 2521, math 2522, and inter-thread communication (ITC) 2523 logic. Additionally, some embodiments implement one or more cache(s) 2525 within the shared function logic 2520. A shared function is implemented where the demand for a given specialized function is insufficient for inclusion within the graphics core array 2514. Instead a single instantiation of that specialized function is implemented as a stand-alone entity in the shared function logic 2520 and shared among the execution resources within the graphics core array 2514. The precise set of functions that are shared between the graphics core array 2514 and included within the graphics core array 2514 varies between embodiments.

Figure 26:
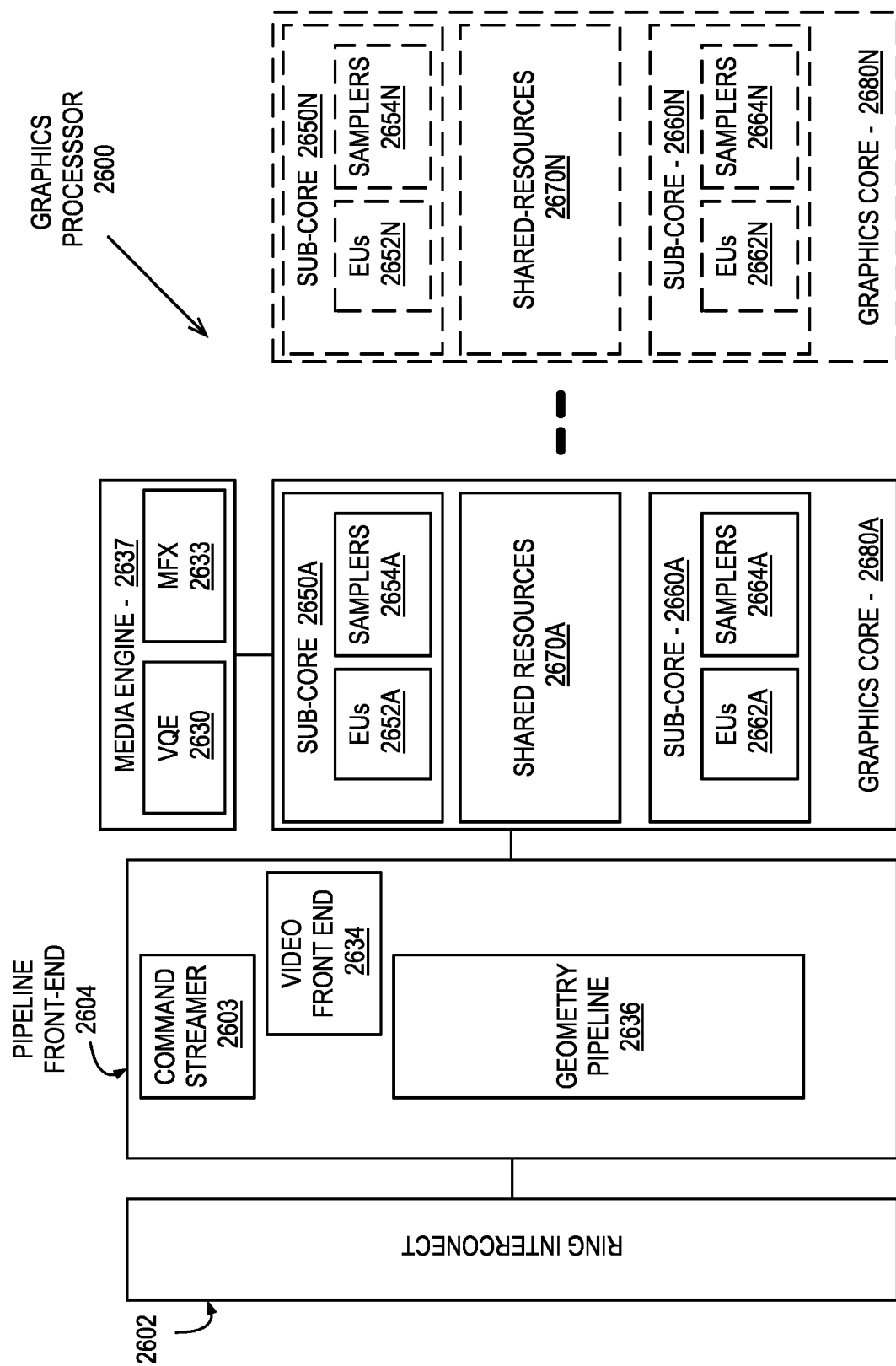
FIG. 26 is a block diagram of a graphics processor provided by an additional embodiment.

FIG. 26 is a block diagram of a graphics processor 2600 provided by an additional embodiment. Elements of FIG. 26 having the same reference numbers (or names) as the elements of any other figure herein can operate or function in any manner similar to that described elsewhere herein but are not limited to such.

In some embodiments, graphics processor 2600 includes a ring interconnect 2602, a pipeline front-end 2604, a media engine 2637, and graphics cores 2680A-2680N. In some embodiments, ring interconnect 2602 couples the graphics processor to other processing units, including other graphics processors or one or more general-purpose processor cores. In some embodiments, the graphics processor is one of many processors integrated within a multi-core processing system.

In some embodiments, graphics processor 2600 receives batches of commands via ring interconnect 2602. The incoming commands are interpreted by a command streamer 2603 in the pipeline front-end 2604. In some embodiments, graphics processor 2600 includes scalable execution logic to perform 3D geometry processing and media processing via the graphics core(s) 2680A-2680N. For 3D geometry processing commands, command streamer 2603 supplies commands to geometry pipeline 2636. For at least some media processing commands, command streamer 2603 supplies the commands to a video front end 2634, which couples with a media engine 2637. In some embodiments, media engine 2637 includes a Video Quality Engine (VQE) 2630 for video and image post-processing and a multi-format encode/decode (MFX) 2633 engine to provide hardware-accelerated media data encode and decode. In some embodiments, geometry pipeline 2636 and media engine 2637 each generate execution threads for the thread execution resources provided by at least one graphics core 2680A.

In some embodiments, graphics processor 2600 includes scalable thread execution resources featuring modular cores 2680A-2680N (sometimes referred to as core slices), each having multiple sub-cores 2650A-550N, 2660A-2660N (sometimes referred to as core sub-slices). In some embodiments, graphics processor 2600 can have any number of graphics cores 2680A through 2680N. In some embodiments, graphics processor 2600 includes a graphics core 2680A having at least a first sub-core 2650A and a second sub-core 2660A. In other embodiments, the graphics processor is a low power processor with a single sub-core (e.g., 2650A). In some embodiments, graphics processor 2600 includes multiple graphics cores 2680A-2680N, each including a set of first sub-cores 2650A-2650N and a set of second sub-cores 2660A-2660N. Each sub-core in the set of first sub-cores 2650A-2650N includes at least a first set of execution units 2652A-2652N and media/texture samplers 2654A-2654N. Each sub-core in the set of second sub-cores 2660A-2660N includes at least a second set of execution units 2662A-2662N and samplers 2664A-2664N. In some embodiments, each sub-core 2650A-2650N, 2660A-2660N shares a set of shared resources 2670A-2670N. In some embodiments, the shared resources include shared cache memory and pixel operation logic. Other shared resources may also be included in the various embodiments of the graphics processor.

Additional Exemplary Execution Units

Figure 27:
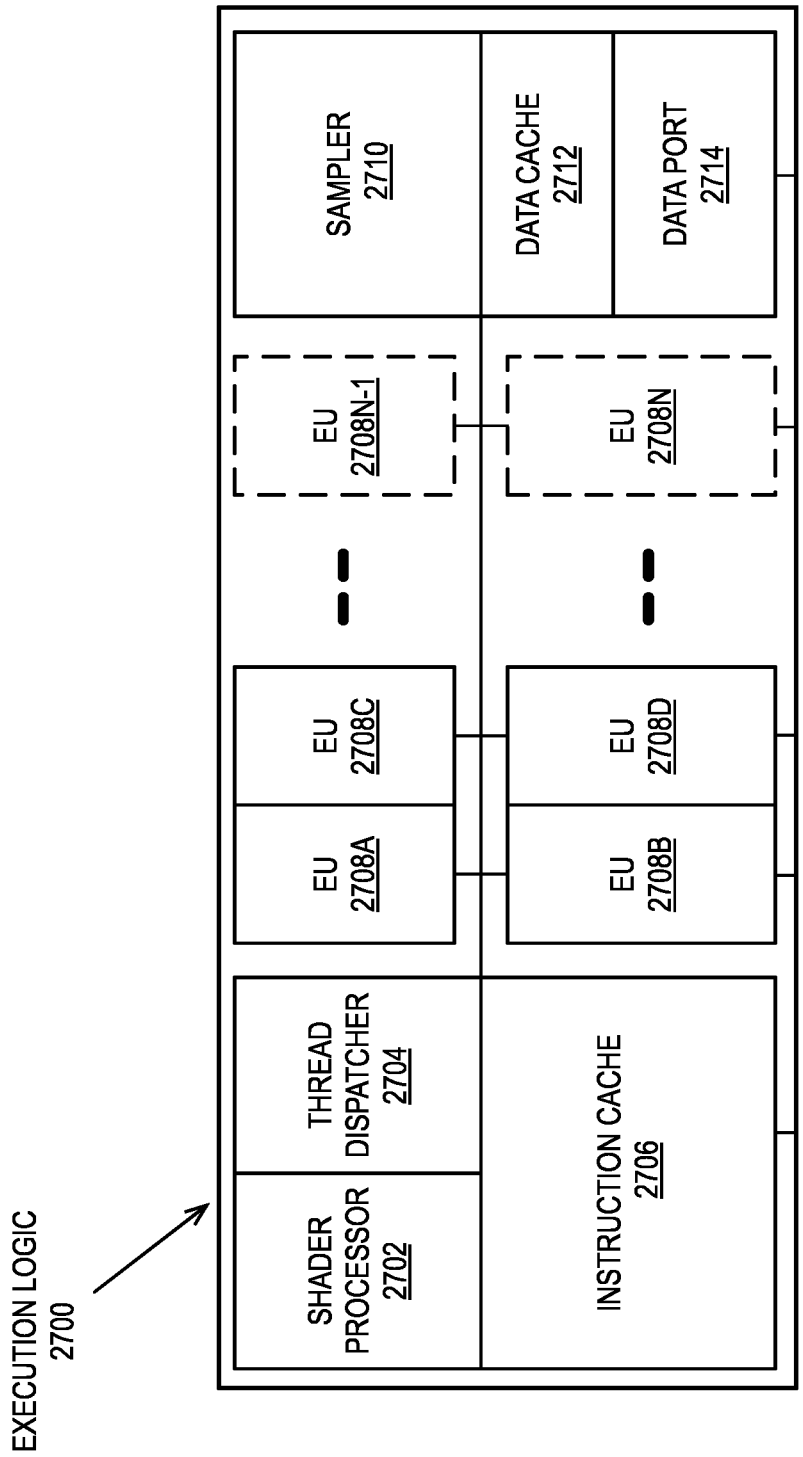
FIG. 27 illustrates thread execution logic including an array of processing elements employed in some embodiments.

FIG. 27 illustrates thread execution logic 2700 including an array of processing elements employed in some embodiments. Elements of FIG. 27 having the same reference numbers (or names) as the elements of any other figure herein can operate or function in any manner similar to that described elsewhere herein but are not limited to such.

In some embodiments, thread execution logic 2700 includes a shader processor 2702, a thread dispatcher 2704, instruction cache 2706, a scalable execution unit array including a plurality of execution units 2708A-2708N, a sampler 2710, a data cache 2712, and a data port 2714. In one embodiment, the scalable execution unit array can dynamically scale by enabling or disabling one or more execution units (e.g., any of execution unit 2708A, 2708B, 2708C, 2708D, through 2708N-1 and 2708N) based on the computational requirements of a workload. In one embodiment, the included components are interconnected via an interconnect fabric that links to each of the components. In some embodiments, thread execution logic 2700 includes one or more connections to memory, such as system memory or cache memory, through one or more of instruction cache 2706, data port 2714, sampler 2710, and execution units 2708A-2708N. In some embodiments, each execution unit (e.g. 2708A) is a stand-alone programmable general purpose computational unit that is capable of executing multiple simultaneous hardware threads while processing multiple data elements in parallel for each thread. In various embodiments, the array of execution units 2708A-2708N is scalable to include any number individual execution units.

In some embodiments, the execution units 2708A-2708N are primarily used to execute shader programs. A shader processor 2702 can process the various shader programs and dispatch execution threads associated with the shader programs via a thread dispatcher 2704. In one embodiment, the thread dispatcher includes logic to arbitrate thread initiation requests from the graphics and media pipelines and instantiate the requested threads on one or more execution unit in the execution units 2708A-2708N. For example, the geometry pipeline (e.g., 2636 of FIG. 26) can dispatch vertex, tessellation, or geometry shaders to the thread execution logic 2700 (FIG. 27) for processing. In some embodiments, thread dispatcher 2704 can also process runtime thread spawning requests from the executing shader programs.

In some embodiments, the execution units 2708A-2708N support an instruction set that includes native support for many standard 3D graphics shader instructions, such that shader programs from graphics libraries (e.g., Direct 3D and OpenGL) are executed with a minimal translation. The execution units support vertex and geometry processing (e.g., vertex programs, geometry programs, vertex shaders), pixel processing (e.g., pixel shaders, fragment shaders) and general-purpose processing (e.g., compute and media shaders). Each of the execution units 2708A-2708N is capable of multi-issue single instruction multiple data (SIMD) execution and multi-threaded operation enables an efficient execution environment in the face of higher latency memory accesses. Each hardware thread within each execution unit has a dedicated high-bandwidth register file and associated independent thread-state. Execution is multi-issue per clock to pipelines capable of integer, single and double precision floating-point operations, SIMD branch capability, logical operations, transcendental operations, and other miscellaneous operations. While waiting for data from memory or one of the shared functions, dependency logic within the execution units 2708A-2708N causes a waiting thread to sleep until the requested data has been returned. While the waiting thread is sleeping, hardware resources may be devoted to processing other threads. For example, during a delay associated with a vertex shader operation, an execution unit can perform operations for a pixel shader, fragment shader, or another type of shader program, including a different vertex shader.

Each execution unit in execution units 2708A-2708N operates on arrays of data elements. The number of data elements is the "execution size," or the number of channels for the instruction. An execution channel is a logical unit of execution for data element access, masking, and flow control within instructions. The number of channels may be independent of the number of physical arithmetic logic units (ALUs) or floating-point units (FPUs) for a particular graphics processor. In some embodiments, execution units 2708A-2708N support integer and floating-point data types.

The execution unit instruction set includes SIMD instructions. The various data elements can be stored as a packed data type in a register and the execution unit will process the various elements based on the data size of the elements. For example, when operating on a 256-bit wide vector, the 256 bits of the vector are stored in a register and the execution unit operates on the vector as four separate 64-bit packed data elements (Quad-Word (QW) size data elements), eight separate 32-bit packed data elements (Double Word (DW) size data elements), sixteen separate 16-bit packed data elements (Word (W) size data elements), or thirty-two separate 8-bit data elements (byte (B) size data elements). However, different vector widths and register sizes are possible.

One or more internal instruction caches (e.g., 2706) are included in the thread execution logic 2700 to cache thread instructions for the execution units. In some embodiments, one or more data caches (e.g., 2712) are included to cache thread data during thread execution. In some embodiments, a sampler 2710 is included to provide texture sampling for 3D operations and media sampling for media operations. In some embodiments, sampler 2710 includes specialized texture or media sampling functionality to process texture or media data during the sampling process before providing the sampled data to an execution unit.

During execution, the graphics and media pipelines send thread initiation requests to thread execution logic 2700 via thread spawning and dispatch logic. Once a group of geometric objects has been processed and rasterized into pixel data, pixel processor logic (e.g., pixel shader logic, fragment shader logic, etc.) within the shader processor 2702 is invoked to further compute output information and cause results to be written to output surfaces (e.g., color buffers, depth buffers, stencil buffers, etc.). In some embodiments, a pixel shader or fragment shader calculates the values of the various vertex attributes that are to be interpolated across the rasterized object. In some embodiments, pixel processor logic within the shader processor 2702 then executes an application programming interface (API)-supplied pixel or fragment shader program. To execute the shader program, the shader processor 2702 dispatches threads to an execution unit (e.g., 2708A) via thread dispatcher 2704. In some embodiments, shader processor 2702 uses texture sampling logic in the sampler 2710 to access texture data in texture maps stored in memory. Arithmetic operations on the texture data and the input geometry data compute pixel color data for each geometric fragment or discards one or more pixels from further processing.

In some embodiments, the data port 2714 provides a memory access mechanism for the thread execution logic 2700 output processed data to memory for processing on a graphics processor output pipeline. In some embodiments, the data port 2714 includes or couples to one or more cache memories (e.g., data cache 2712) to cache data for memory access via the data port.

FIG. 28 is a block diagram illustrating graphics processor instruction formats 2800 according to some embodiments. In one or more embodiment, the graphics processor execution units support an instruction set having instructions in multiple formats. The solid lined boxes illustrate the components that are generally included in an execution unit instruction, while the dashed lines include components that are optional or that are only included in a sub-set of the instructions. In some embodiments, instruction format 2800 described and illustrated are macro-instructions, in that they are instructions supplied to the execution unit, as opposed to micro-operations resulting from instruction decode once the instruction is processed.

In some embodiments, the graphics processor execution units natively support instructions in a 128-bit instruction format 2810. A 64-bit compacted instruction format 2830 is available for some instructions based on the selected instruction, instruction options, and number of operands. The native 128-bit instruction format 2810 provides access to all instruction options, while some options and operations are restricted in the 64-bit format 2830. The native instructions available in the 64-bit format 2830 vary by embodiment. In some embodiments, the instruction is compacted in part using a set of index values in an index field 2813. The execution unit hardware references a set of compaction tables based on the index values and uses the compaction table outputs to reconstruct a native instruction in the 128-bit instruction format 2810.

For each format, instruction opcode 2812 defines the operation that the execution unit is to perform. The execution units execute each instruction in parallel across the multiple data elements of each operand. For example, in response to an add instruction the execution unit performs a simultaneous add operation across each color channel representing a texture element or picture element. By default, the execution unit performs each instruction across all data channels of the operands. In some embodiments, instruction control field 2814 enables control over certain execution options, such as channels selection (e.g., predication) and data channel order (e.g., swizzle). For instructions in the 128-bit instruction format 2810 an exec-size field 2816 limits the number of data channels that will be executed in parallel. In some embodiments, exec-size field 2816 is not available for use in the 64-bit compact instruction format 2830.

Some execution unit instructions have up to three operands including two source operands, src0 2820, src1 2822, and one destination 2818. In some embodiments, the execution units support dual destination instructions, where one of the destinations is implied. Data manipulation instructions can have a third source operand (e.g., SRC2 2824), where the instruction opcode 2812 determines the number of source operands. An instruction's last source operand can be an immediate (e.g., hard-coded) value passed with the instruction.

In some embodiments, the 128-bit instruction format 2810 includes an access/address mode field 2826 specifying, for example, whether direct register addressing mode or indirect register addressing mode is used. When direct register addressing mode is used, the register address of one or more operands is directly provided by bits in the instruction.

In some embodiments, the 128-bit instruction format 2810 includes an access/address mode field 2826, which specifies an address mode and/or an access mode for the instruction. In one embodiment, the access mode is used to define a data access alignment for the instruction. Some embodiments support access modes including a 16-byte aligned access mode and a 1-byte aligned access mode, where the byte alignment of the access mode determines the access alignment of the instruction operands. For example, when in a first mode, the instruction may use byte-aligned addressing for source and destination operands and when in a second mode, the instruction may use 16-byte-aligned addressing for all source and destination operands.

In one embodiment, the address mode portion of the access/address mode field 2826 determines whether the instruction is to use direct or indirect addressing. When direct register addressing mode is used bits in the instruction directly provide the register address of one or more operands. When indirect register addressing mode is used, the register address of one or more operands may be computed based on an address register value and an address immediate field in the instruction.

In some embodiments instructions are grouped based on opcode 2812 bit-fields to simplify Opcode decode 2840. For an 8-bit opcode, bits 4, 5, and 6 allow the execution unit to determine the type of opcode. The precise opcode grouping shown is merely an example. In some embodiments, a move and logic opcode group 2842 includes data movement and logic instructions (e.g., move (mov), compare (cmp)). In some embodiments, move and logic group 2842 shares the five most significant bits (MSB), where move (mov) instructions are in the form of 0000xxxxb and logic instructions are in the form of 0001xxxxb. A flow control instruction group 2844 (e.g., call, jump (jmp)) includes instructions in the form of 0010xxxxb (e.g., 0x20). A miscellaneous instruction group 2846 includes a mix of instructions, including synchronization instructions (e.g., wait, send) in the form of 0011xxxxb (e.g., 0x30). A parallel math instruction group 2848 includes component-wise arithmetic instructions (e.g., add, multiply (mul)) in the form of 0100xxxxb (e.g., 0x40). The parallel math group 2848 performs the arithmetic operations in parallel across data channels. The vector math group 2850 includes arithmetic instructions (e.g., dp4) in the form of 0101xxxxb (e.g., 0x50). The vector math group performs arithmetic such as dot product calculations on vector operands.

Additional Exemplary Graphics Pipeline

Figure 29:
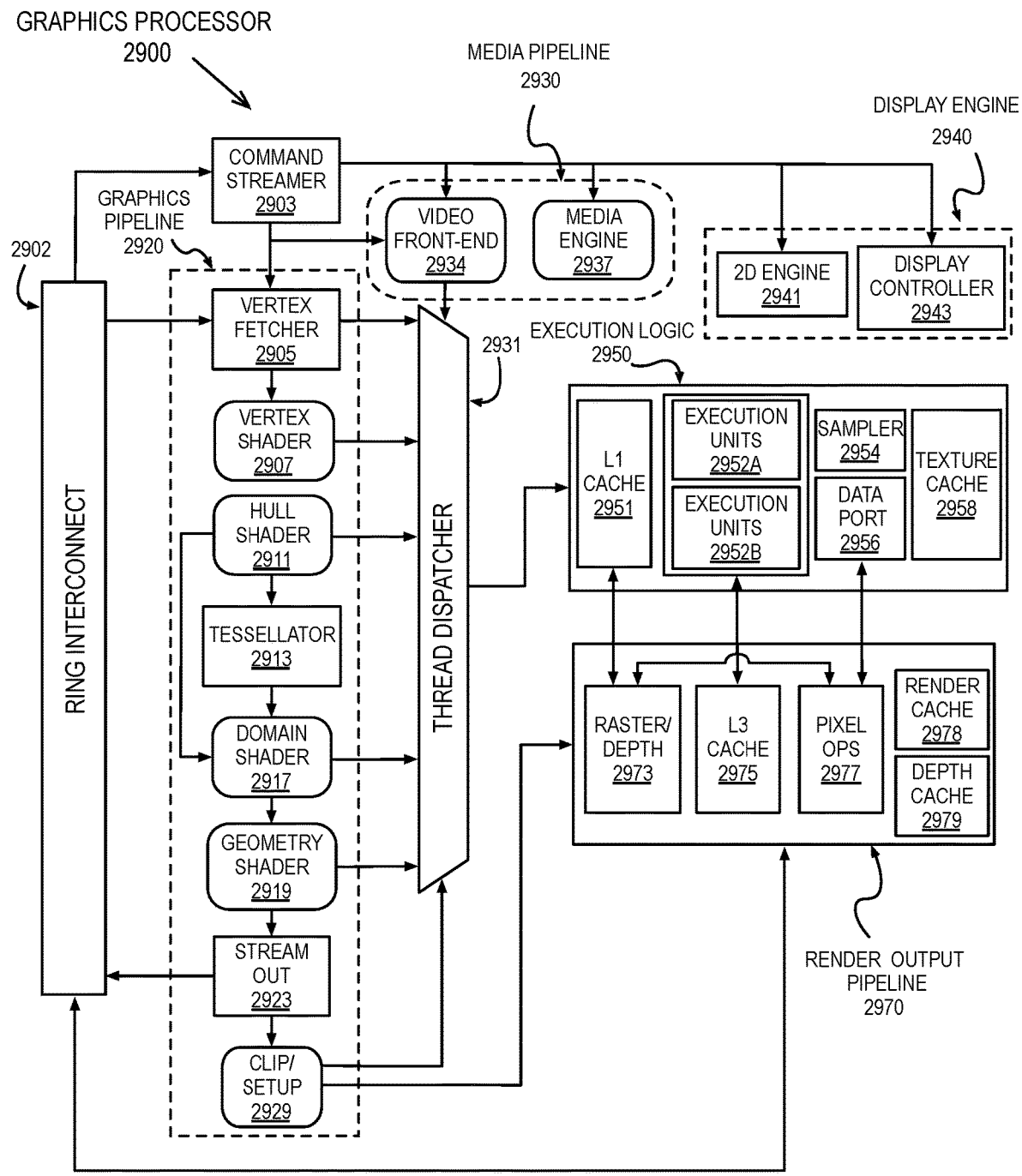
FIG. 29 is a block diagram of a graphics processor according to another embodiment.

FIG. 29 is a block diagram of a graphics processor 2900 according to another embodiment. Elements of FIG. 29 having the same reference numbers (or names) as the elements of any other figure herein can operate or function in any manner similar to that described elsewhere herein but are not limited to such.

In some embodiments, graphics processor 2900 includes a graphics pipeline 2920, a media pipeline 2930, a display engine 2940, thread execution logic 2950, and a render output pipeline 2970. In some embodiments, graphics processor 2900 is a graphics processor within a multi-core processing system that includes one or more general purpose processing cores. The graphics processor is controlled by register writes to one or more control registers (not shown) or via commands issued to graphics processor 2900 via a ring interconnect 2902. In some embodiments, ring interconnect 2902 couples graphics processor 2900 to other processing components, such as other graphics processors or general-purpose processors. Commands from ring interconnect 2902 are interpreted by a command streamer 2903, which supplies instructions to individual components of graphics pipeline 2920 or media pipeline 2930.

In some embodiments, command streamer 2903 directs the operation of a vertex fetcher 2905 that reads vertex data from memory and executes vertex-processing commands provided by command streamer 2903. In some embodiments, vertex fetcher 2905 provides vertex data to a vertex shader 2907, which performs coordinate space transformation and lighting operations to each vertex. In some embodiments, vertex fetcher 2905 and vertex shader 2907 execute vertex-processing instructions by dispatching execution threads to execution units 2952A-2952B via a thread dispatcher 2931.

In some embodiments, execution units 2952A-2952B are an array of vector processors having an instruction set for performing graphics and media operations. In some embodiments, execution units 2952A-2952B have an attached L1 cache 2951 that is specific for each array or shared between the arrays. The cache can be configured as a data cache, an instruction cache, or a single cache that is partitioned to contain data and instructions in different partitions.

In some embodiments, graphics pipeline 2920 includes tessellation components to perform hardware-accelerated tessellation of 3D objects. In some embodiments, a programmable hull shader 811 configures the tessellation operations. A programmable domain shader 817 provides back-end evaluation of tessellation output. A tessellator 2913 operates at the direction of hull shader 2911 and contains special purpose logic to generate a set of detailed geometric objects based on a coarse geometric model that is provided as input to graphics pipeline 2920. In some embodiments, if tessellation is not used, tessellation components (e.g., hull shader 2911, tessellator 2913, and domain shader 2917) can be bypassed.

In some embodiments, complete geometric objects can be processed by a geometry shader 2919 via one or more threads dispatched to execution units 2952A-2952B or can proceed directly to the clipper 2929. In some embodiments, the geometry shader operates on entire geometric objects, rather than vertices or patches of vertices as in previous stages of the graphics pipeline. If the tessellation is disabled, the geometry shader 2919 receives input from the vertex shader 2907. In some embodiments, geometry shader 2919 is programmable by a geometry shader program to perform geometry tessellation if the tessellation units are disabled.

Before rasterization, a clipper 2929 processes vertex data. The clipper 2929 may be a fixed function clipper or a programmable clipper having clipping and geometry shader functions. In some embodiments, a rasterizer and depth test component 2973 in the render output pipeline 2970 dispatches pixel shaders to convert the geometric objects into their per pixel representations. In some embodiments, pixel shader logic is included in thread execution logic 2950. In some embodiments, an application can bypass the rasterizer and depth test component 2973 and access un-rasterized vertex data via a stream out unit 2923.

The graphics processor 2900 has an interconnect bus, interconnect fabric, or some other interconnect mechanism that allows data and message passing amongst the major components of the processor. In some embodiments, execution units 2952A-2952B and associated cache(s) 2951, texture and media sampler 2954, and texture/sampler cache 2958 interconnect via a data port 2956 to perform memory access and communicate with render output pipeline components of the processor. In some embodiments, sampler 2954, caches 2951, 2958 and execution units 2952A-2952B each have separate memory access paths.

In some embodiments, render output pipeline 2970 contains a rasterizer and depth test component 2973 that converts vertex-based objects into an associated pixel-based representation. In some embodiments, the rasterizer logic includes a windower/masker unit to perform fixed function triangle and line rasterization. An associated render cache 2978 and depth cache 2979 are also available in some embodiments. A pixel operations component 2977 performs pixel-based operations on the data, though in some instances, pixel operations associated with 2D operations (e.g. bit block image transfers with blending) are performed by the 2D engine 2941 or substituted at display time by the display controller 2943 using overlay display planes. In some embodiments, a shared L3 cache 2975 is available to all graphics components, allowing the sharing of data without the use of main system memory.

In some embodiments, graphics processor media pipeline 2930 includes a media engine 2937 and a video front-end 2934. In some embodiments, video front-end 2934 receives pipeline commands from the command streamer 2903. In some embodiments, media pipeline 2930 includes a separate command streamer. In some embodiments, video front-end 2934 processes media commands before sending the command to the media engine 2937. In some embodiments, media engine 2937 includes thread spawning functionality to spawn threads for dispatch to thread execution logic 2950 via thread dispatcher 2931.

In some embodiments, graphics processor 2900 includes a display engine 2940. In some embodiments, display engine 2940 is external to processor 2900 and couples with the graphics processor via the ring interconnect 2902, or some other interconnect bus or fabric. In some embodiments, display engine 2940 includes a 2D engine 2941 and a display controller 2943. In some embodiments, display engine 2940 contains special purpose logic capable of operating independently of the 3D pipeline. In some embodiments, display controller 2943 couples with a display device (not shown), which may be a system integrated display device, as in a laptop computer, or an external display device attached via a display device connector.

In some embodiments, graphics pipeline 2920 and media pipeline 2930 are configurable to perform operations based on multiple graphics and media programming interfaces and are not specific to any one application programming interface (API). In some embodiments, driver software for the graphics processor translates API calls that are specific to a particular graphics or media library into commands that can be processed by the graphics processor. In some embodiments, support is provided for the Open Graphics Library (OpenGL), Open Computing Language (OpenCL), and/or Vulkan graphics and compute API, all from the Khronos Group. In some embodiments, support may also be provided for the Direct3D library from the Microsoft Corporation. In some embodiments, a combination of these libraries may be supported. Support may also be provided for the Open Source Computer Vision Library (OpenCV). A future API with a compatible 3D pipeline would also be supported if a mapping can be made from the pipeline of the future API to the pipeline of the graphics processor.

Additional Exemplary Graphics Pipeline Programming

FIG. 30A is a block diagram illustrating a graphics processor command format 3000 according to some embodiments. FIG. 30B is a block diagram illustrating a graphics processor command sequence 3010 according to an embodiment. The solid lined boxes in FIG. 30A illustrate the components that are generally included in a graphics command while the dashed lines include components that are optional or that are only included in a sub-set of the graphics commands. The exemplary graphics processor command format 3000 of FIG. 30A includes data fields to identify a target client 3002 of the command, a command operation code (opcode) 3004, and the relevant data 3006 for the command. A sub-opcode 3005 and a command size 3008 are also included in some commands.

In some embodiments, client 3002 specifies the client unit of the graphics device that processes the command data. In some embodiments, a graphics processor command parser examines the client field of each command to condition the further processing of the command and route the command data to the appropriate client unit. In some embodiments, the graphics processor client units include a memory interface unit, a render unit, a 2D unit, a 3D unit, and a media unit. Each client unit has a corresponding processing pipeline that processes the commands. Once the command is received by the client unit, the client unit reads the opcode 3004 and, if present, sub-opcode 3005 to determine the operation to perform. The client unit performs the command using information in data field 3006. For some commands, an explicit command size 3008 is expected to specify the size of the command. In some embodiments, the command parser automatically determines the size of at least some of the commands based on the command opcode. In some embodiments commands are aligned via multiples of a double word.

The flow diagram in FIG. 30B shows an exemplary graphics processor command sequence 3010. In some embodiments, software or firmware of a data processing system that features an embodiment of a graphics processor uses a version of the command sequence shown to set up, execute, and terminate a set of graphics operations. A sample command sequence is shown and described for purposes of example only as embodiments are not limited to these specific commands or to this command sequence. Moreover, the commands may be issued as batch of commands in a command sequence, such that the graphics processor will process the sequence of commands in at least partially concurrence.

In some embodiments, the graphics processor command sequence 3010 may begin with a pipeline flush command 3012 to cause any active graphics pipeline to complete the currently pending commands for the pipeline. In some embodiments, the 3D pipeline 3022 and the media pipeline 3024 do not operate concurrently. The pipeline flush is performed to cause the active graphics pipeline to complete any pending commands. In response to a pipeline flush, the command parser for the graphics processor will pause command processing until the active drawing engines complete pending operations and the relevant read caches are invalidated. Optionally, any data in the render cache that is marked 'dirty' can be flushed to memory. In some embodiments, pipeline flush command 3012 can be used for pipeline synchronization or before placing the graphics processor into a low power state.

In some embodiments, a pipeline select command 3013 is used when a command sequence requires the graphics processor to explicitly switch between pipelines. In some embodiments, a pipeline select command 3013 is required only once within an execution context before issuing pipeline commands unless the context is to issue commands for both pipelines. In some embodiments, a pipeline flush command 3012 is required immediately before a pipeline switch via the pipeline select command 3013.

In some embodiments, a pipeline control command 3014 configures a graphics pipeline for operation and is used to program the 3D pipeline 3022 and the media pipeline 3024. In some embodiments, pipeline control command 3014 configures the pipeline state for the active pipeline. In one embodiment, the pipeline control command 3014 is used for pipeline synchronization and to clear data from one or more cache memories within the active pipeline before processing a batch of commands.

In some embodiments, return buffer state commands 3016 are used to configure a set of return buffers for the respective pipelines to write data. Some pipeline operations require the allocation, selection, or configuration of one or more return buffers into which the operations write intermediate data during processing. In some embodiments, the graphics processor also uses one or more return buffers to store output data and to perform cross thread communication. In some embodiments, the return buffer state 3016 includes selecting the size and number of return buffers to use for a set of pipeline operations.

The remaining commands in the command sequence differ based on the active pipeline for operations. Based on a pipeline determination 3020, the command sequence is tailored to the 3D pipeline 3022 beginning with the 3D pipeline state 3030 or the media pipeline 3024 beginning at the media pipeline state 3040.

The commands to configure the 3D pipeline state 3030 include 3D state setting commands for vertex buffer state, vertex element state, constant color state, depth buffer state, and other state variables that are to be configured before 3D primitive commands are processed. The values of these commands are determined at least in part based on the particular 3D API in use. In some embodiments, 3D pipeline state 3030 commands are also able to selectively disable or bypass certain pipeline elements if those elements will not be used.

In some embodiments, 3D primitive 3032 command is used to submit 3D primitives to be processed by the 3D pipeline. Commands and associated parameters that are passed to the graphics processor via the 3D primitive 3032 command are forwarded to the vertex fetch function in the graphics pipeline. The vertex fetch function uses the 3D primitive 3032 command data to generate vertex data structures. The vertex data structures are stored in one or more return buffers. In some embodiments, 3D primitive 3032 command is used to perform vertex operations on 3D primitives via vertex shaders. To process vertex shaders, 3D pipeline 3022 dispatches shader execution threads to graphics processor execution units.

In some embodiments, 3D pipeline 3022 is triggered via an execute 3034 command or event. In some embodiments, a register write triggers command execution. In some embodiments execution is triggered via a 'go' or 'kick' command in the command sequence. In one embodiment, command execution is triggered using a pipeline synchronization command to flush the command sequence through the graphics pipeline. The 3D pipeline will perform geometry processing for the 3D primitives. Once operations are complete, the resulting geometric objects are rasterized and the pixel engine colors the resulting pixels. Additional commands to control pixel shading and pixel back end operations may also be included for those operations.

In some embodiments, the graphics processor command sequence 3010 follows the media pipeline 3024 path when performing media operations. In general, the specific use and manner of programming for the media pipeline 3024 depends on the media or compute operations to be performed. Specific media decode operations may be offloaded to the media pipeline during media decode. In some embodiments, the media pipeline can also be bypassed, and media decode can be performed in whole or in part using resources provided by one or more general purpose processing cores. In one embodiment, the media pipeline also includes elements for general-purpose graphics processor unit (GPGPU) operations, where the graphics processor is used to perform SIMD vector operations using computational shader programs that are not explicitly related to the rendering of graphics primitives.

In some embodiments, media pipeline 3024 is configured in a similar manner as the 3D pipeline 3022. A set of commands to configure the media pipeline state 3040 are dispatched or placed into a command queue before the media object commands 3042. In some embodiments, media pipeline state commands 3040 include data to configure the media pipeline elements that will be used to process the media objects. This includes data to configure the video decode and video encode logic within the media pipeline, such as encode or decode format. In some embodiments, media pipeline state commands 3040 also support the use of one or more pointers to "indirect" state elements that contain a batch of state settings.

In some embodiments, media object commands 3042 supply pointers to media objects for processing by the media pipeline. The media objects include memory buffers containing video data to be processed. In some embodiments, all media pipeline states must be valid before issuing a media object command 3042. Once the pipeline state is configured and media object commands 3042 are queued, the media pipeline 3024 is triggered via an execute command 3044 or an equivalent execute event (e.g., register write). Output from media pipeline 3024 may then be post processed by operations provided by the 3D pipeline 3022 or the media pipeline 3024. In some embodiments, GPGPU operations are configured and executed in a similar manner as media operations.

Additional Exemplary Graphics Software Architecture

Figure 31:
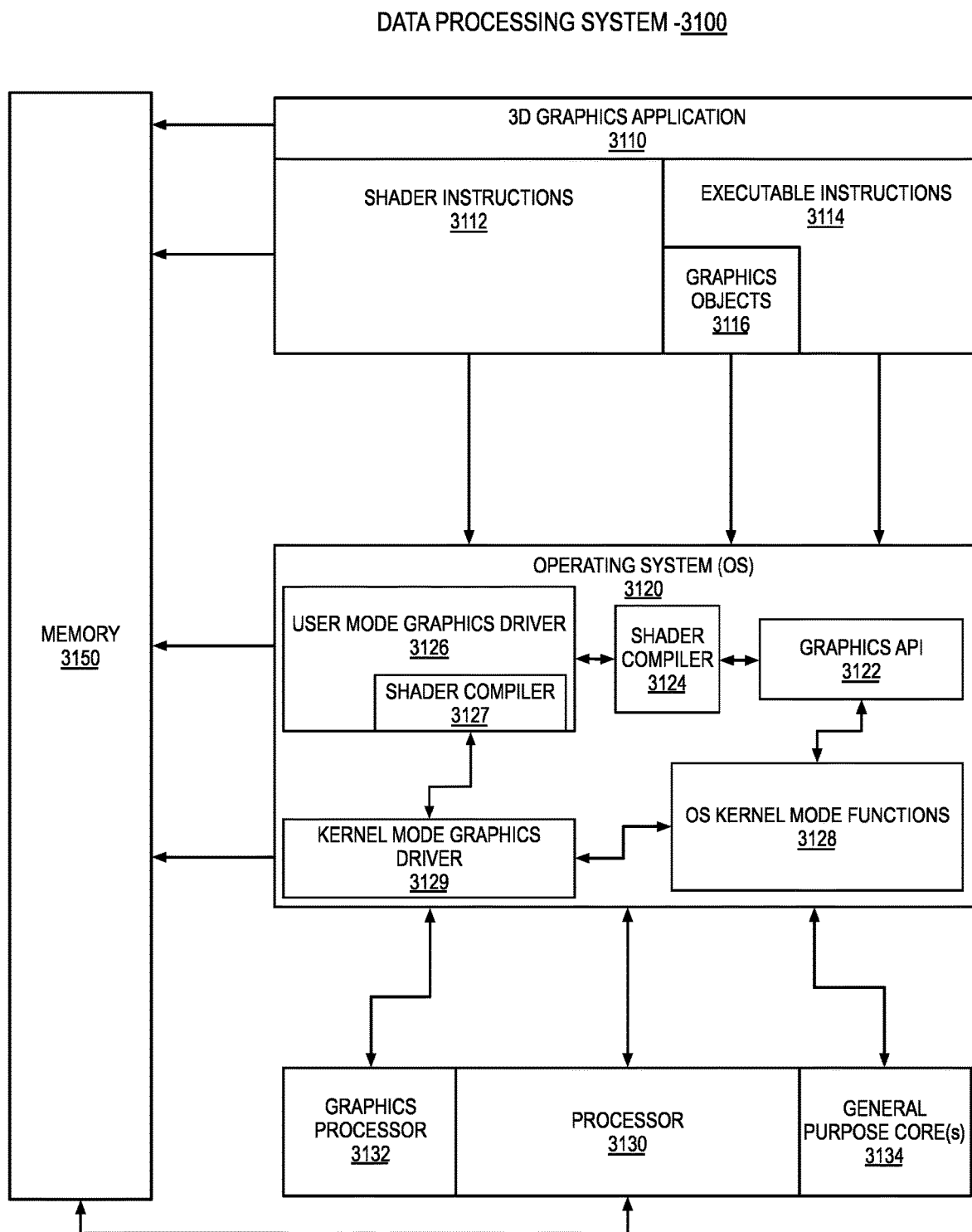
FIG. 31 illustrates exemplary graphics software architecture for a data processing system according to some embodiments.

FIG. 31 illustrates exemplary graphics software architecture for a data processing system 3100 according to some embodiments. In some embodiments, software architecture includes a 3D graphics application 3110, an operating system 3120, and at least one processor 3130. In some embodiments, processor 3130 includes a graphics processor 3132 and one or more general-purpose processor core(s) 3134. The graphics application 3110 and operating system 3120 each execute in the system memory 3150 of the data processing system.

In some embodiments, 3D graphics application 3110 contains one or more shader programs including shader instructions 3112. The shader language instructions may be in a high-level shader language, such as the High-Level Shader Language (HLSL) or the OpenGL Shader Language (GLSL). The application also includes executable instructions 3114 in a machine language suitable for execution by the general-purpose processor core 3134. The application also includes graphics objects 3116 defined by vertex data.

In some embodiments, operating system 3120 is a Microsoft® Windows® operating system from the Microsoft Corporation, a proprietary UNIX-like operating system, or an open source UNIX-like operating system using a variant of the Linux kernel. The operating system 3120 can support a graphics API 3122 such as the Direct3D API, the OpenGL API, or the Vulkan API. When the Direct3D API is in use, the operating system 3120 uses a front-end shader compiler 3124 to compile any shader instructions 3112 in HLSL into a lower-level shader language. The compilation may be a just-in-time (JIT) compilation or the application can perform shader pre-compilation. In some embodiments, high-level shaders are compiled into low-level shaders during the compilation of the 3D graphics application 3110. In some embodiments, the shader instructions 3112 are provided in an intermediate form, such as a version of the Standard Portable Intermediate Representation (SPIR) used by the Vulkan API.

In some embodiments, user mode graphics driver 3126 contains a back-end shader compiler 3127 to convert the shader instructions 3112 into a hardware specific representation. When the OpenGL API is in use, shader instructions 3112 in the GLSL high-level language are passed to a user mode graphics driver 3126 for compilation. In some embodiments, user mode graphics driver 3126 uses operating system kernel mode functions 3128 to communicate with a kernel mode graphics driver 3129. In some embodiments, kernel mode graphics driver 3129 communicates with graphics processor 3132 to dispatch commands and instructions.

Additional Exemplary IP Core Implementations

One or more aspects of at least one embodiment may be implemented by representative code stored on a machine-readable medium which represents and/or defines logic within an integrated circuit such as a processor. For example, the machine-readable medium may include instructions which represent various logic within the processor. When read by a machine, the instructions may cause the machine to fabricate the logic to perform the techniques described herein. Such representations, known as "IP cores," are reusable units of logic for an integrated circuit that may be stored on a tangible, machine-readable medium as a hardware model that describes the structure of the integrated circuit. The hardware model may be supplied to various customers or manufacturing facilities, which load the hardware model on fabrication machines that manufacture the integrated circuit. The integrated circuit may be fabricated such that the circuit performs operations described in association with any of the embodiments described herein.

Figure 32:
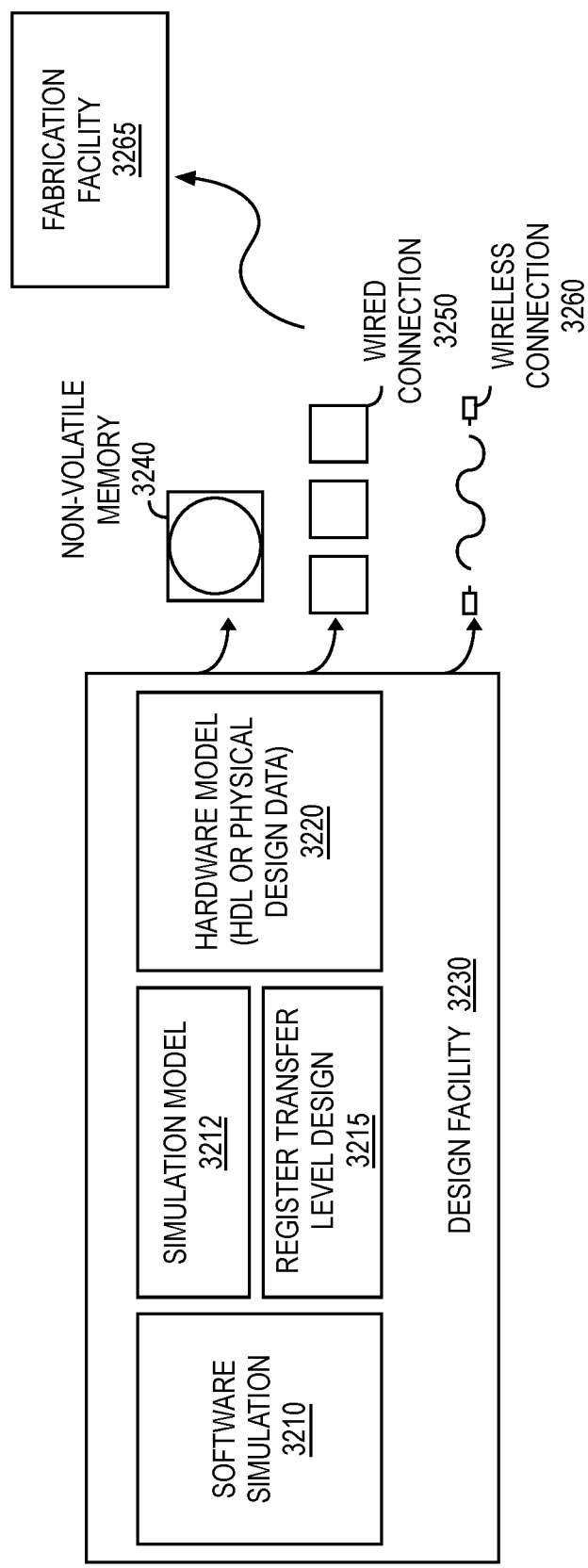
FIG. 32 is a block diagram illustrating an IP core development system, according to an embodiment.

FIG. 32 is a block diagram illustrating an IP core development system 3200 that may be used to manufacture an integrated circuit to perform operations according to an embodiment. The IP core development system 3200 may be used to generate modular, re-usable designs that can be incorporated into a larger design or used to construct an entire integrated circuit (e.g., an SOC integrated circuit). A design facility 3230 can generate a software simulation 3210 of an IP core design in a high-level programming language (e.g., C/C++). The software simulation 3210 can be used to design, test, and verify the behavior of the IP core using a simulation model 3212. The simulation model 3212 may include functional, behavioral, and/or timing simulations. A register transfer level (RTL) design 3215 can then be created or synthesized from the simulation model 3212. The RTL design 3215 is an abstraction of the behavior of the integrated circuit that models the flow of digital signals between hardware registers, including the associated logic performed using the modeled digital signals. In addition to an RTL design 3215, lower-level designs at the logic level or transistor level may also be created, designed, or synthesized. Thus, the particular details of the initial design and simulation may vary.

The RTL design 3215 or equivalent may be further synthesized by the design facility into a hardware model 3220, which may be in a hardware description language (HDL), or some other representation of physical design data. The HDL may be further simulated or tested to verify the IP core design. The IP core design can be stored for delivery to a $3^{rd}$ party fabrication facility 3265 using non-volatile memory 3240 (e.g., hard disk, flash memory, or any non-volatile storage medium). Alternatively, the IP core design may be transmitted (e.g., via the Internet) over a wired connection 3250 or wireless connection 3260. The fabrication facility 3265 may then fabricate an integrated circuit that is based at least in part on the IP core design. The fabricated integrated circuit can be configured to perform operations in accordance with at least one embodiment described herein.

Additional Exemplary System on a Chip Integrated Circuit

Figure 33:
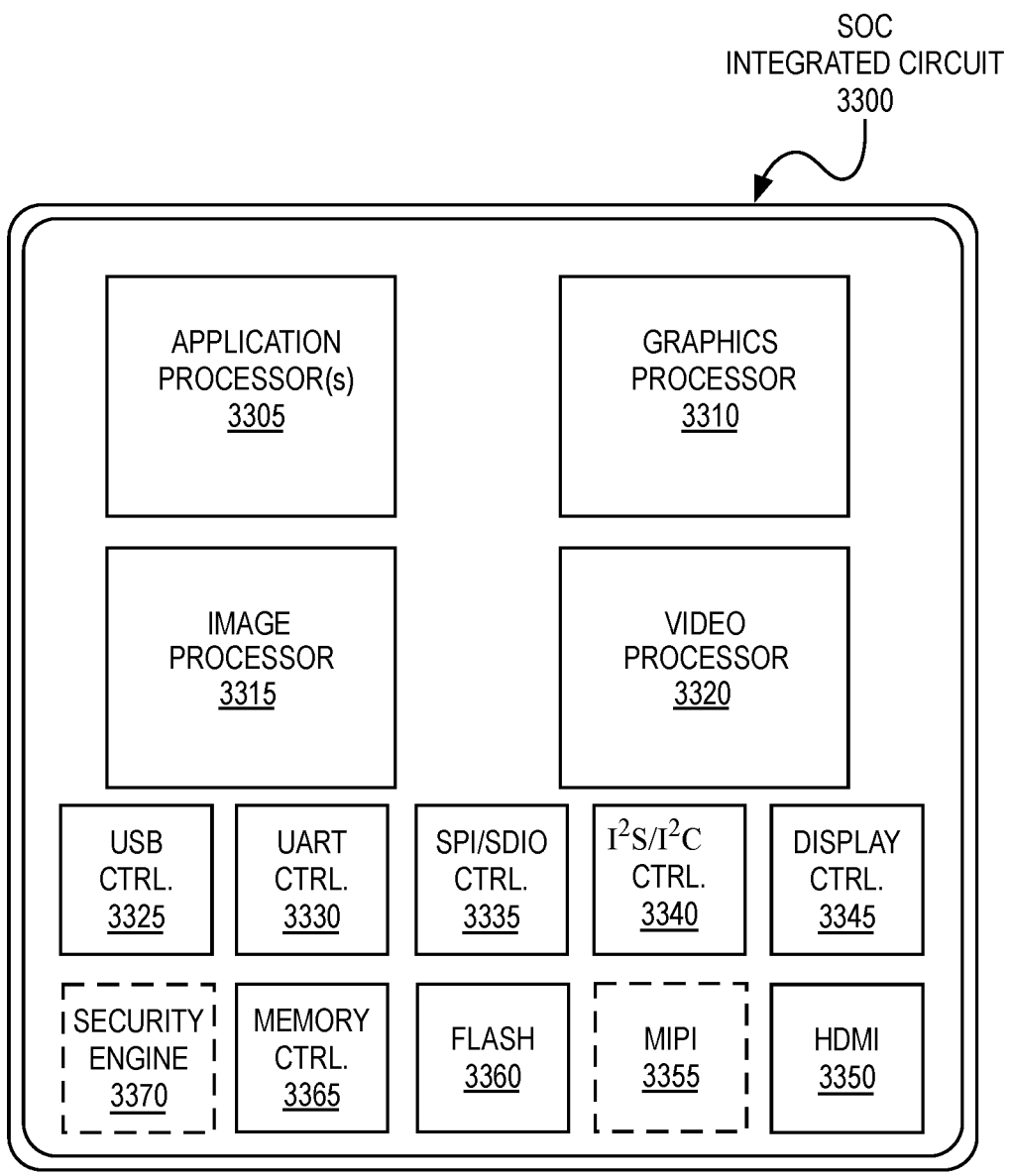
FIG. 33 is a block diagram illustrating an exemplary system on a chip integrated circuit, according to an embodiment.
Figure 34:
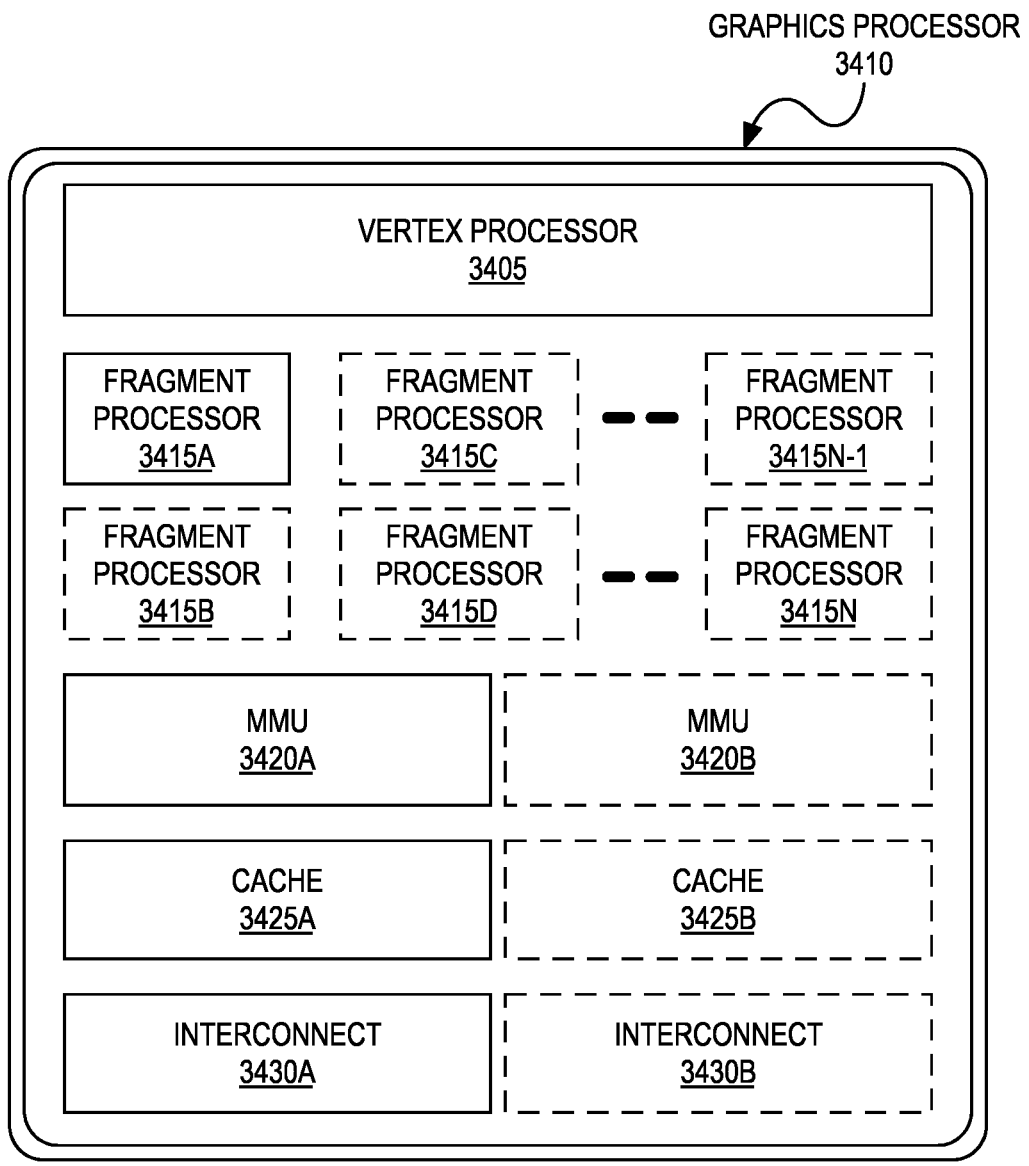
FIG. 34 is a block diagram illustrating an additional graphics processor, according to an embodiment.
Figure 35:
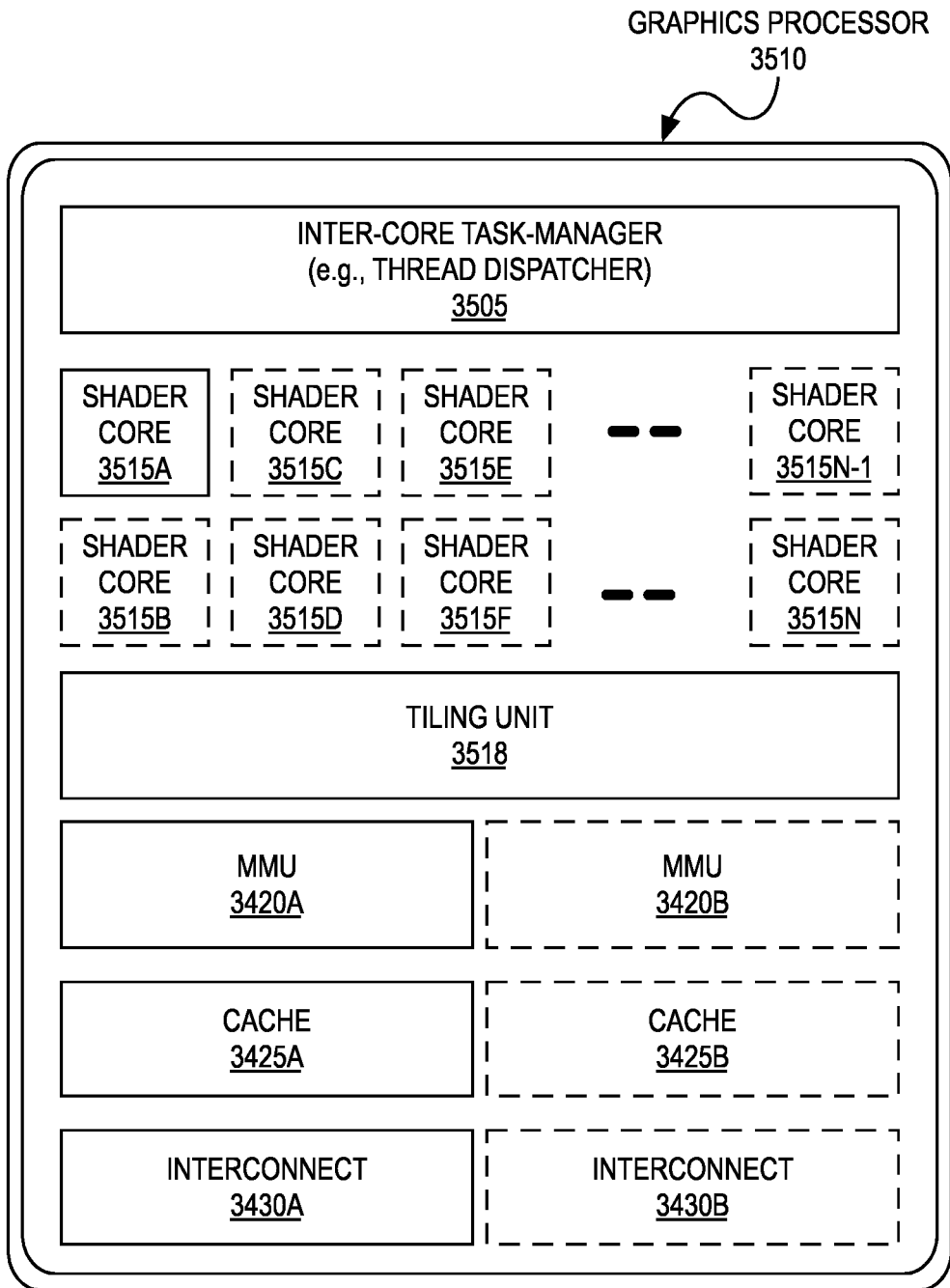
FIG. 35 is a block diagram illustrating an additional exemplary graphics processor of a system on a chip integrated circuit, according to an embodiment.

FIG. 33-35 illustrated exemplary integrated circuits and associated graphics processors that may be fabricated using one or more IP cores, according to various embodiments described herein. In addition to what is illustrated, other logic and circuits may be included, including additional graphics processors/cores, peripheral interface controllers, or general-purpose processor cores.

FIG. 33 is a block diagram illustrating an exemplary system on a chip integrated circuit 3300 that may be fabricated using one or more IP cores, according to an embodiment. Exemplary integrated circuit 3300 includes one or more application processor(s) 3305 (e.g., CPUs), at least one graphics processor 3310, and may additionally include an image processor 3315 and/or a video processor 3320, any of which may be a modular IP core from the same or multiple different design facilities. Integrated circuit 3300 includes peripheral or bus logic including a USB controller 3325, UART controller 3330, an SPI/SDIO controller 3335, and an $I^2S/I^2C$ controller 3340. Additionally, the integrated circuit can include a display device 3345 coupled to one or more of a high-definition multimedia interface (HDMI) controller 3350 and a mobile industry processor interface (MIPI) display interface 3355. Storage may be provided by a flash memory subsystem 3360 including flash memory and a flash memory controller. Memory interface may be provided via a memory controller 3365 for access to SDRAM or SRAM memory devices. Some integrated circuits additionally include an embedded security engine 3370.

FIG. 34 is a block diagram illustrating an exemplary graphics processor 3410 of a system on a chip integrated circuit that may be fabricated using one or more IP cores, according to an embodiment. Graphics processor 3410 can be a variant of the graphics processor 3310 of FIG. 33. Graphics processor 3410 includes a vertex processor 3405 and one or more fragment processor(s) 3415A-3415N (e.g., 3415A, 3415B, 3415C, 3415D, through 3415N-1, and 3415N). Graphics processor 3410 can execute different shader programs via separate logic, such that the vertex processor 3405 is optimized to execute operations for vertex shader programs, while the one or more fragment processor(s) 3415A-3415N execute fragment (e.g., pixel) shading operations for fragment or pixel shader programs. The vertex processor 3405 performs the vertex processing stage of the 3D graphics pipeline and generates primitives and vertex data. The fragment processor(s) 3415A-3415N use the primitive and vertex data generated by the vertex processor 3405 to produce a framebuffer that is displayed on a display device. In one embodiment, the fragment processor(s) 3415A-3415N are optimized to execute fragment shader programs as provided for in the OpenGL API, which may be used to perform similar operations as a pixel shader program as provided for in the Direct 3D API.

Graphics processor 3410 additionally includes one or more memory management units (MMUs) 3420A-3420B, cache(s) 3425A-3425B, and circuit interconnect(s) 3430A-3430B. The one or more MMU(s) 3420A-3420B provide for virtual to physical address mapping for graphics processor 3410, including for the vertex processor 3405 and/or fragment processor(s) 3415A-3415N, which may reference vertex or image/texture data stored in memory, in addition to vertex or image/texture data stored in the one or more cache(s) 3425A-3425B. In one embodiment the one or more MMU(s) 3420A-3420B may be synchronized with other MMUs within the system, including one or more MMUs associated with the one or more application processor(s) 3305, image processor 3315, and/or video processor 3320 of FIG. 33, such that each processor 3305-3320 can participate in a shared or unified virtual memory system. The one or more circuit interconnect(s) 3430A-3430B enable graphics processor 3410 to interface with other IP cores within the SoC, either via an internal bus of the SoC or via a direct connection, according to embodiments.

FIG. 35 is a block diagram illustrating an additional exemplary graphics processor 3510 of a system on a chip integrated circuit that may be fabricated using one or more IP cores, according to an embodiment. Graphics processor 3510 can be a variant of the graphics processor 3310 of FIG. 33. Graphics processor 3510 includes the one or more MMU(s) 3420A-3420B, caches 3425A-3425B, and circuit interconnects 3430A-3430B of the integrated circuit 3400 of FIG. 34.

Graphics processor 3510 includes one or more shader cores 3515A-3515N (e.g., 3515A, 3515B, 3515C, 3515D, 3515E, 3515F, through 3515N-1, and 3515N), which provides for a unified shader core architecture in which a single core or type or core can execute all types of programmable shader code, including shader program code to implement vertex shaders, fragment shaders, and/or compute shaders. The exact number of shader cores present can vary among embodiments and implementations. Additionally, graphics processor 3510 includes an inter-core task manager 3505, which acts as a thread dispatcher to dispatch execution threads to one or more shader cores 3515A-3515N and a tiling unit 3518 to accelerate tiling operations for tile-based rendering, in which rendering operations for a scene are subdivided in image space, for example to exploit local spatial coherence within a scene or to optimize use of internal caches.

The following clauses and/or examples pertain to specific embodiments or examples thereof. Specifics in the examples may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to perform acts of the method, or of an apparatus or system according to embodiments and examples described herein. Various components can be a means for performing the operations or functions described.

One embodiment provides for a graphics processing unit to perform computations associated with a neural network, the graphics processing unit comprising compute unit including a hardware logic unit having dynamic precision fixed-point logic; a decode unit to decode an instruction for execution by the compute unit, the instruction to cause the compute unit to perform a matrix arithmetic operation on a set of dynamic fixed-point tensors; and a dynamic precision manager to dynamically adjust the precision of a compute operation performed by the compute unit during the matrix arithmetic operation, the dynamic precision manager to adjust the precision of the compute operation to prevent an arithmetic overflow.

In one embodiment, the dynamic precision fixed-point logic of the compute unit includes an integer compute unit. The integer compute unit can include a multiplier, an adder, and accumulator, a shifter, and a register. The register can be configured to store a dynamic fixed-point scale factor. In one embodiment, the instruction for execution by the compute unit is to cause the compute unit to perform a matrix operation for a convolution operation on input data to the neural network. The matrix operation can include and an addition or multiplication operation. The matrix operation can also include a multiply and accumulate operation. In one embodiment, the dynamic precision manager can be configured to dynamically adjust the precision of the compute operation to prevent an arithmetic overflow of the accumulator.

One embodiment provides for a method comprising receiving a set of dynamic fixed-point tensors; computing a right-shift value using an absolute maximum value within the set of dynamic fixed-point tensors and a dynamic range of the set of dynamic fixed-point tensors; right-shifting data values within the set of dynamic fixed-point tensors to prevent precision loss during computation; incrementing a shared exponent associated with the set of dynamic fixed-point tensors; and performing a compute operation on the set of dynamic fixed-point tensors.

One embodiment provides for a graphics processing unit to perform computations associated with a neural network, the graphics processing unit comprising compute unit including a hardware logic unit having dynamic precision fixed-point logic, the compute unit to receive a set of dynamic fixed-point tensors, compute, via the dynamic precision fixed-point logic, a right-shift value using an absolute maximum value within the set of dynamic fixed-point tensors and a dynamic range of the set of dynamic fixed-point tensors, right-shift data values within the set of dynamic fixed-point tensors based on the right-shift value, increment a shared exponent associated with the set of dynamic fixed-point tensors based on the right-shift value, perform a compute operation on the set of dynamic fixed-point tensors, and generate an output tensor via the compute operation on the set of dynamic fixed-point tensors.

One embodiment provides for a data processing system comprising a non-transitory machine readable medium storing instructions; and one or more processors including at least one graphics processor, the at least one graphics processor including a compute unit including a hardware logic unit having dynamic precision fixed-point logic, the compute unit to perform a matrix arithmetic operation on a set of dynamic fixed-point tensors; and_a dynamic precision manager to dynamically adjust the precision of a compute operation performed by the compute unit during the matrix arithmetic operation on the set of dynamic fixed-point tensors, the dynamic precision manager to prevent an arithmetic overflow during the compute operation.

One embodiment provides a data processing system comprising a memory to store a set of dynamic fixed-point tensors and one or more processors including at least one graphics processor, the at least one graphics processor including a compute unit including a hardware logic unit having dynamic precision fixed-point logic. The compute unit is configured to receive the set of dynamic fixed-point tensors, compute, via the dynamic precision fixed-point logic, a right-shift value using an absolute maximum value within the set of dynamic fixed-point tensors and a dynamic range of the set of dynamic fixed-point tensors, right-shift data values within the set of dynamic fixed-point tensors based on the right-shift value, increment a shared exponent associated with the set of dynamic fixed-point tensors based on the right-shift value, perform a compute operation on the set of dynamic fixed-point tensors, and generate an output tensor via the compute operation on the set of dynamic fixed-point tensors.

The embodiments described herein refer to specific configurations of hardware, such as application specific integrated circuits (ASICs), configured to perform certain operations or having a predetermined functionality. Such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage devices of a given electronic device typically store code and/or data for execution on the set of one or more processors of that electronic device.

Of course, one or more parts of an embodiment may be implemented using different combinations of software, firmware, and/or hardware. Throughout this detailed description, for the purposes of explanation, numerous specific details were set forth in order to provide a thorough understanding of the present invention. It will be apparent, however, to one skilled in the art that the embodiments may be practiced without some of these specific details. In certain instances, well-known structures and functions were not described in elaborate detail to avoid obscuring the inventive subject matter of the embodiments. Accordingly, the scope and spirit of the invention should be judged in terms of the claims that follow.

What is claimed is:

1. A graphics processing unit comprising:
an interface to an interconnect fabric; and
a compute unit coupled with the interface, the compute unit including circuitry configured to:
quantize elements of a floating-point tensor to convert the floating-point tensor into a dynamic fixed-point tensor, wherein to quantize an element of the floating-point tensor, the circuitry is to compute a right-shift value based on a difference between an exponent value of the element of the floating-point tensor and the exponent value of an absolute maximum value of the floating-point tensor and right-shift a mantissa of the element based on the right-shift value to generate a magnitude integer;
perform a compute operation on input including the dynamic fixed-point tensor; and
generate an output tensor via the compute operation.

2. The graphics processing unit as in claim 1, wherein the circuitry is configured to perform computations associated with a neural network.

3. The graphics processing unit as in claim 2, wherein the floating-point tensor is a value associated with a layer of the neural network.

4. The graphics processing unit as in claim 1, wherein the circuitry is configured to store an implicit leading bit of the mantissa of the element as an explicit bit within the magnitude integer.

5. The graphics processing unit as in claim 1, wherein the compute operation is a matrix arithmetic operation.

6. The graphics processing unit as in claim 1, wherein the circuitry is configured to:
determine whether a leading zero count of an absolute maximum value of the output tensor is above a threshold; and
adjust a precision associated with the output tensor in response to determining whether the leading zero count is above the threshold.

7. The graphics processing unit as in claim 1, wherein the circuitry includes a dynamic precision fixed-point unit to convert the floating-point tensor into the dynamic fixed-point tensor and perform the compute operation on the input including the dynamic fixed-point tensor.

8. The graphics processing unit as in claim 7, wherein the dynamic precision fixed-point unit includes an integer compute unit that includes a multiplier, an adder, an accumulator, a shifter, and a register.

9. The graphics processing unit as in claim 8, wherein the register is to store a shared exponent associated with the dynamic fixed-point tensor and the shared exponent is shared by elements of the dynamic fixed-point tensor.

10. The graphics processing unit as in claim 9, wherein the dynamic precision fixed-point unit is configured to round the magnitude integer according to value of a first bit and a second bit within the magnitude integer to generate a rounded magnitude integer.

11. A method comprising:
quantizing elements of a floating-point tensor via a graphics processing unit comprising circuitry configured to convert the floating-point tensor into a dynamic fixed-point tensor, wherein quantizing an element of the floating-point tensor includes, via the circuitry:
computing a right-shift value based on a difference between an exponent value of an element of the floating-point tensor and the exponent value of an absolute maximum value of the floating-point tensor and right-shifting a mantissa of the element based on the right-shift value to generate a magnitude integer;
performing a compute operation on at least the dynamic fixed-point tensor; and
generating an output tensor via the compute operation.

12. The method as in claim 11, wherein quantizing an element of the floating-point tensor additionally includes storing an implicit leading bit of the mantissa as an explicit bit within the magnitude integer.

13. The method as in claim 11, further comprising:
determining whether a leading zero count of an absolute maximum value of the output tensor is above a threshold; and
adjusting a precision associated with the output tensor in response to determining whether the leading zero count is above the threshold.

14. The method as in claim 13, wherein adjusting the precision associated with the output tensor includes adjusting the right-shift value within a right-shift counter and adjusting a shared exponent for the output tensor.

15. The method as in claim 14, wherein adjusting the precision associated with the output tensor includes:
increasing the right-shift value within the right-shift counter and incrementing the shared exponent in response to determining that the leading zero count is above the threshold; and
decreasing the right-shift value within the right-shift counter and decrementing the shared exponent in response to determining that the leading zero count is below the threshold.

16. A data processing system comprising:
a memory to store dynamic fixed-point tensors; and
one or more processors including at least one graphics processor, the at least one graphics processor including a hardware processing resource having dynamic precision fixed-point circuitry, the hardware processing resource configured to:
quantize elements of a floating-point tensor to convert the floating-point tensor into a dynamic fixed-point tensor, wherein to quantize an element of the floating-point tensor, the dynamic precision fixed-point circuitry is to compute a right-shift value based on a difference between an exponent value of the element of the floating-point tensor and the exponent value of an absolute maximum value of the floating-point tensor and right-shift a mantissa of the element based on the right-shift value to generate a magnitude integer;
perform a compute operation on input including the dynamic fixed-point tensor; and
generate an output tensor via the compute operation.

17. The data processing system as in claim 16, wherein the hardware processing resource is configured to perform computations associated with a neural network and the floating-point tensor is a value associated with a layer of the neural network.

18. The data processing system as in claim 16, wherein the hardware processing resource is configured to store an implicit leading bit of the mantissa of the element as an explicit bit within the magnitude integer.

19. The data processing system as in claim 16, wherein the compute operation is a matrix arithmetic operation and wherein the hardware processing resource is configured to:
determine whether a leading zero count of an absolute maximum value of the output tensor is above a threshold; and
adjust a precision associated with the output tensor in response to determining whether the leading zero count is above the threshold.

20. The data processing system as in claim 19, wherein to adjust the precision associated with the output tensor includes to adjust the right-shift value within a right-shift counter and adjust a shared exponent for the output tensor.

* * * * *